US010788219B2

(12) United States Patent
Mueller et al.

(10) Patent No.: US 10,788,219 B2
(45) Date of Patent: Sep. 29, 2020

(54) COOKTOP WITH DISPLAY DEVICE

(71) Applicant: SCHOTT AG, Mainz (DE)

(72) Inventors: Martin Mueller, Darmstadt (DE); Thomas Zenker, Nieder Olm (DE); Gerold Ohl, Sulzheim (DE); Matthias Bockmeyer, Mainz (DE); Evelin Weiss, Mainz (DE)

(73) Assignee: SCHOTT AG, Mainz (DE)

( * ) Notice: Subject to any disclaimer, the term of this patent is extended or adjusted under 35 U.S.C. 154(b) by 336 days.

(21) Appl. No.: 15/851,813

(22) Filed: Dec. 22, 2017

(65) Prior Publication Data

US 2018/0202666 A1    Jul. 19, 2018

(30) Foreign Application Priority Data

Dec. 23, 2016   (DE) .......................... 10 2016 125 672
Aug. 14, 2017   (DE) .......................... 10 2017 118 451

(51) Int. Cl.
*F24C 7/08*      (2006.01)
*H05B 3/74*      (2006.01)
*C03C 10/00*     (2006.01)
*C03C 4/02*      (2006.01)
*C03C 17/00*     (2006.01)
*C03C 3/095*     (2006.01)
*F24C 15/10*     (2006.01)
*C03C 3/097*     (2006.01)
*C03C 3/087*     (2006.01)

(52) U.S. Cl.
CPC .............. *F24C 7/083* (2013.01); *C03C 3/087* (2013.01); *C03C 3/095* (2013.01); *C03C 3/097* (2013.01); *C03C 4/02* (2013.01); *C03C 10/0027* (2013.01); *C03C 17/00* (2013.01); *F24C 15/10* (2013.01); *H05B 3/74* (2013.01)

(58) Field of Classification Search
CPC ......... F24C 7/083; C03C 3/087; C03C 3/095; C03C 3/097; C03C 4/02; C03C 10/0027
See application file for complete search history.

(56) References Cited

U.S. PATENT DOCUMENTS

2010/0028629 A1   2/2010   Anton
2010/0047556 A1   2/2010   Bockmeyer
(Continued)

FOREIGN PATENT DOCUMENTS

DE   102008031426   1/2010
DE   102008031428   1/2010
(Continued)

*Primary Examiner* — Vishal Pancholi
(74) *Attorney, Agent, or Firm* — Ohlandt, Greeley, Ruggiero & Perle, L.L.P.

(57) ABSTRACT

A cooktop with a graphical display device is provided. The cooktop includes a glass ceramic substrate with a dead-front effect in which lightness differences in the display area and in particular differences between the latter and the adjacent areas of the cooktop are not visible for a user from the exterior. The cooktop has a glass or glass ceramic substrate and a display device with a display surface for displaying information by emission of light, wherein the display device is in the interior of the cooktop or cooking appliance such that light emitted from the display surface passes through the glass or glass ceramic substrate and is perceptible by a user in the exterior.

30 Claims, 32 Drawing Sheets

(56) References Cited

U.S. PATENT DOCUMENTS

| | | | |
|---|---|---|---|
| 2013/0070451 A1 | 3/2013 | Mulet | |
| 2013/0098903 A1 | 4/2013 | Di Giovanni | |
| 2013/0201678 A1* | 8/2013 | Siebers | H04R 25/604 |
| | | | 362/231 |
| 2013/0286630 A1* | 10/2013 | Guiset | F24C 7/083 |
| | | | 362/23.1 |
| 2014/0146530 A1 | 5/2014 | Guiset | |
| 2014/0305929 A1 | 10/2014 | Weiss | |
| 2015/0109760 A1* | 4/2015 | Gabel | C03C 3/087 |
| | | | 362/92 |
| 2016/0252656 A1 | 9/2016 | Waldschmidt | |
| 2017/0215236 A1 | 7/2017 | Doerk | |

FOREIGN PATENT DOCUMENTS

| | | |
|---|---|---|
| DE | 202011110363 | 8/2013 |
| DE | 202010018044 | 9/2013 |
| DE | 202012012718 | 9/2013 |
| DE | 102012212350 | 1/2014 |
| DE | 102013103776 | 6/2014 |
| DE | 202016103321 | 7/2016 |
| DE | 102015102743 | 9/2016 |
| DE | 202016104800 | 12/2016 |
| WO | 2015044168 | 4/2015 |

* cited by examiner

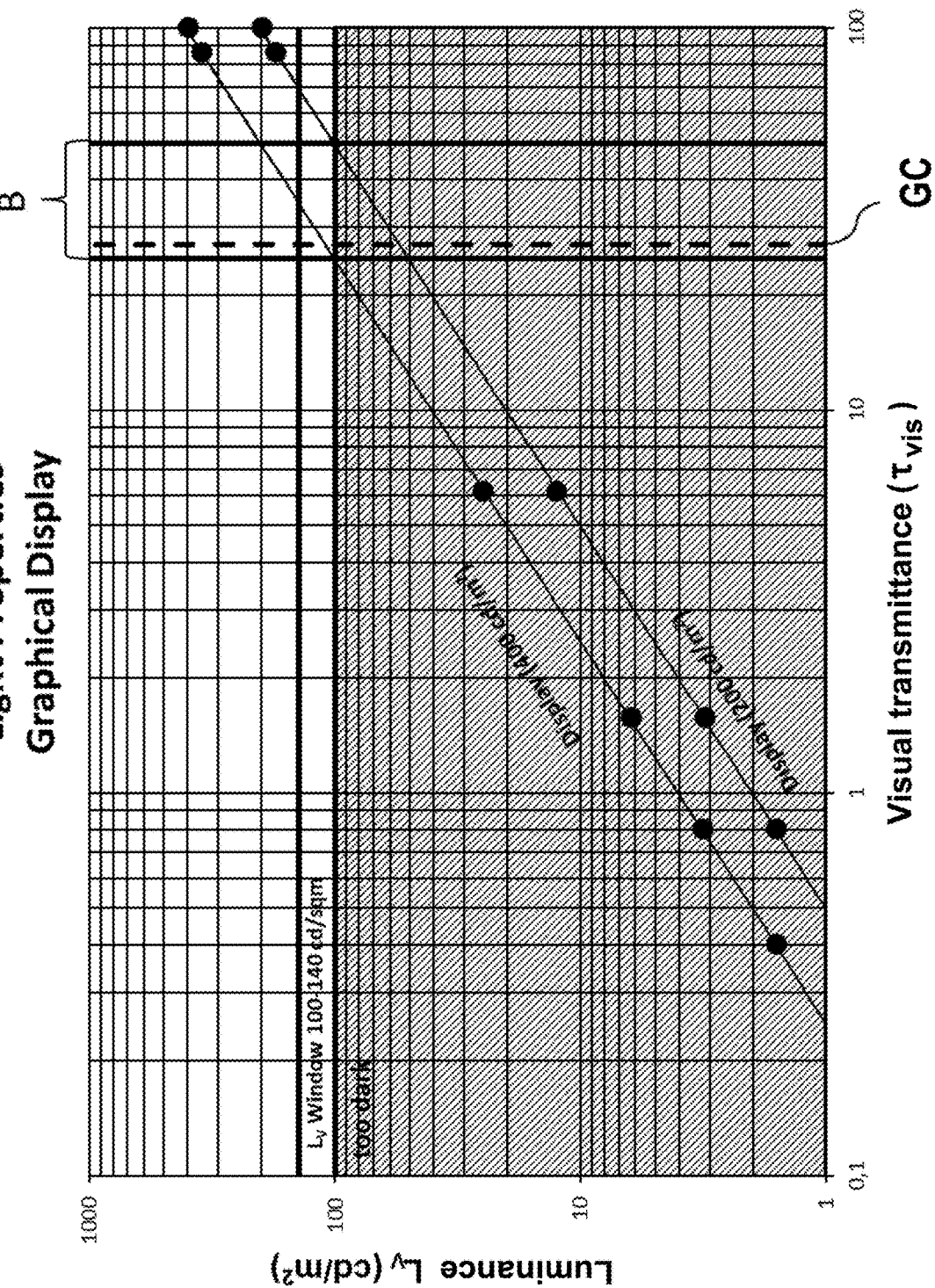

COOKTOP WITH DISPLAY DEVICE

This application claims the benefit under 35 USC 119 of German Application No. 10 2016 125 672.2 filed on Dec. 23, 2016 and German Application No. 10 2017 118 451.1 filed on Aug. 14, 2017, the entire contents of both of which are incorporated by reference herein.

The invention relates to a cooktop with a display device, in particular with a graphical display device that is available at low cost.

Known cooktops with graphical display devices which provide a luminance of more than 100 cd/m² (nits) for an observer above the glass ceramic do not provide a sufficient dead-front effect for this user when switched off. Dead-front effect herein refers to the desirable effect according to which an exterior user will not see any punctiform or 2-dimensional lightness differences within the display area and in particular no such differences between the display area and the rest of the surface of the cooktop surrounding the display area, and according to which there is preferably no difference in color perceivable either. This dead-front effect ensures a homogeneous appearance, which significantly helps to create an attractive impression, especially in the case of rather dark cooktops.

In conventional cooktops, the display window remains clearly visible and interrupts the homogeneous appearance of the entire cooking surface.

International patent application WO 2012/001300 A1 discloses a cooking device in which internal devices comprise at least one heating device, a control and/or monitoring device, and at least one light-emitting device. These internal devices are covered by a glass or glass ceramic panel which has been dyed using vanadium oxide. The glass or glass ceramic panel exhibits an intrinsic light transmittance from 2.3% to 40% and a transmittance of at least 0.6% for at least one wavelength in a range from 420 nm to 480 nm. In this cooking device, at least one mask is provided above, below, or inside the glass or glass ceramic panel for masking at least a region including the internal elements.

German utility model DE 202010018044 U1 describes a display arrangement comprising, on the one hand, a glass ceramic panel of the lithium aluminosilicate type with an optical transmittance between 0.2% and 4% for at least one wavelength in the range between 400 nm and 500 nm for a thickness of 4 mm, and on the other hand a lighting device, which lighting device comprises at least one polychromatic light source exhibiting at least a first non-zero emission at a wavelength between 400 nm and 500 nm and at least a second emission at a wavelength of more than 500 nm, wherein the placement of the source is adapted to allow for displaying through the glass ceramic panel.

International patent application WO 2012/001300 A1 and German utility model DE 202011110363 U1 each disclose a cooking device comprising internal elements, including at least one heating means, control and/or monitoring means, and at least one light-emitting device, wherein the internal elements are covered by at least one glass or glass ceramic panel which has been dyed using vanadium oxide, wherein at least one light emitting device is not red in color as viewed through the panel, wherein the panel actually exhibits a light transmittance from 2.3% to 40% and an optical transmittance of at least 0.6% for at least one wavelength in a range from 420 nm to 480 nm, wherein the cooking device is configured so as to include at least one covering means arranged above, below, or within the panel, which is intended to cover at least part of the internal elements.

German utility model DE 202012012718 U1 discloses an article which has at least one colored light-emitting area, in particular a display area, the article comprising at least one glass ceramic substrate exhibiting a light transmittance from 0.8% to 40% and an optical transmittance of at least 0.1% for at least one wavelength in the range between 420 nm and 780 nm, at least one light source, and at least one filter for providing at least one colored light-emitting area, in particular display area, in at least one portion of the panel.

An object of the invention is to provide a cooktop in which a low-cost commercially available display can be used, in particular with a luminance from 200 to 450 cd/m² (nits), and which permits to provide sufficient luminance above the glass ceramic, in particular more than 100 cd/m² (nits), while at the same time providing a sufficient dead-front effect in the off state of the display, meaning that the display area is not perceivable anymore for an average user without additional aids.

The invention relates to a cooktop for a cooking appliance, such as an induction cooker, which comprises a glass or glass ceramic substrate. The glass or glass ceramic substrate has a substrate outer face facing an exterior and an opposite substrate inner face facing an interior, in particular the interior of the cooktop or cooking appliance.

The cooktop comprises a display device with a display surface for displaying information by emission of light, the display device being arranged in the interior, in particular the interior of the cooktop or cooking appliance, such that light emitted from the display surface passes through the glass or glass ceramic substrate and is perceptible by a user in the exterior.

The display device may in particular be configured as a graphical selectively controllable, preferably colored pixel display. A graphical pixel screen may in particular be a touch display. Advantageously, cost-effective display devices available on the market can be used.

In one of the preferred embodiments, the glass or glass ceramic substrate has an inner coating applied to the inner face of the substrate, which defines at least one display window for the light emitted from the display surface by partially being omitted. In other words, in this embodiment the inner face of the glass ceramic is at least partially provided with an inner coating which is also referred to as a lower surface coating. Within the range of the display window, the substrate inner face may in particular be non-coated so as to define the display window.

A particularly preferred embodiment of a cooktop for a cooking appliance comprises a glass or glass ceramic substrate having a substrate outer face facing an exterior and an opposite substrate inner face facing an interior, in particular an interior of the cooktop or cooking appliance, at least one display device with a display surface for displaying information by emission of light, in particular configured as a graphical selectively controllable, preferably colored pixel display, wherein the display device is arranged in the interior, in particular in the interior of the cooktop or cooking appliance, such that light emitted from the display surface passes through the glass or glass ceramic substrate and is perceptible by a user in the exterior, wherein at least one display window is defined for the light emitted from the display surface, wherein in the area of the display surface or display window, the glass or glass ceramic substrate exhibits a light transmittance ($\tau_{vis}$) in a range from 5% to 70%, preferably in a range from 7% to 55%, more preferably in a range from 9% to 45%, most preferably in a range from 12% to 30%. Advantageously in this case, an arrangement disposed above, below, and/or within the glass or glass ceramic substrate defines the at least one display window for the light emitted from the display surface.

Preferably, an inner coating applied on the inner face of the substrate defines the at least one display window for the light emitted from the display surface by partially being omitted, and thereby in particular forms the arrangement defining the at least one display window for the light emitted from the display surface.

The arrangement arranged above, below, and/or within the glass or glass ceramic substrate, which defines the at least one display window for the light emitted from the display surface preferably comprises, in addition or alternatively, an outer coating, preferably with a partial discontinuity to form a non-coated area which defines the display window, wherein the outer coating is disposed on the substrate outer face, and/or a film or foil with at least a partial discontinuity in a coating or coloration, which is arranged adjacent to the substrate inner face or to the substrate outer face or on the substrate inner face or the substrate outer face and which defines the display window, and/or a carrier material having at least one discontinuity in a coating or coloration, which is arranged adjacent to the substrate inner face or to the substrate outer face or on the substrate inner face or the substrate outer face and which defines the display window, and/or an altered light transmittance of the glass or glass ceramic substrate in the display area and/or in the area surrounding the display area, in particular a lightening or darkening or coloration of the glass or glass ceramic substrate, which defines the display window.

The discontinuity may exhibit a lower or preferably a higher light transmittance, in particular in comparison to an area adjacent to the discontinuity, and may be provided in different manner as described above.

Below, several embodiments for defining such a display window are listed, purely by way of example, which are generally suitable and can also be combined with each other:
(i) a lightening or darkening of a portion of the glass or glass ceramic substrate itself, in particular a lightening in the display area or an at least partial darkening of the area surrounding the display window and/or adjacent to the display window, or a darkening of the display area in combination with a stronger darkening of the area surrounding the display window and/or adjacent to the display window according to any one of the embodiments (i) to (iv);
(ii) an inner coating (lower surface coating) applied to the substrate inner face, or an outer coating (upper surface coating) applied to the substrate outer face, wherein within the range of the display window the substrate inner face or substrate outer face can be non-coated, in particular to define the display window;
(iii) a film in which the display window is formed by an opening or by a discontinuity in a coating or in a coloration, wherein the film is mounted, glued, or laminated on the lower side or on the upper side with respect to the glass or glass ceramic substrate;
(iv) a self-supporting carrier material, such as a plastic or glass sheet or film in which the display window is formed by an opening or by a discontinuity in a coating or in a coloration, and which is mounted below or above the glass or glass ceramic substrate; or
(v) a combination of embodiments according to (i) through (iv), which changes the basic substrate so that the required light transmittance is adjusted in the display area and/or a preferably lower light transmittance is adjusted in the areas surrounding and/or adjacent to the display window.

These embodiments may be combined with each other or may be used alternatively, if a plurality of display windows are provided. In this way, even a single glass or glass ceramic substrate may have differently designed display windows.

The carrier material with at least one opening, coating, or coloration may comprise carrier materials separate from the glass or glass ceramic substrate, such as films or foils, self-supporting substrates such as plastic or glass sheets, in particular tempered glass sheets, or else, as commonly used in induction appliances, insulation materials that include sheet silicates such as mica, or fibrous materials, and may be mounted, glued, or laminated to the lower surface of the glass or glass ceramic substrate or to elements of the appliance's base, such as on light elements, or to mechanical support structures of the cooktop or the cooking appliance.

Also, embodiments are conceivable which comprise a composite arrangement, such as a glass-film-glass laminate. In such arrangements, it is also conceivable to additionally provide coatings which may be formed within the glass or glass ceramic substrate. Also conceivable are embodiments in which a film is applied to an outer face, although such embodiments may have drawbacks in terms of lower temperature and scratch resistance.

Generally, the at least one display window may be defined by an altered light transmittance within the at least one display window relative to the surrounding light transmittance within, above, and/or below the glass or glass ceramic substrate.

In this case it is possible to adjust, in predefined manner, the light transmittance of the display window itself, and/or of those areas which surround the display window in the glass or glass ceramic substrate, within, above, and/or below the glass or glass ceramic substrate, by a modified transmittance, modified scattering behavior, and/or modified reflectance.

Within the range of the display area or display window, the glass or glass ceramic substrate exhibits a light transmittance ($\tau_{vis}$) in a range from 5% to 70%, preferably in a range from 7% to 55%, more preferably in a range from 9% to 45%, most preferably in a range from 12% to 30%.

Furthermore, the following ranges of light transmittance may be provided as well: 5% to 55%, 5% to 45%, 5% to 30%, 7% to 70%, 7% to 45%, 7% to 30%, 9% to 70%, 9% to 55%, 9% to 30%, 12% to 70%, 12% to 55%, or 12% to 45%.

Light transmittance ($\tau_{vis}$) refers to the transmittance for light in the visible spectral range. Light transmittance is in particular determined according to DIN EN 410:2011, section 5.2, and/or ISO 9050:2003, section 3.3.

In one embodiment, the cooktop comprises at least one further display device. It is in particular intended that a further display device with a further display surface for displaying information by emission of light is included, which is in particular configured as a segment display.

The at least one further display device is preferably also arranged in the interior, in particular the interior of the cooktop or cooking appliance, such that light emitted from the display surface passes through the glass or glass ceramic substrate and is perceptible by a user in the exterior.

Furthermore, in a preferred embodiment, the inner coating applied to the inner face of the substrate preferably defines a further display window for the light emitted by the further display surface, by partially being omitted, wherein within the range of the further display surface or the further display window, a light transmittance ($\tau_{vis}$) in particular in a range from 0.5% to 5% is provided. This further display window within, above, and/or below the glass or glass ceramic substrate may also be defined by a coating, a film or a carrier material, preferably by partially being omitted, and/or by the glass or glass ceramic substrate itself by an altered light transmittance, in particular a partial lightening or darkening.

Preferably, it is contemplated that the display surface of the display device which is preferably configured as a graphical display has a luminance of at least 200 cd/m² (candela per square meter), preferably at least 300 cd/m², more preferably at least 400 cd/m², most preferably at least 500 cd/m². Furthermore, it is contemplated that the luminance is at most 2000 cd/m², preferably not more than 1500 cd/m², more preferably not more than 1200 cd/m², yet more preferably not more than 1000 cd/m², and most preferably not more than 800 cd/m².

In a preferred embodiment, a difference $|G_1-G_2|$ between a percentage grayscale value $G_1$ of the display area of the display device in its off state (in particular when viewed through the glass or glass ceramic substrate) and a percentage grayscale value $G_2$ of the inner coating of the glass or glass ceramic substrate (in particular when viewed through the glass or glass ceramic substrate) is less than 5.0%, preferably less than 3.5%, more preferably less than 2.5%, and most preferably less than 1.5%

The grayscale value differences $|G_1-G_2|$ as discussed above as well as below in further embodiments in particular apply if the percentage grayscale values $G_1$ and $G_2$ are determined based on a linear function G as $G_1=G(M_1)$ and $G_2=G(M_2)$ from measured values $M_1$ and $M_2$ as measured using a grayscale meter.

In this case, the measured value $M_1$ corresponds to the display area of the display device in its off state (in particular when viewed through the glass or glass ceramic substrate) and is measured using the grayscale meter.

In other embodiments in which the glass ceramic substrate is not dyed, the measured value $M_1$ corresponds to the display area of the display device in its off state (in particular when viewed through the glass or glass ceramic substrate and through a carrier substrate applied on the inner face or near the inner face of the glass or glass ceramic substrate or a film applied on the inner face or near the inner face of the glass or glass ceramic substrate) and is also measured using the grayscale meter.

In other embodiments, the measured value $M_1$ corresponds to the display surface of the display device in its off state (in particular when viewed through the glass or glass ceramic substrate and through a carrier substrate applied on the outer face or near the outer face of the glass or glass ceramic substrate or a film applied on the outer face or near the outer face of the glass or glass ceramic substrate) and is also measured using the grayscale meter.

In a preferred embodiment, the measured value $M_2$ corresponds to the inner coating of the glass or glass ceramic substrate (in particular when viewed through the glass or glass ceramic substrate) and is likewise measured using the grayscale meter.

In further embodiments, the measured value $M_2$ corresponds to a carrier substrate applied on the inner face or near the inner face of the glass or glass ceramic substrate or to a film applied on the inner face or near the inner face of the glass or glass ceramic substrate (in particular when viewed through the glass or glass ceramic substrate) and is also measured using the grayscale meter.

In yet further embodiments, the measured value $M_2$ corresponds to an outer coating, to a carrier substrate applied on the outer face or near the outer face of the glass or glass ceramic substrate, or to a film applied on the outer face or near the outer face of the glass or glass ceramic substrate (in particular when viewed directly and not through the glass or glass ceramic substrate) and is also measured using the grayscale meter.

Linear function G is defined by the fact that this function (a) matches a percentage grayscale value of 20% to a measured value corresponding to a RAL card with color RAL 9017 and measured by the grayscale meter, and (b) matches a percentage grayscale value of 90% to a measured value corresponding to a RAL card with color RAL 7012 and measured by the grayscale meter. In other words, the straight line defined by linear function G passes through these two reference points.

The grayscale meter comprises a camera and is configured to take a grayscale image of the display surface of the display device in its off state (in particular viewed through the glass or glass ceramic substrate), of the inner coating of the glass or glass ceramic substrate (in particular viewed through the glass or glass ceramic substrate), of the RAL card with color RAL 9017, and of the RAL card with color RAL 7012, and to provide the associated measured values.

Accordingly, the invention relates to a cooktop,
  wherein between a percentage grayscale value $G_1$ of the display surface of the display device in its off state, preferably viewed through the glass or glass ceramic substrate, and
  a percentage grayscale value $G_2$ of the inner coating of the glass or glass ceramic substrate or
  a percentage grayscale value $G_2$ of a film applied to the substrate inner face or applied near the substrate inner face or
  of a carrier material applied to the substrate inner face or applied near the substrate inner face, preferably viewed through the glass or glass ceramic substrate, or
  a percentage grayscale value $G_2$ of an outer coating or
  a percentage grayscale value $G_2$ of a film applied to the substrate outer face or
  a percentage grayscale value $G_2$ of a film applied near the substrate outer face or
  a percentage grayscale value $G_2$ of a carrier material applied to the substrate outer face or applied near the substrate outer face or
  a percentage grayscale value G2 of a darkened portion of the glass or glass ceramic substrate, preferably not viewed through the glass or glass ceramic substrate but directly, a difference $|G_1-G_2|$ is less than 5.0%, preferably less than 3.5%, more preferably less than 2.5%, most preferably less than 1.5%,
  in particular if the percentage grayscale values $G_1$ and $G_2$ are calculated using a linear function G as $G_1=G(M_1)$ and $G_2=G(M_2)$ based on measured values $M_1$ and $M_2$ measured using a grayscale meter;
  wherein the measured value $M_1$ corresponds to the display surface of the display device in its off state, preferably viewed through the glass or glass ceramic substrate and is measured using the grayscale meter, and
  wherein the measured value $M_2$ corresponds to the inner coating of the glass or glass ceramic substrate or
  to the film applied to the substrate inner face or applied near of the substrate inner face, or
  to the carrier material applied to the substrate inner face or applied near the substrate inner face, preferably viewed through the glass or glass ceramic substrate, or
  to the outer coating or to the film applied to the substrate outer face or applied near the substrate outer face or to the carrier material applied to the substrate outer face or applied near the substrate outer face or to the glass or glass ceramic substrate in its darkened portion, preferably not viewed through the glass or glass ceramic substrate, but directly, and is measured using the grayscale meter; and wherein the linear function G is preferably defined by the fact of matching a percentage grayscale value of 20% to a measured value corresponding to a RAL card with color RAL 9017 and measured by the grayscale meter, and matching a percentage grayscale value of 90% to a measured value corresponding to a RAL card with color RAL 7012 and measured by the grayscale meter; and wherein the grayscale meter preferably comprises a camera and is configured to take a grayscale image of the display surface of the display device in its off state, preferably viewed through the glass or glass ceramic substrate, and of the inner coating of the glass or glass ceramic substrate, or of the film applied to the substrate inner face or applied near of the substrate inner face, or of the carrier material applied to the substrate inner face or near the substrate inner face, preferably as viewed through the glass or glass ceramic substrate;

of the outer coating or of the film applied to the substrate outer face or applied near the substrate outer face or of the carrier material applied to the substrate outer face or applied near the substrate outer face or of the glass or glass ceramic substrate in its darkened portion, preferably not viewed through the glass or glass ceramic substrate, but directly;

of the RAL card with color RAL 9017, and of the RAL card with color RAL 7012; and to provide the associated measured values.

Furthermore, the grayscale meter comprises an optical long-pass filter with an edge wavelength, i.e. a wavelength at pure transmittance of 50%, of 590 nm.

The measuring method described above, with which the percentage grayscale values $G_1$ and $G_2$ can be derived, will be described in more detail further below with reference to the figures. The optical long-pass filter will also be defined there in more detail.

According to a further embodiment it is contemplated that between a perceivable color shade $\{L^*_1, a^*_1, b^*_1\}$ or a chroma (colorfullness) $\{a^*_1, b^*_1\}$ of the display surface of the display device in its off state (in particular viewed through the glass or glass ceramic substrate) and a perceivable color shade $\{L^*_2, a^*_2, b^*_2\}$ or a chroma $\{a^*_2, b^*_2\}$ of the inner coating of the glass or glass ceramic substrate (in particular viewed through the glass or glass ceramic substrate), a chroma difference $\Delta C^* = \sqrt{(a^*_2 - a^*_1)^2 + (b^*_2 - b^*_1)^2}$ is less than 8.0, preferably less than 6.0, more preferably less than 4.5, most preferably less than 3.0.

The above chroma differences $\Delta C^*$ apply in particular if the color shades $\{L^*_1, a^*_1, b^*_1\}$ and $\{L^*_2, a^*_2, b^*_2\}$ or chromas $\{a^*_1, b^*_1\}$ and $\{a^*_2, b^*_2\}$ are measured under the following standard conditions: standard illuminant D65 and 2° standard observer, and preferably by respectively placing thereon a color measuring device, e.g. a colorimeter manufactured by Datacolor® (Lawrenceville, N.J. 08648 USA), in particular of the Datacolor® CHECKPLus type, P/N: 1200-1513, S/N 5612.

Preferably, it is intended that the inner coating, in particular when viewed through the glass or glass ceramic element, has a color shade $\{L, a, b\}$ with L smaller than 50 and with negative values for each of a and b. In this manner, the best possible black appearance can be obtained. In particular, it has been found that the L value alone is not sufficient for this purpose. Even with low L values, a substrate sample may appear brownish, reddish, or "warm". Therefore, it is in particular contemplated that the a and b values are negative. Most preferably, L is less than 26, a is in a range from −0.05 to −0.35, and b is in a range from −0.4 to −2.

According to a further embodiment, it is intended that a difference $|\rho_1 - \rho_2|$ between a reflectance $\rho_1$ of the display area of the display device in its off state and a reflectance $\rho_2$ of the inner coating of the glass or glass ceramic substrate is less than 3%, preferably less than 1.5%.

The reflectances are defined as $$\rho_1 = \frac{\int_{S_1}^{S_2} R_1(\lambda) d\lambda}{\int_{S_1}^{S_2} d\lambda} \text{ and } \rho_2 = \frac{\int_{S_1}^{S_2} R_2(\lambda) d\lambda}{\int_{S_1}^{S_2} d\lambda},$$

in particular with integration limits $S_1 = 400$ nm and $S_2 = 700$ nm.

In this case, $R_1(\lambda)$ is the spectral reflectance of the display surface of the display device in its off state, and $R_2(\lambda)$ is the spectral reflectance of the inner coating of the glass or glass ceramic substrate.

Alternatively, it may also be contemplated that the reflectances are defined as the surface albedos $\rho_1 = A_1$ of the display area of the display device in its off state and $\rho_2 = A_2$ of the inner coating of the glass or glass ceramic substrate.

In a further embodiment of the invention, the cooktop comprises an edge contrast minimization area which provides a gradual transition between the grayscale value and/or the color shade of the display surface in its off state (in particular as viewed through the glass or glass ceramic substrate within the range of the display window) and the grayscale value and/or the color shade of the inner coating (in particular as viewed through the glass or glass ceramic substrate).

In this manner, a transition zone is defined which is advantageously useful to reduce the subjective perceptibility of the edge contrast.

In a further embodiment of the invention, the display window and/or the at least one further display window is distinguished by the fact that the partial discontinuity of the inner coating, of the outer coating, of the film, or of the carrier material, or the lightening in the glass or glass ceramic substrate is made in a grid-like manner. In other words, a display window does not need to be entirely non-coated.

The grid-like partial discontinuity may be in the form of lines, dots, a uniform and/or stochastic grid or a dot matrix, in particular so as to cause an average reduction in light transmittance ($\tau_{vis}$). Furthermore, the grid-like partial discontinuity may provide the transition zone described above.

In a preferred embodiment, the display surface and/or the at least one further display surface, when viewed from the exterior through the glass or glass ceramic element, has a luminance of greater than 60 cd/m², preferably greater than 100 cd/m², more preferably greater than 150 cd/m², most preferably greater than 200 cd/m².

The cooktop may furthermore comprise at least one heating element arranged in the interior, for heating cookware placed on the outer face of the substrate.

Furthermore, the cooktop or cooking appliance may comprise at least one infrared sensor arranged in the interior thereof, in particular for measuring a temperature of cookware placed on the outer face of the substrate.

In this case, the glass or glass ceramic substrate preferably exhibits a light transmittance ($\tau_{vis}$) of less than 5%, preferably less than 1%, and most preferably less than 0.5% within the range of the heating element and/or the infrared sensor.

The glass or glass ceramic substrate preferably comprises an LAS system. The glass ceramic element may be volume-dyed, in particular in order to influence light transmittance so as to achieve the aforementioned light transmittance. Furthermore, the glass or glass ceramic substrate may as well be transparent.

Within the range of the display window, the glass or glass ceramic substrate may exhibit a spectral transmittance characteristic in the form of a neutral or gray filter, wherein transmittance varies by not more than ±20%, preferably by not more than ±15%, most preferably by not more than ±10% over the spectral range from 380 nm to 780 nm, preferably over the spectral range from 400 nm to 700 nm, most preferably over the spectral range from 450 nm to 650 nm.

Preferably, the inner coating of the glass or glass ceramic substrate exhibits a light transmittance ($\tau_{vis}$) in a range of <0.5%, preferably in a range of <0.005%, and most preferably in a range from 0 to 0.00005%.

According to one embodiment of the invention it may be contemplated that the substrate outer face of the glass or glass ceramic substrate is provided with an outer coating, in particular an (upper surface) decoration and/or a scratch protection layer. The substrate may also be polished.

Accordingly, a cooktop is also provided in which the substrate outer face of the glass or glass ceramic substrate is provided with an outer coating, in particular in the form of a decoration, and/or is provided with a scratch protection layer, and/or in which the glass or glass ceramic substrate is polished.

The inner coating and/or the outer coating of the glass or glass ceramic substrate may be a sputter-deposited layer and/or may comprise a luster glaze, in particular it may be black thereby influencing or reducing light transmittance. Furthermore, the coating may be made using sol-gel, physical vapor deposition (PVD), and/or PVD including sputtering.

It is furthermore possible to use opaque inner or backside coatings in order to give the glass or glass ceramic substrate a desired appearance. Such inner or backside coatings may comprise so-called clear inks which can be used to predetermine or influence the basic color of the glass or glass ceramic substrate. Such clear inks are usually applied by screen printing. If characters, logos or markings are to be represented, usually inks are used which provide a high contrast to the basic or clear ink. These inks are referred to as deep inks and are applied onto the substrate as a first layer, preferably in a patterned manner. Deep inks usually constitute the first ink layer on the coated side of the glass or glass ceramic substrate. Line widths of less than 0.3 mm are possible here, which requires a very high resolution for the screen printing that is employed. Thereafter, overprinting with a clear ink can be done, which may also be effected in a patterned manner. This may then be followed by sealing of all layers by a sealing layer which is usually applied over the entire surface or, if appropriate, also in a patterned manner. Deep inks are also opaque and cannot be transilluminated in the visible wavelength range, at least when provided with a sealing layer.

Preferred coatings or clear inks comprise inorganically and/or inorganically-organically modified sol-gel layers which form an oxidic network and contain decorative pigments, and after having been cured form a matrix of such an oxidic network with decorative pigments embedded therein. The oxidic network may preferably consist of $SiO_2$, $TiO_2$, $ZrO_2$, $Al_2O_3$ components. Furthermore, organic residues may be included in the network.

As regards pigmented layers, the present disclosure generally distinguishes between deep inks and clear inks. Clear inks can be printed over the entire surface and form a background color of the decoration. If needed, the printing is performed while omitting a display area and also other areas which may include deep inks or further display elements. Deep inks can be used to print logos and decorative patterns. These inks are preferably sol-gel inks with pigments. Deep inks can be chosen so that they have the highest possible contrast to the clear inks and are printed in the areas omitted by the clear inks, in particular in order to represent logos, lines, or the like on the cooktop.

In terms of their composition, clear inks and deep inks differ not only in their color, i.e. in the choice of the color-imparting pigments, but usually also in the size of the effect pigments and in the screen used in screen printing. Deep colors contain smaller effect pigments and can therefore be printed with a finer screen with smaller openings. This permits to improve the printing resolution over that of the clear inks, at the expense of the intensity of the desired effect. Otherwise, the composition of deep and clear inks may be substantially identical.

Pigments that may be added in particular include color-imparting pigments in the form of metal oxides, in particular cobalt oxides/spinels, cobalt-aluminum spinels, cobalt-aluminum-zinc oxides, cobalt-aluminum-silicon oxides, cobalt-titanium spinels, cobalt-chromium spinels, cobalt-aluminum-chromium oxides, cobalt-nickel-manganese-iron-chromium oxides/spinels, cobalt-nickel-zinc-titanium-aluminum oxides/spinels, chromium-iron-nickel-manganese oxides/spinels, cobalt-iron-chromium oxides/spinels, nickel-iron-chromium oxides/spinels, iron-manganese oxide/spinels, iron oxides, iron-chromium oxides, iron-chromium-tin-titanium oxides, copper-chromium spinels, nickel-chromium-antimony-titanium oxides, titanium oxides, zirconium-silicon-iron oxides/spinels.

Preferred pigments are absorption pigments, platelet- or rod-shaped pigments, and coated effect pigments, e.g. based on mica. Also suitable are pigments such as carbon blacks, graphite, and also dyes.

Also, the layers (decorative and optionally sealing layers) may include further constituents such as fillers, preferably nanoscale fillers. Fillers that are envisaged in particular include $SiO_x$ particles, aluminum oxide particles, fumed silica, lime-soda particles, alkali aluminosilicate particles, polysiloxane spheres, borosilicate glass spheres, and/or hollow glass spheres. By choosing the density of the pigments, their content of or in the particular ink, it is possible to ensure that deep colors are opaque, at least in combination with the sealing layer or together with a clear ink and the sealing layer, and that clear inks are sufficiently transmissive for the respective application, at least in a partial range of the visually perceivable spectrum.

Such coatings are highly durable and temperature resistant and can be produced in an almost unlimited variety of visual appearances, depending on the choice of the decorative pigments. However, the patterning of such coatings is a problem, especially if they contain a high proportion of pigments, or if the individual pigment particles are rather large. The latter is for instance the case when platelet-shaped decorative pigments are used to produce metallic or glitter effects.

The decorative pigments and their content in the coating composition can be selected such that with the intended layer thickness of the coating the latter exhibits a transmittance in the visible spectral range of less than 5%. Optionally, such a low transmittance may as well be achieved by a multi-layered coating.

Suitable coating compositions and coatings prepared therefrom are known from DE 10 2008 031 426 A1, and from DE 10 2008 031 428 A1, inter alia.

For example, an opaque coating can be produced by preparing the decorative layer by a sol-gel process in a first step, wherein the layer is applied onto the glass or glass ceramic substrate and cured by firing, and in a second step the decorative layer is covered by a sealing layer, for protection against thermal, chemical, and mechanical impacts and, if desired, to increase the optical density, which sealing layer is also produced by a sol-gel process, wherein for the preparation of the sealing layer inorganic decorative pigments and fillers are mixed with a sol, and wherein the inorganic decorative pigments may comprise platelet-shaped pigment particles and inorganic solid lubricant particles which are added in a ratio ranging from 10:1 to 1:1 wt %, preferably from 5:1 to 1:1 wt %, and more preferably from 3:1 to 1.5:1 wt %, wherein the prepared mixture is then applied onto the glass ceramic substrate provided with the cured decorative layer and is then cured at elevated temperatures.

The cured sealing layer may have the same composition as the cured decorative layer, with the difference that in terms of the number of organic residues the metal oxide network of the sealing layer includes more organic residues than the metal oxide network of the decorative layer, preferably at least 5% more organic residues than the metal oxide network of the decorative layer. Metal oxide network herein also refers to an oxidic network including elements which are semiconducting in elemental form (i.e. in particular also the $SiO_2$ network already mentioned).

The inner coating is preferably even and/or smooth. A homogeneous coating has the advantage of increasing the readability of the information displayed on the display surface.

For example, a transparent glass ceramic (CERAN Cleartrans®) can be used with a TiN coating. Borofloat® may also be used, for example.

The cooktop may comprise a color compensation layer which is preferably provided in the form of a further coating of the glass ceramic element. In particular a color compensation filter (CCF) comes into consideration.

Furthermore, a white balance of the display device may be provided to achieve a color compensation. A color compensation advantageously permits to balance the inherent color of the substrate.

The cooktop may furthermore comprise an electrically conductive layer configured to detect a touch by the user on the substrate outer face facing the exterior. The electrically conductive layer may in particular define sensor cells which enable touch operation by the user.

The electrically conductive layer may be provided as a further coating of the glass or glass ceramic substrate, in particular on the substrate inner face. It may preferably be a single-layer coating.

The electrically conductive layer may, alternatively or additionally, be disposed on the display surface of the display device and/or on the at least one further display surface of the further display device.

The display device and/or the further display device may, for example, be mounted directly to the substrate inner face facing the interior of the cooktop or cooking appliance. Here, the display device can be arranged spaced apart from the substrate inner face.

In a preferred embodiment of the invention, the glass or glass ceramic substrate which may also be provided as a Forte material, has a thickness in a range from 0.1 to 10 millimeters, preferably in a range from 1 to 5 millimeters, most preferably in a range from 2 to 4 millimeters.

The invention further relates to a cooking appliance, in particular an induction cooking appliance with a cooktop.

The invention will now be explained in more detail by way of exemplary embodiments and with reference to the figures, wherein the same and similar elements are partly designated by the same reference numerals, and wherein the features of the different exemplary embodiments may be combined with each other.

In the figures:

FIG. 1 shows the luminance resulting after light transmission through different glass ceramic elements having different light transmittances ($\tau_{vis}$) for two graphical display surfaces with a luminance of 200 cd/m² and 400 cd/m², respectively;

Figure 20:
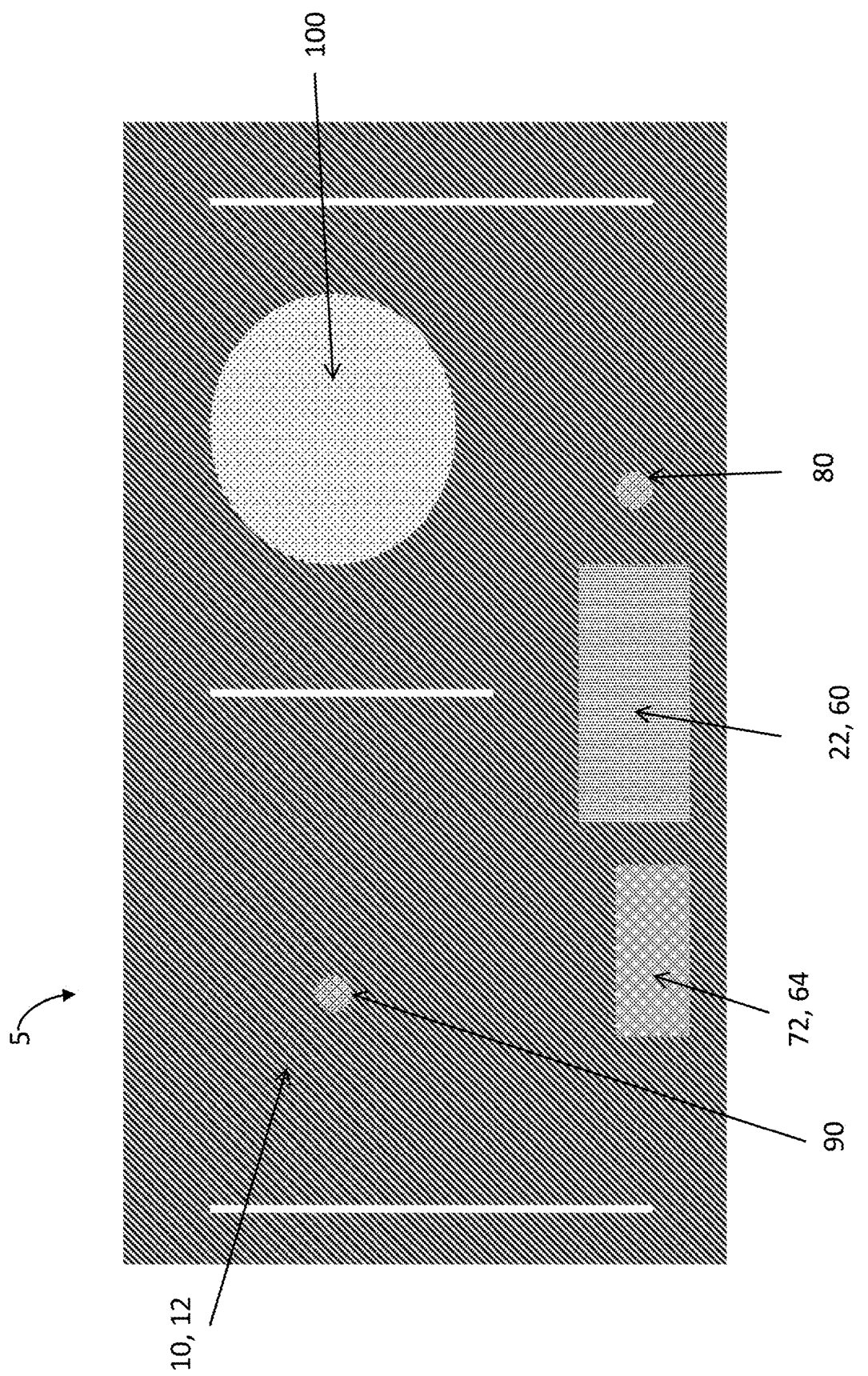
Figure 21:
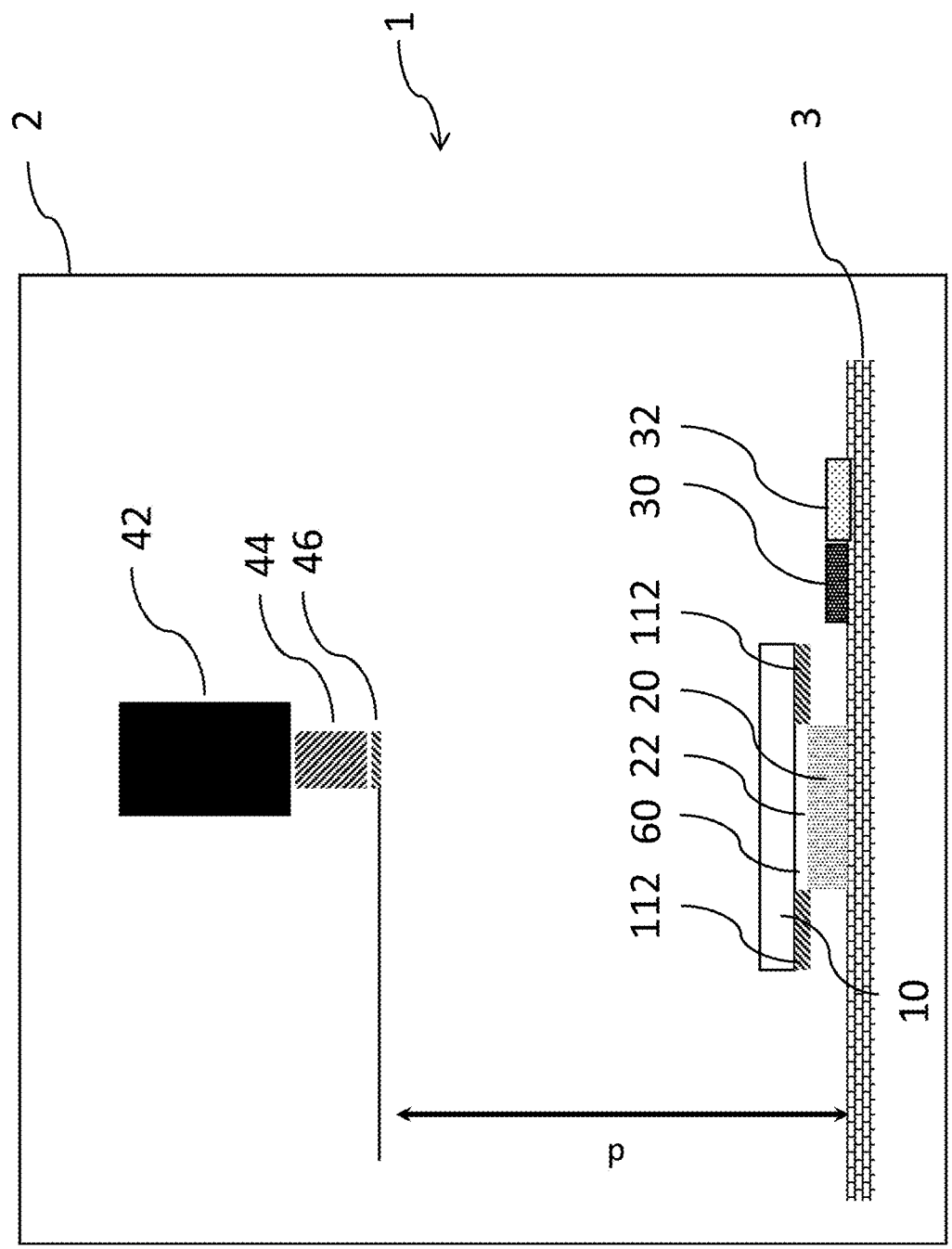
Figure 22:
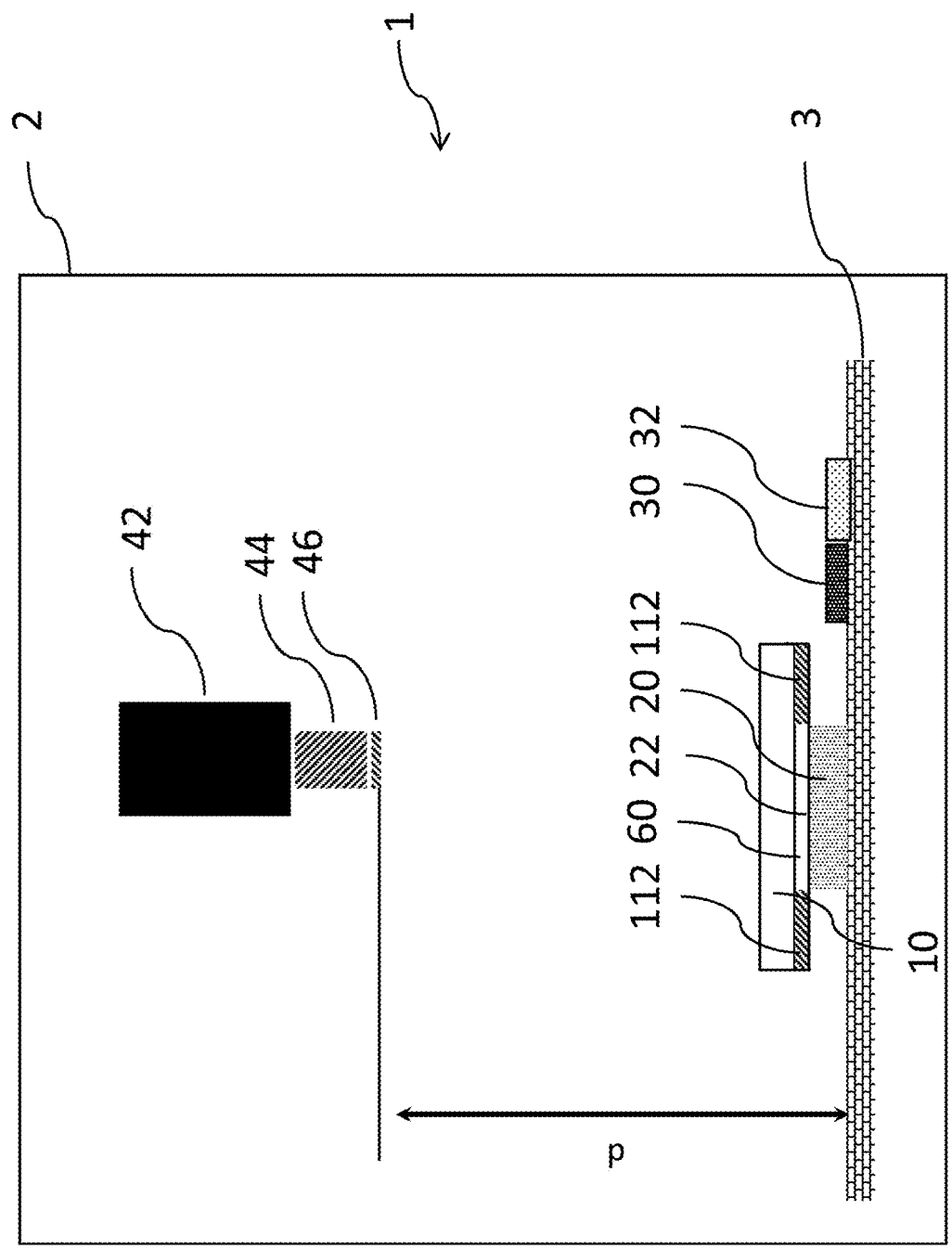
Figure 23:
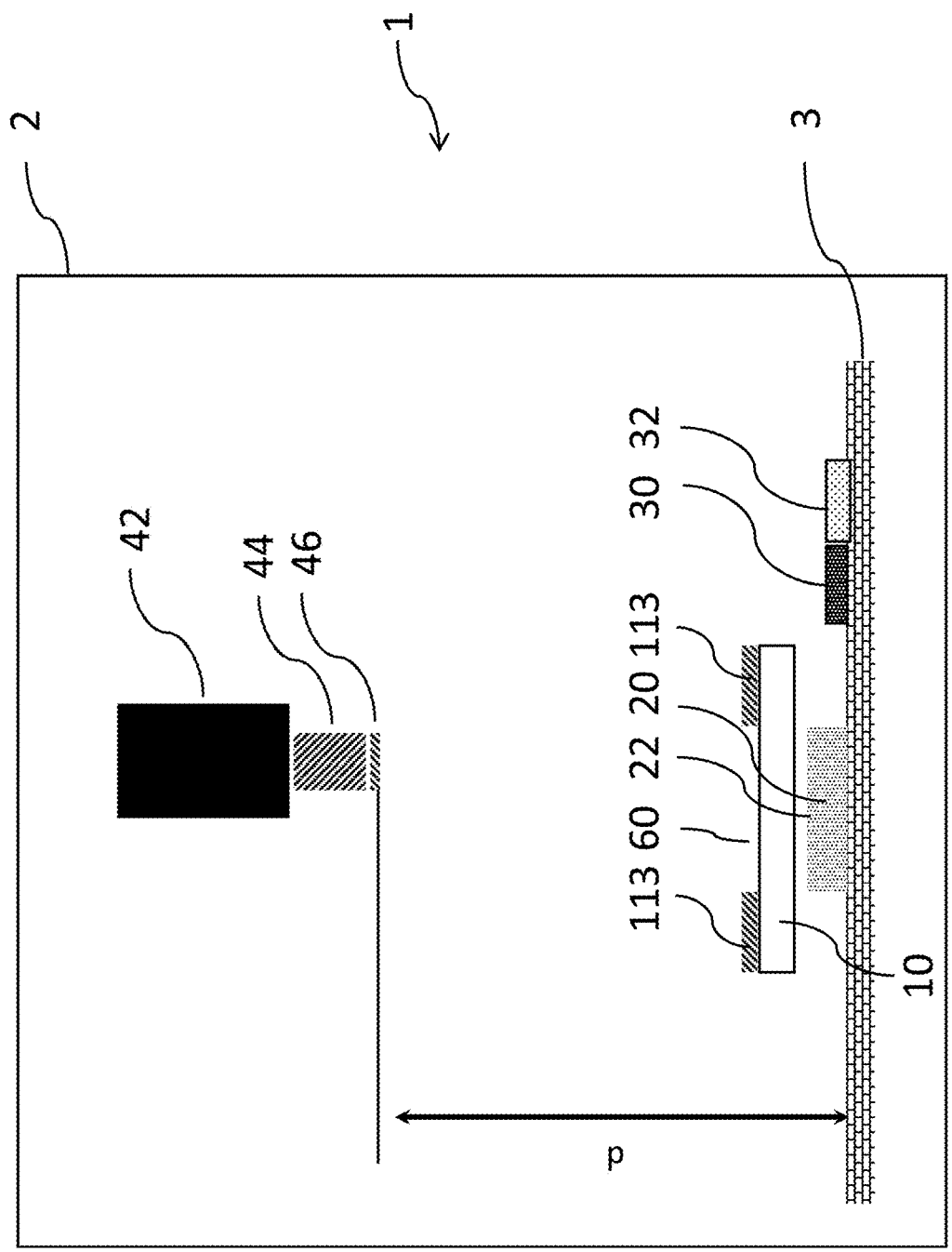
Figure 24:
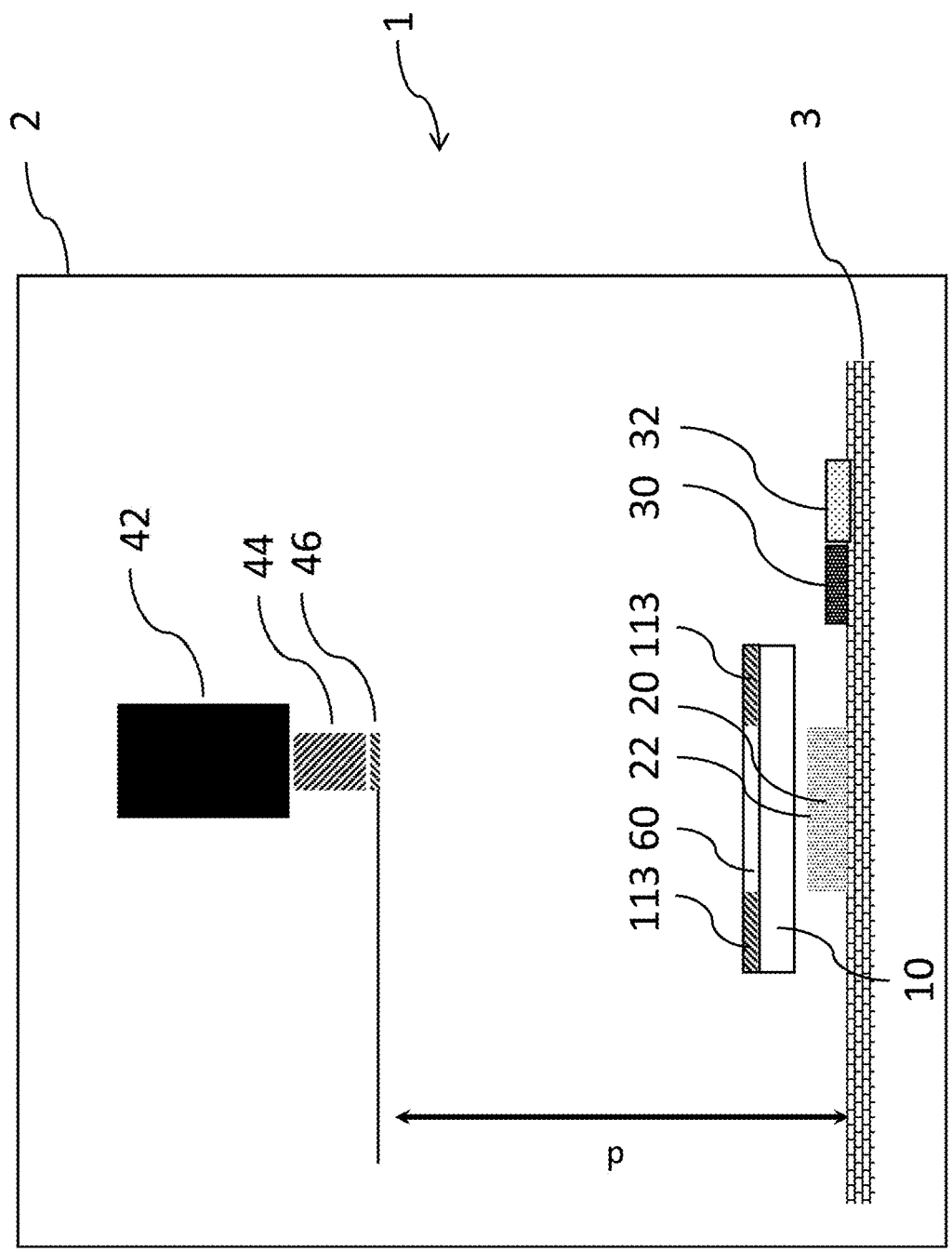
Figure 25:
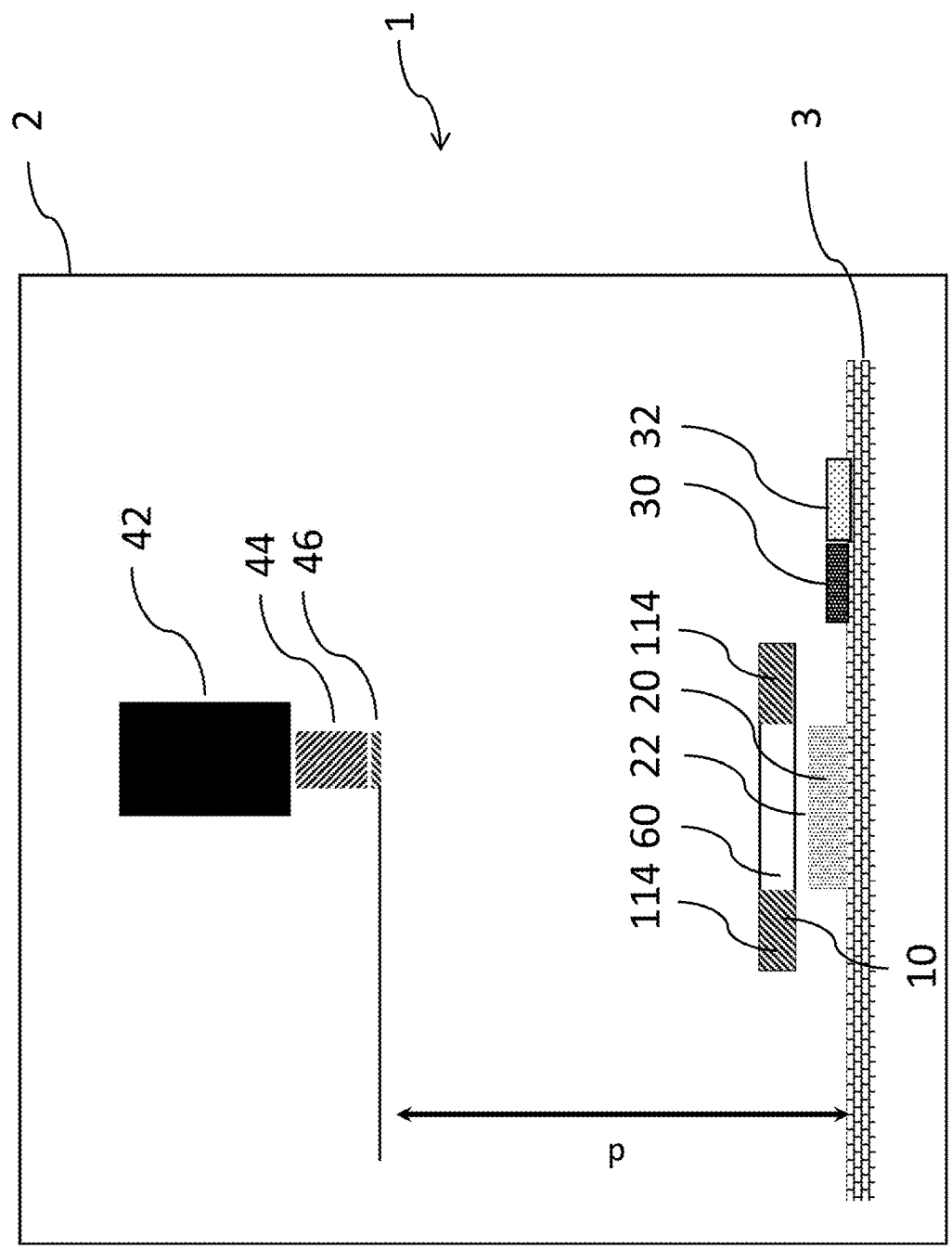

FIG. 20 schematically shows a cooktop;

FIG. 21 is a schematic side view of a grayscale meter for determining a percentage grayscale value ($G_1$) of a display surface of a display device in its off state when viewed through a substrate, and a percentage grayscale value ($G_2$) of a film or carrier material applied on the lower surface of the substrate or near the lower surface of the substrate and having an opening for defining the display window, viewed through the substrate;

FIG. 22 is a schematic side view of a grayscale meter for determining a percentage grayscale value ($G_1$) of a display surface of a display device in its off state when viewed through a substrate, and a percentage grayscale value ($G_2$) of a film or carrier material applied on the lower surface of the substrate or near the lower surface of the substrate and having a lightening for defining the display window, viewed through the substrate;

FIG. 23 is a schematic side view of a grayscale meter for determining a percentage grayscale value ($G_1$) of a display surface of a display device in its off state when viewed through a substrate, and a percentage grayscale value ($G_2$) of a film or carrier material applied on the upper surface of the substrate or near the upper surface of the substrate and having an opening for defining the display window;

FIG. 24 is a schematic side view of a grayscale meter for determining a percentage grayscale value ($G_1$) of a display surface of a display device in its off state when viewed through a substrate, and a percentage grayscale value ($G_2$) of a film or carrier material applied on the upper surface of the substrate or near the upper surface of the substrate and having a lightening for defining the display window;

FIG. 25 is a schematic side view of a grayscale meter for determining a percentage grayscale value ($G_1$) of a display surface of a display device in its off state when viewed through a display window of the substrate, which is defined by a lightening of the glass or glass ceramic substrate, and a percentage grayscale value ($G_2$) of the glass or glass ceramic substrate outside the display window.

For the sake of clarity and for a better understanding of the following description of the preferred embodiments, the figures are not drawn to scale. For brevity, the glass or glass ceramic substrate is sometimes merely referred to as a substrate in the context of the present disclosure.

FIG. 1 shows, for two graphical displays which emit white light with 200 cd/m² and 400 cd/m², respectively, the luminances (circles in the figure) resulting after the emitted light has passed through different prior art glass ceramic substrates of specific light transmittances, i.e. has reached the exterior. Also shown are the luminances of the displays per se, i.e. without the light passing through an additional substrate, and moreover a respective linear fit.

For the prior art glass ceramic substrates, only a luminance of less than 30 cd/m² is obtained exteriorly. What would be desirable, by contrast, is to have a luminance in a range from 100 cd/m² to 140 cd/m², for example, and possibly even higher.

Under the assumption that the luminance in the exterior is a product of light transmittance of the glass ceramic and the luminance of the display surface, a desirable range B of light transmittance of 15 to 50% can be specified, for example. A glass ceramic (GC) substrate according to the invention, for example, has a light transmittance in this range.

Based on the desired luminance of at least 100 cd/m² (nits) in the exterior, the following estimations for light transmittance can in particular be made, by way of example, wherein it is in particular assumed that the light is white light.

a) The display has a luminance of at least 200 cd/m². A light transmittance of at least 50% is provided for the glass or glass ceramic substrate.

b) The display has a luminance of at least 250 cd/m². A light transmittance of at least 45% is provided for the glass or glass ceramic substrate.

c) The display has a luminance of at least 280 cd/m². A light transmittance of at least 45% is provided for the glass or glass ceramic substrate.

d) The display has a luminance of at least 400 cd/m². A light transmittance of at least 25% is provided for the glass or glass ceramic substrate.

e) The display has a luminance of at least 800 cd/m². A light transmittance of at least 12.5%, in particular at least 12%, is provided for the glass or glass ceramic substrate.

f) The display has a luminance of at least 1000 cd/m². A light transmittance of at least 10%, in particular at least 9%, is provided for the glass or glass ceramic substrate.

g) The display has a luminance of at least 1200 cd/m². A light transmittance of at least 8.3%, in particular at least 7%, is provided for the glass or glass ceramic substrate.

h) The display has a luminance of at least 1500 cd/m². A light transmittance of at least 6.7%, in particular at least 5%, is provided for the glass or glass ceramic substrate.

i) The display has a luminance of at least 2000 cd/m². A light transmittance of at least 5%, is provided for the glass or glass ceramic substrate.

Figure 2A:
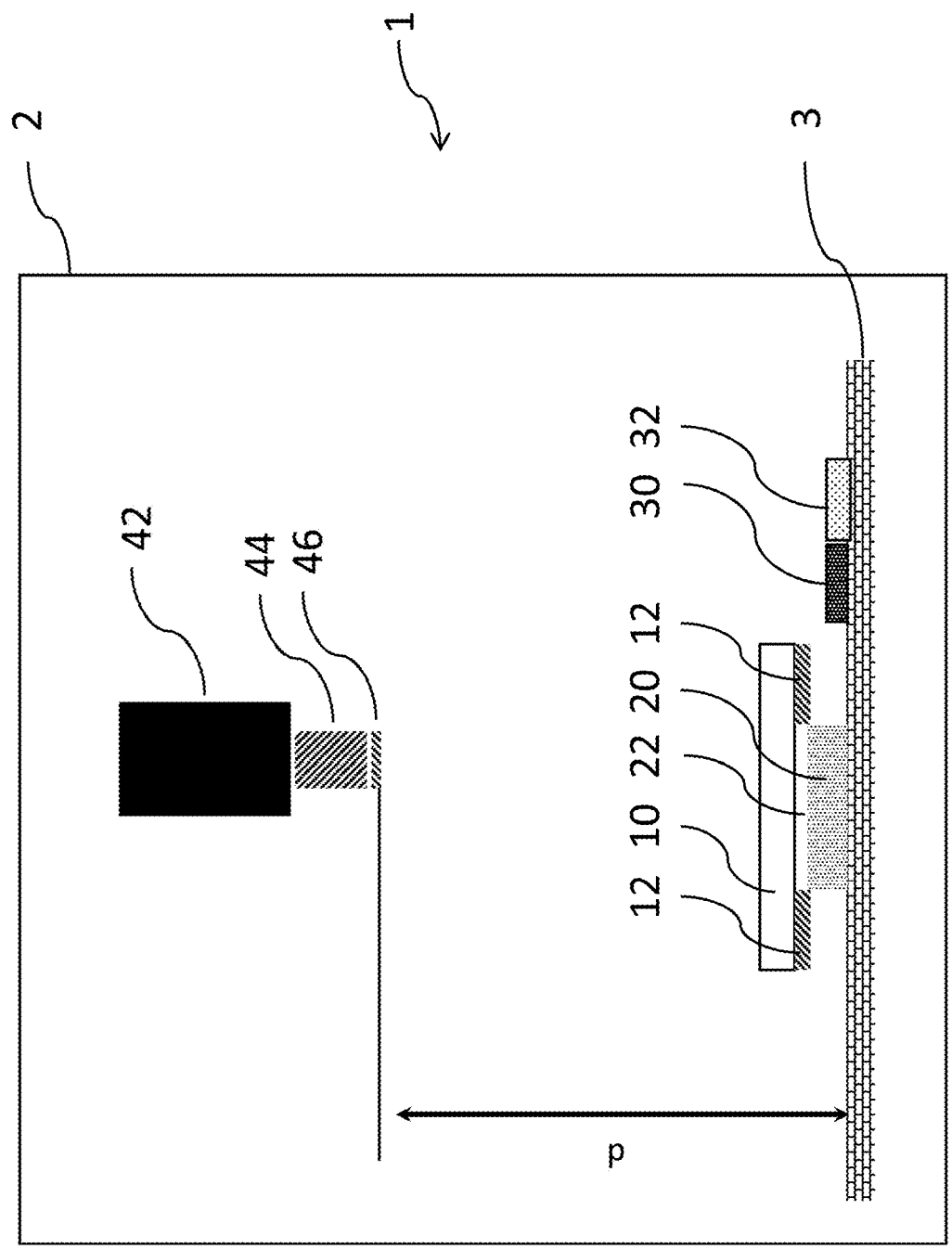
FIG. 2A is a schematic side view of a grayscale meter for determining a percentage grayscale value ($G_1$) of a display surface of a display device in its off state when viewed through a substrate, and a percentage grayscale value ($G_2$) of an inner coating of the substrate viewed through the substrate.
Figure 2B:
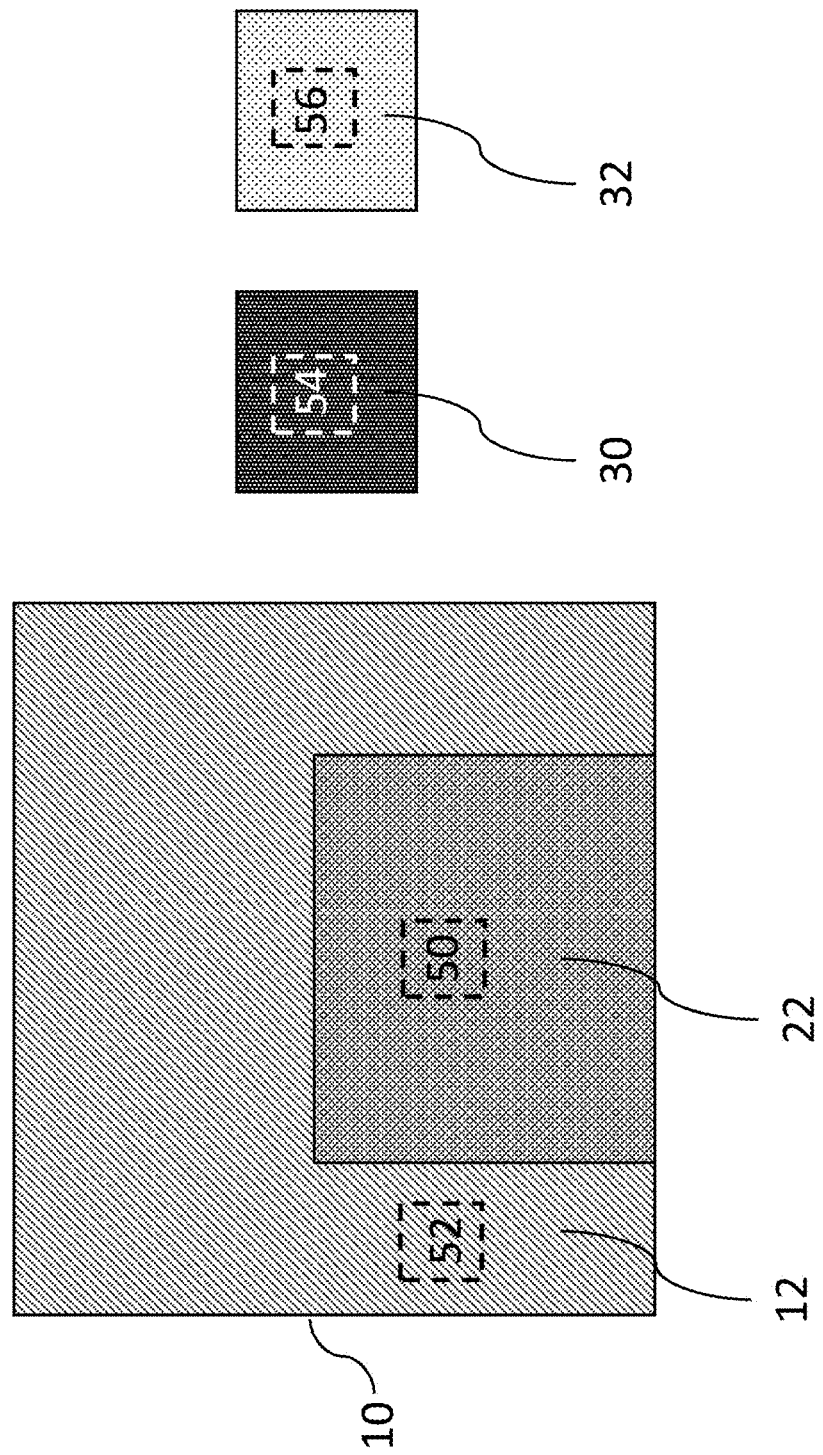
FIG. 2B is a schematic plan view of the substrate and the display device of FIG. 2A.

FIGS. 2A and 2B show a grayscale meter 1 for determining percentage grayscale values, in particular in order to be able to determine grayscale differences between different areas. The measurement setup is located in a darkroom 2 in order to exclude extraneous light.

In the darkroom 2, a display device 20 in the form of a graphical display having a light-emitting display surface 22 is located on a support 3. Above the display, a glass or glass ceramic substrate 10 is arranged, which is partially provided with an inner coating 12 on the lower surface thereof. The substrate covers the display, at least partially.

Furthermore, two RAL cards 30, 32 are placed in the darkroom 2. RAL card 30 has RAL color 9017 (traffic black), and RAL card 32 has RAL color 7012 (basalt gray).

At a distance d, which is for example 606 millimeters, a camera 42 is arranged including an objective lens 44. Optionally, a filter 46 may be mounted in front of the objective lens.

The following components were used in the employed measuring device:

Camera 42 is a acA1920-40 µm grayscale camera of Basler AG, and the objective lens 44 is a LM35HC Megapixel of Kowa GmbH.

In particular, the following camera settings were used, which are taken from the associated log file of the skilled person who handled the grayscale camera:

| | |
|---|---|
| Width | 1920 |
| Height | 1200 |
| OffsetX | 8 |
| OffsetY | 8 |
| CenterX | 0 |
| CenterY | 0 |
| BinningHorizontal | 1 |
| BinningVertical | 1 |
| ReverseX | 0 |
| ReverseY | 0 |
| PixelFormat | Mono8 |
| TestImageSelector | Off |
| GainAuto | Off |
| GainSelector | All |
| Gain | 0.00000 |
| GainSelector | All |
| BlackLevelSelector | All |
| BlackLevel | 0.00000 |
| BlackLevelSelector | All |
| Gamma | 1.00000 |
| RemoveParameterLimitSelector | Gain |
| RemoveParameterLimit | 0 |
| RemoveParameterLimitSelector | Gain |
| ExposureAuto | Off |
| ExposureMode | Timed |
| ExposureTime | 550000.0 |
| AcquisitionBurstFrameCount | 1 |
| TriggerSelector | FrameBurstStart |
| TriggerMode | Off |
| TriggerSelector | FrameStart |
| TriggerMode | Off |
| TriggerSelector | FrameStart |
| TriggerSelector | FrameBurstStart |
| TriggerSource | Line1 |
| TriggerSelector | FrameStart |
| TriggerSource | Line1 |
| TriggerSelector | FrameStart |
| TriggerSelector | FrameBurstStart |
| TriggerActivation | RisingEdge |
| TriggerSelector | FrameStart |
| TriggerActivation | RisingEdge |
| TriggerSelector | FrameStart |
| TriggerDelay | 0 |
| AcquisitionFrameRateEnable | 0 |
| AcquisitionFrameRate | 100.00000 |
| DeviceLinkSelector | 0 |
| DeviceLinkThroughputLimit | 360000000 |
| DeviceLinkSelector | 0 |
| DeviceLinkSelector | 0 |
| DeviceLinkThroughputLimitMode | On |
| DeviceLinkSelector | 0 |
| ChunkSelector | Gain |
| ChunkEnable | 0 |
| ChunkSelector | ExposureTime |
| ChunkEnable | 0 |
| ChunkSelector | Timestamp |
| ChunkEnable | 0 |

-continued

| | |
|---|---|
| ChunkSelector | LineStatusAll |
| ChunkEnable | 0 |
| ChunkSelector | CounterValue |
| ChunkEnable | 0 |
| ChunkSelector | PayloadCRC16 |
| ChunkEnable | 0 |
| ChunkSelector | Timestamp |
| ChunkModeActive | 0 |
| AutoTargetBrightness | 0.30196 |
| AutoFunctionProfile | MinimizeGain |
| AutoGainLowerLimit | 0.00000 |
| AutoGainUpperLimit | 36.00000 |
| AutoExposureTimeLowerLimit | 76.0 |
| AutoExposureTimeUpperLimit | 1000000.0 |

Figure 3:
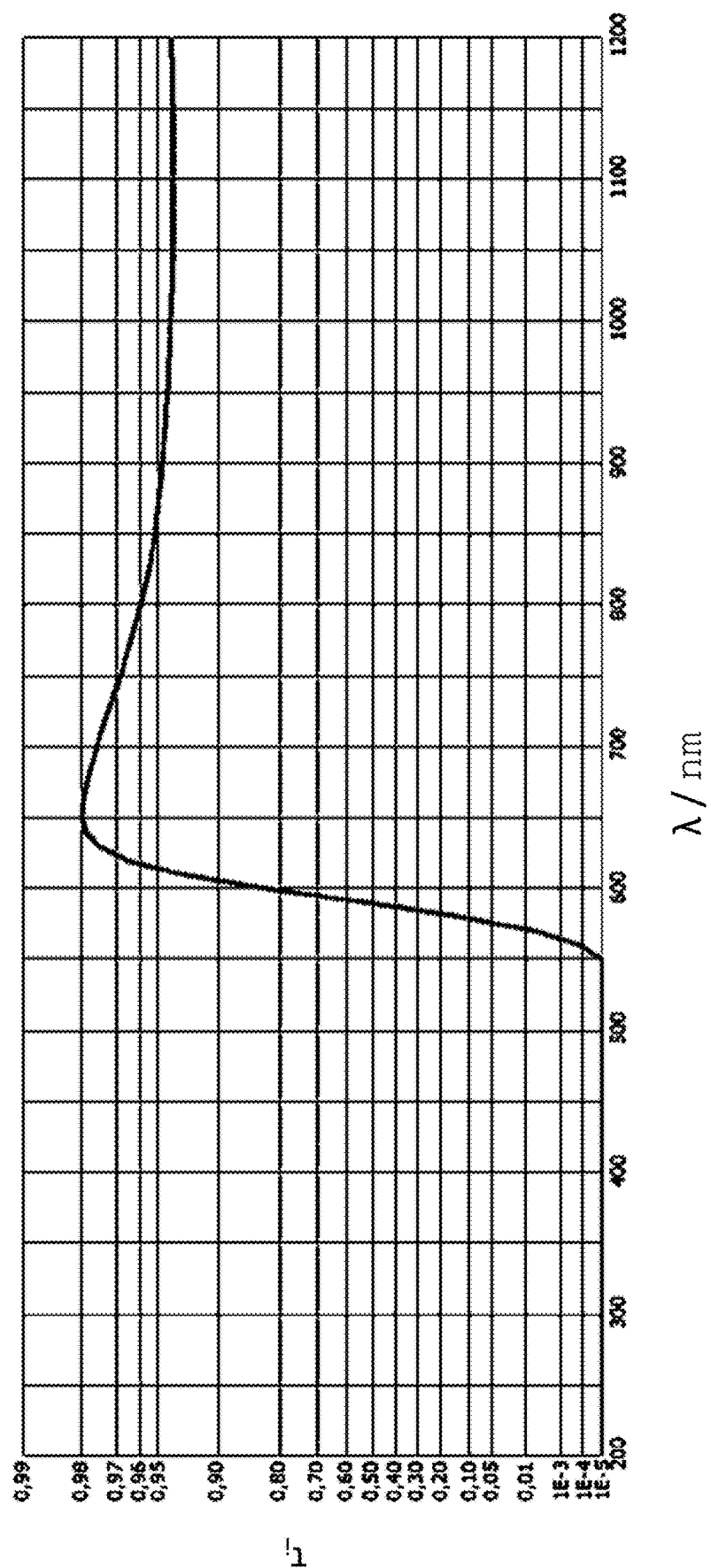
FIG. 3 is a spectral profile of pure transmittance $\tau_1$ of an optical long-pass filter that is employed.

The optional filter 46 is an optical long-pass filter of the "OG590" type, with an edge at 590 nm ("orange filter") of SCHOTT AG. It has been found that a long-pass filter when placed in front of the objective lens 44 is capable of increasing grayscale contrasts. The employed optical filter is distinguished by the spectral profile as shown in FIG. 3 and by the data given in the following tables:

Reflection factor

| | |
|---|---|
| $P_d$ | 0.921 |

Reference thickness

| | |
|---|---|
| d [mm] | 3 |

Spectral guarantee values

| | |
|---|---|
| $\lambda_c$ ($\tau_i$ = 0.5) [nm] | = 590 ± 6 |
| $\lambda_s$ ($\tau_{i,U}$ = 0.00001) [nm] | = 510 |
| $\lambda_p$ ($\tau_{i,L}$ = 0.93) [nm] | = 660 |

Density

| | |
|---|---|
| $\rho$ [g/cm$^3$] | 2.56 |

Bubble content

| | |
|---|---|
| Bubble class | 3 |

Chemical durability

| | |
|---|---|
| FR class | 0 |
| SR class | 1.0 |
| AR class | 1.0 |

Transition temperature

| | |
|---|---|
| $T_g$ [° C.] | 506 |

Thermal expansion

| | |
|---|---|
| $\alpha_{-30/+70° C.}$ [10$^{-6}$/K] | 7.9 |
| $\alpha_{20/300° C.}$ [10$^{-6}$/K] | 9.0 |
| $\alpha_{20/200° C.}$ [10$^{-6}$/K] | |

Temperature coefficient

| | |
|---|---|
| $T_K$ [nm/° C.] | 0.13 |

Colorimetric analysis

| Light type | A (Planck T = 2856 K) | | | Light type | Planck T = 3200 K | | | Light type | D65 ($T_c$ = 6504 K) | | |
|---|---|---|---|---|---|---|---|---|---|---|---|
| d [mm] | 1 | 2 | 3 | d [mm] | 1 | 2 | 3 | d [mm] | 1 | 2 | 3 |
| x | 0.639 | 0.662 | 0.669 | x | 0.635 | 0.660 | 0.667 | x | 0.610 | 0.652 | 0.661 |
| y | 0.354 | 0.338 | 0.331 | y | 0.356 | 0.340 | 0.332 | y | 0.361 | 0.347 | 0.338 |
| Y | 39 | 33 | 30 | Y | 37 | 31 | 28 | Y | 27 | 22 | 19 |
| $\lambda_d$ [nm] | 605 | 609 | 611 | $\lambda_d$ [nm] | 604 | 603 | 611 | $\lambda_d$ [nm] | 602 | 606 | 609 |
| $P_e$ | 0.96 | 1.00 | 1.00 | $P_e$ | 0.95 | 1.00 | 1.00 | $P_e$ | 0.92 | 1.00 | 1.00 |

Refractive index n

| | |
|---|---|
| $n_d$ (587.6 nm) | = 1.510 |
| $n_s$ (852.1 nm) | = 1.510 |
| $n_t$ (1014.0 nm) | = 1.500 |

| $\lambda$ [nm] | $\tau_i$ |
|---|---|
| 200 | <10$^{-5}$ |
| 210 | <10$^{-5}$ |
| 220 | <10$^{-5}$ |
| 230 | <10$^{-5}$ |
| 240 | <10$^{-5}$ |
| 250 | <10$^{-5}$ |
| 260 | <10$^{-5}$ |

-continued

| λ [nm] | τᵢ |
|---|---|
| 270 | <10⁻⁵ |
| 260 | <10⁻⁵ |
| 290 | <10⁻⁵ |
| 300 | <10⁻⁵ |
| 310 | <10⁻⁵ |
| 320 | <10⁻⁵ |
| 330 | <10⁻⁵ |
| 340 | <10⁻⁵ |
| 350 | <10⁻⁵ |
| 360 | <10⁻⁵ |
| 370 | <10⁻⁵ |
| 380 | <10⁻⁵ |
| 390 | <10⁻⁵ |
| 400 | <10⁻⁵ |
| 410 | <10⁻⁵ |
| 420 | <10⁻⁵ |
| 430 | <10⁻⁵ |
| 440 | <10⁻⁵ |
| 450 | <10⁻⁵ |
| 460 | <10⁻⁵ |
| 470 | <10⁻⁵ |
| 480 | <10⁻⁵ |
| 490 | <10⁻⁵ |
| 500 | <10⁻⁵ |
| 510 | <10⁻⁵ |
| 520 | <10⁻⁵ |
| 530 | <10⁻⁵ |
| 540 | <10⁻⁵ |
| 550 | 1.1 · 10⁻⁵ |
| 560 | 1.3 · 10⁻⁴ |
| 570 | 5.9 · 10⁻³ |
| 580 | 0.121 |
| 590 | 0.515 |
| 600 | 0.823 |
| 610 | 0.933 |
| 620 | 0.966 |
| 630 | 0.975 |
| 640 | 0.979 |
| 650 | 0.980 |
| 660 | 0.980 |
| 670 | 0.979 |
| 680 | 0.978 |
| 690 | 0.977 |
| 700 | 0.976 |
| 710 | 0.975 |
| 720 | 0.973 |
| 730 | 0.972 |
| 740 | 0.970 |
| 750 | 0.969 |
| 760 | 0.967 |
| 770 | 0.965 |
| 780 | 0.963 |
| 790 | 0.962 |
| 800 | 0.960 |
| 810 | 0.958 |
| 820 | 0.957 |
| 830 | 0.955 |
| 840 | 0.954 |
| 850 | 0.952 |
| 860 | 0.951 |
| 870 | 0.950 |
| 880 | 0.950 |
| 890 | 0.949 |
| 900 | 0.948 |
| 910 | 0.947 |
| 920 | 0.947 |
| 930 | 0.946 |
| 940 | 0.945 |
| 950 | 0.945 |
| 960 | 0.944 |
| 970 | 0.944 |
| 980 | 0.943 |
| 990 | 0.943 |
| 1000 | 0.943 |
| 1010 | 0.942 |
| 1020 | 0.942 |
| 1030 | 0.942 |

-continued

| λ [nm] | τᵢ |
|---|---|
| 1040 | 0.941 |
| 1050 | 0.941 |
| 1060 | 0.941 |
| 1070 | 0.941 |
| 1080 | 0.941 |
| 1090 | 0.941 |
| 1100 | 0.941 |
| 1110 | 0.941 |
| 1120 | 0.941 |
| 1130 | 0.941 |
| 1140 | 0.941 |
| 1150 | 0.941 |
| 1160 | 0.941 |
| 1170 | 0.942 |
| 1180 | 0.942 |
| 1190 | 0.942 |
| 1200 | 0.942 |
| 1250 | 0.943 |
| 1300 | 0.946 |
| 1350 | 0.949 |
| 1400 | 0.949 |
| 1450 | 0.955 |
| 1500 | 0.959 |
| 1550 | 0.963 |
| 1600 | 0.966 |
| 1650 | 0.968 |
| 1700 | 0.969 |
| 1750 | 0.968 |
| 1800 | 0.966 |
| 1850 | 0.964 |
| 1900 | 0.962 |
| 1950 | 0.960 |
| 2000 | 0.958 |
| 2050 | 0.955 |
| 2100 | 0.952 |
| 2150 | 0.948 |
| 2200 | 0.933 |
| 2250 | 0.929 |
| 2300 | 0.932 |
| 2350 | 0.931 |
| 2400 | 0.927 |
| 2450 | 0.921 |
| 2500 | 0.912 |
| 2550 | 0.902 |
| 2600 | 0.899 |
| 2650 | 0.892 |
| 2700 | 0.834 |
| 2750 | 0.434 |
| 2800 | 0.339 |
| 2850 | 0.338 |
| 2900 | 0.347 |
| 2950 | 0.352 |
| 3000 | 0.345 |
| 3050 | 0.325 |
| 3100 | 0.297 |
| 3150 | 0.265 |
| 3200 | 0.232 |
| 3250 | 0.208 |
| 3300 | 0.190 |
| 3350 | 0.176 |
| 3400 | 0.164 |
| 3450 | 0.157 |
| 3500 | 0.153 |
| 3550 | 0.149 |
| 3600 | 0.147 |
| 3650 | 0.148 |
| 3700 | 0.151 |
| 3750 | 0.156 |
| 3800 | 0.162 |
| 3850 | 0.170 |
| 3900 | 0.176 |
| 3950 | 0.181 |
| 4000 | 0.179 |
| 4050 | 0.168 |
| 4100 | 0.148 |
| 4150 | 0.125 |
| 4200 | 0.101 |

-continued

| λ [nm] | $\tau_i$ |
|---|---|
| 4250 | $7.7 \cdot 10^{-2}$ |
| 4300 | $5.7 \cdot 10^{-2}$ |
| 4350 | $3.9 \cdot 10^{-2}$ |
| 4400 | $2.2 \cdot 10^{-2}$ |
| 4450 | $1.0 \cdot 10^{-2}$ |
| 4500 | $4.7 \cdot 10^{-3}$ |
| 4550 | $1.7 \cdot 10^{-3}$ |
| 4600 | $6.6 \cdot 10^{-4}$ |
| 4650 | $2.5 \cdot 10^{-4}$ |
| 4700 | $1.1 \cdot 10^{-4}$ |
| 4750 | $5.7 \cdot 10^{-5}$ |
| 4800 | $3.2 \cdot 10^{-5}$ |
| 4850 | $1.8 \cdot 10^{-5}$ |
| 4900 | $<10^{-5}$ |
| 4950 | $<10^{-5}$ |
| 5000 | $<10^{-5}$ |
| 5050 | $<10^{-5}$ |
| 5100 | $<10^{-5}$ |
| 5150 | $<10^{-5}$ |

Darkroom 1 also contains LED spots of OSRAM Licht AG with a color temperature of 4000 K, EAN: 4052899944282 (not shown). The LED spots are set such that illuminance on the glass or glass ceramic substrate 10 is 1200 lux. More generally, another light source may be used as well, irrespectively of the particular illuminant, provided that the latter has a color temperature and/or spectral intensity distribution commonly used in households, such as a black-body radiator, in particular a commercially available halogen light source, provided it is capable of producing an illuminance of about 1200 lux. In this manner, a lighting situation is achieved which is typical for cooktops. It should be noted that the measured values determined using the grayscale meter are essentially independent of the illuminance, so that it is also possible to provide another illumination.

For the measurement, the lighting system is switched on and the darkroom is closed. The camera 42 captures a grayscale image of the situation. In other words, the grayscale meter 1 generates a grayscale image imaging at least the following: the display surface 22 of display device 20 in its off state viewed through the glass or glass ceramic substrate 10, the inner coating 12 of the glass or glass ceramic substrate 10 viewed through the glass or glass ceramic substrate 10, RAL card 30 with RAL color 9017, and RAL card 32 with RAL color 7012.

Based on the produced grayscale image, the grayscale meter 1 provides a measured value $M_1$ which corresponds to the display surface 22 of display device 20 in its off state viewed through the glass or glass ceramic substrate.

Furthermore, the grayscale meter 1 provides a measured value $M_2$ which corresponds to the inner coating 12 of the glass or glass ceramic substrate 10 viewed through the glass or glass ceramic substrate 10.

In further embodiments, the measured value $M_2$ corresponds to a carrier substrate 112 applied on the inner face or near the inner face of the glass or glass ceramic substrate 10, or to a film 112 applied on the inner face or near the inner face of the glass or glass ceramic substrate (in particular viewed through the glass or glass ceramic substrate) and is also measured using the grayscale meter 1.

In still further embodiments, the measured value $M_2$ corresponds to an outer coating 113, to a carrier substrate 113 applied on the outer face or near the outer face of the glass or glass ceramic substrate 10, or to a film 113 applied on the outer face or near the outer face of the glass or glass ceramic substrate 10 (in particular viewed directly, and not through the glass or glass ceramic substrate 10) and is also measured using the grayscale meter 1.

In addition, the grayscale meter 1 provides two further measured values corresponding to RAL cards 30 and 32, respectively.

The employed grayscale meter analyzes the grayscale image using image analysis software Halcon SDK Industry 12 of MVTec Software GmbH. It has been found that the measurement is independent of the lighting conditions and the brightness of the illumination, provided that the image is not under- or overexposed. An analysis routine in the software permits to analyze a plurality of measurement windows distributed over the image, in particular the measurement windows 50, 52, 54, 56 shown in FIG. 2B, for their grayscale levels. For each measurement window, it is possible to measure and record the mean value of the grayscale values of all pixels over the measurement area and the standard deviation thereof. In other words, measured values $M_1$, $M_2$ and the measured values of the RAL cards can be obtained as average values over measuring ranges, the measuring ranges each comprising a surface area of at least 0.2 cm$^2$, preferably 0.9 cm$^2$.

Based on the measured values $M_1$, $M_2$ and the measured values of the two RAL cards, each representing absolute values, percentage grayscale values $G_1$ and $G_2$ are calculated. In other words, relative contrasts are calculated as a percentage value in order to make measurements comparable.

For this purpose, a linear function G is defined by the fact that this linear function matches a percentage grayscale value of 20% to a measured value corresponding to the RAL card 30 of color RAL 9017, and matches a percentage grayscale value of 90% to a measured value corresponding to the RAL card 32 of color RAL 7012. In other words, the measured values of RAL cards 9017 and 7012 are referenced as 20% and 90%, respectively, thereby defining a linear conversion for all measured grayscale values.

Using the linear function $G=G(M)$ which converts absolute measured values into percentage grayscale values, the percentage grayscale values $G_1$ and $G_2$ are calculated as $G_1=G(M_1)$ and $G_2=G(M_2)$.

Optionally, additional further RAL cards can be provided in the darkroom, for example with RAL color 9003 (signal white), RAL color 9006 (white aluminum), and/or RAL color 7038 (agate gray). Unlike in the views of FIGS. 2 and 3, the RAL cards may as well be placed on or directly adjacent to the display. Furthermore, the RAL cards may as well be at least partially covered by the glass or glass ceramic substrate 10.

FIGS. 4 to 15 show grayscale value differences $|G_1-G_2|$ or chroma differences $\Delta C^*$ as determined for 18 different glass or glass ceramic substrates (samples 1 to 18) which are distinguished by different light transmittances ($\tau_{vis}$), with light transmittance varying over a wide range, namely between 12% and 70%. For fabricating the respective glass or the respective glass ceramic, it is possible to use in particular the compositions listed, in percent by weight, at the end of the description. The data points in the figures shown at a light transmittance of 84.2% and 91.5% correspond to highly transmissive samples (SCHOTT CERAN Cleartrans®, and SCHOTT B270® Superwite).

Figure 4:
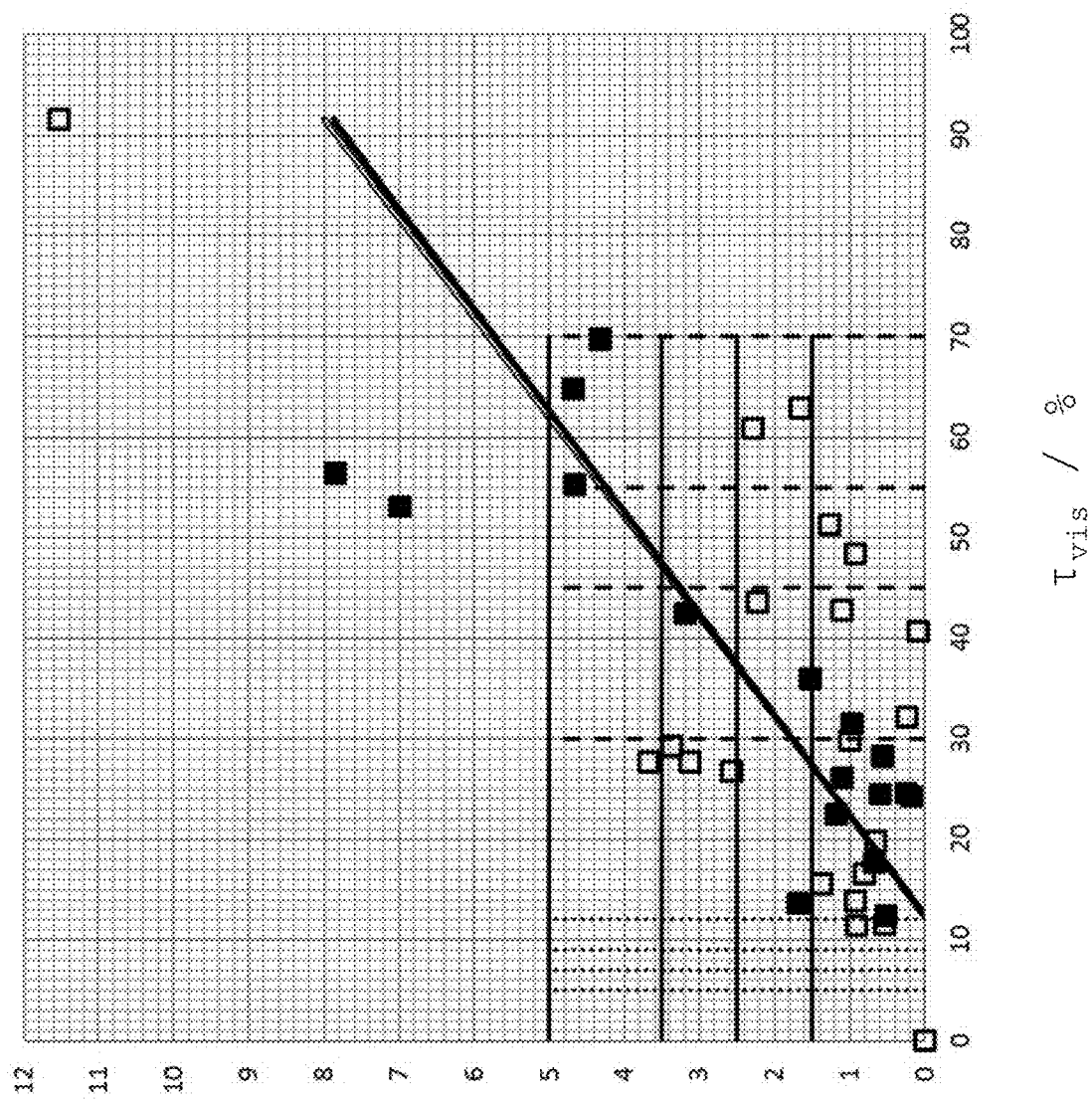
FIG. 4 shows grayscale value differences $|G_1-G_2|$ as determined for different glass or glass ceramic substrates (in particular samples 1-18: black squares) with a first inner coating and for a first display surface, as a function of light transmittance ($\tau_{vis}$) of the glass or glass ceramic substrates.
Figure 5:
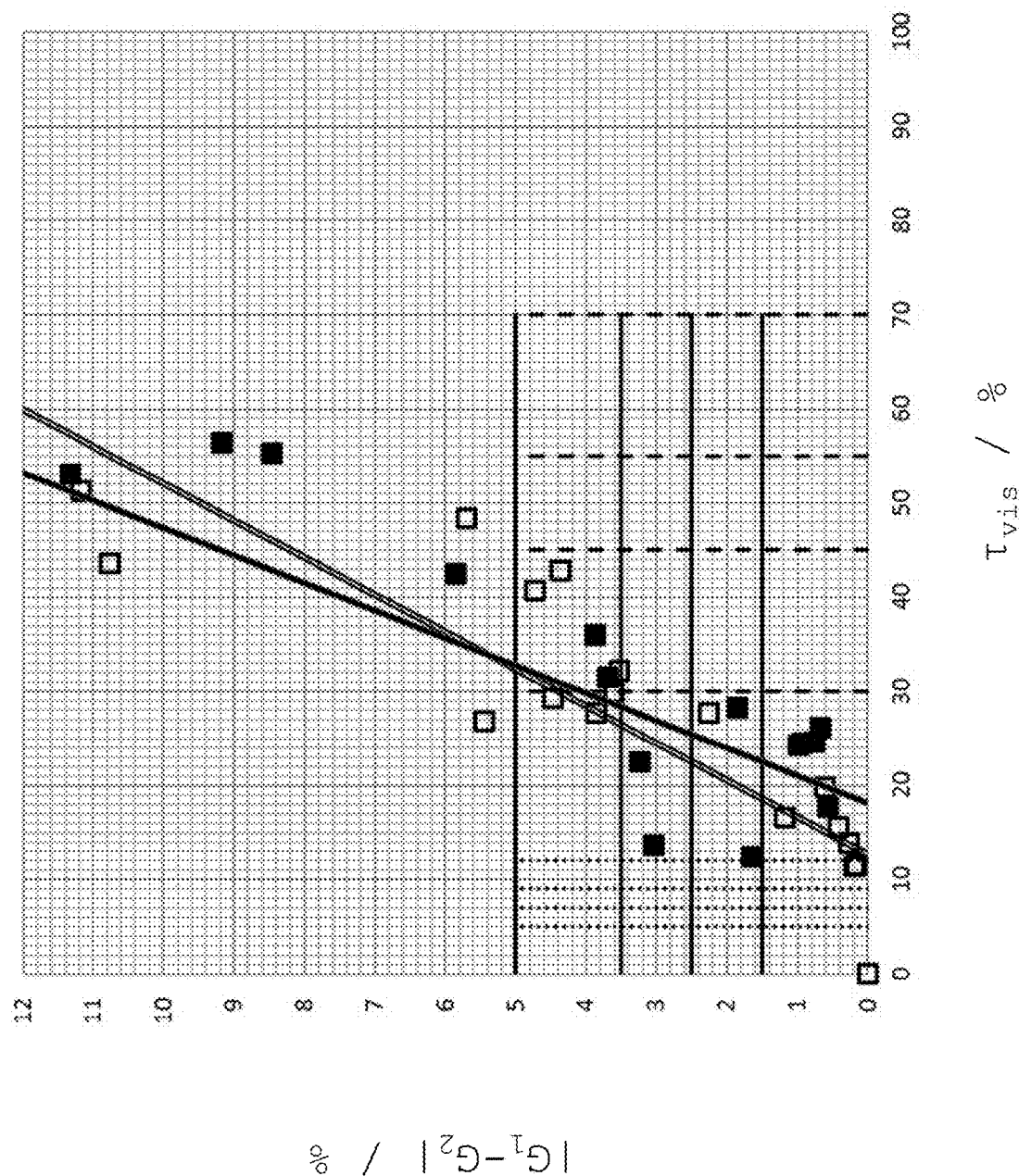
FIG. 5 shows grayscale value differences $|G_1-G_2|$ as determined for the different glass or glass ceramic substrates (in particular samples 1-18: black squares) with a second inner coating and for the first display surface, as a function of light transmittance ($\tau_{vis}$) of the glass or glass ceramic substrates.

FIGS. 4 and 5 show grayscale value differences $|G_1-G_2|$ determined by grayscale meter 1 for different glass or glass ceramic substrates 10 that have a first (FIG. 4) or a second (FIG. 5) inner coating 12, respectively, and for a first display device 20 having a first display surface 22, as a function of the light transmittance ($\tau_{vis}$) of the glass or glass ceramic substrates.

Inner coating 12 has a light transmittance ($\tau_{vis}$) in a range of <0.5%. For the display device 20, light transmittance is preferably in a range of <0.005%. In a further, preferred embodiment, the light transmittance $\tau_{vis}$ of the inner coating is in a range from 0 to 0.00005%.

The first inner coating, when applied for example on one of the surfaces of a highly transmissive substrate, in particular SCHOTT B270® Superwite or SCHOTT CERAN Cleartrans®, is distinguished by the fact of producing on the opposite substrate surface, viewed through the substrate, a perceivable color shade {L*, a*, b*} with 27.9<L*<28.4 and −0.16<a*<0.06 and −0.47<b*<0.13. Accordingly, chroma (colorfulness) is 0.15<C*<0.49.

The second inner coating, when applied for example on one of the surfaces of a highly transmissive substrate, in particular SCHOTT B270® Superwite or SCHOTT CERAN Cleartrans®, is distinguished by the fact of producing on the opposite substrate surface, viewed through the substrate, a perceivable color shade {L*, a*, b*} with 28.6<L*<29.0 and −0.58<a*<−0.52 and −1.72<b*<−1.31. Accordingly, chroma (colorfulness) is 1.43<C*<1.80.

The first display surface 22 of first display device 20 is distinguished by the fact that, when viewed directly, it has a perceivable color shade {L*, a*, b*} with 43.5<L*<43.7 and −0.43<a*<−0.41 and −1.63<b*<−1.61. Accordingly, chroma (colorfulness) is 1.66<C*<1.68.

The above color shades in particular appear when measured under the following standard conditions: D65 standard illuminant and 2° standard observer, and preferably by respectively placing thereon a color measuring device, e.g. a colorimeter manufactured by Datacolor® (Lawrenceville, N.J. 08648 USA), in particular of the Datacolor® check$^{plus}$ type, P/N: 1200-1513, S/N 5612.

Figure 6:
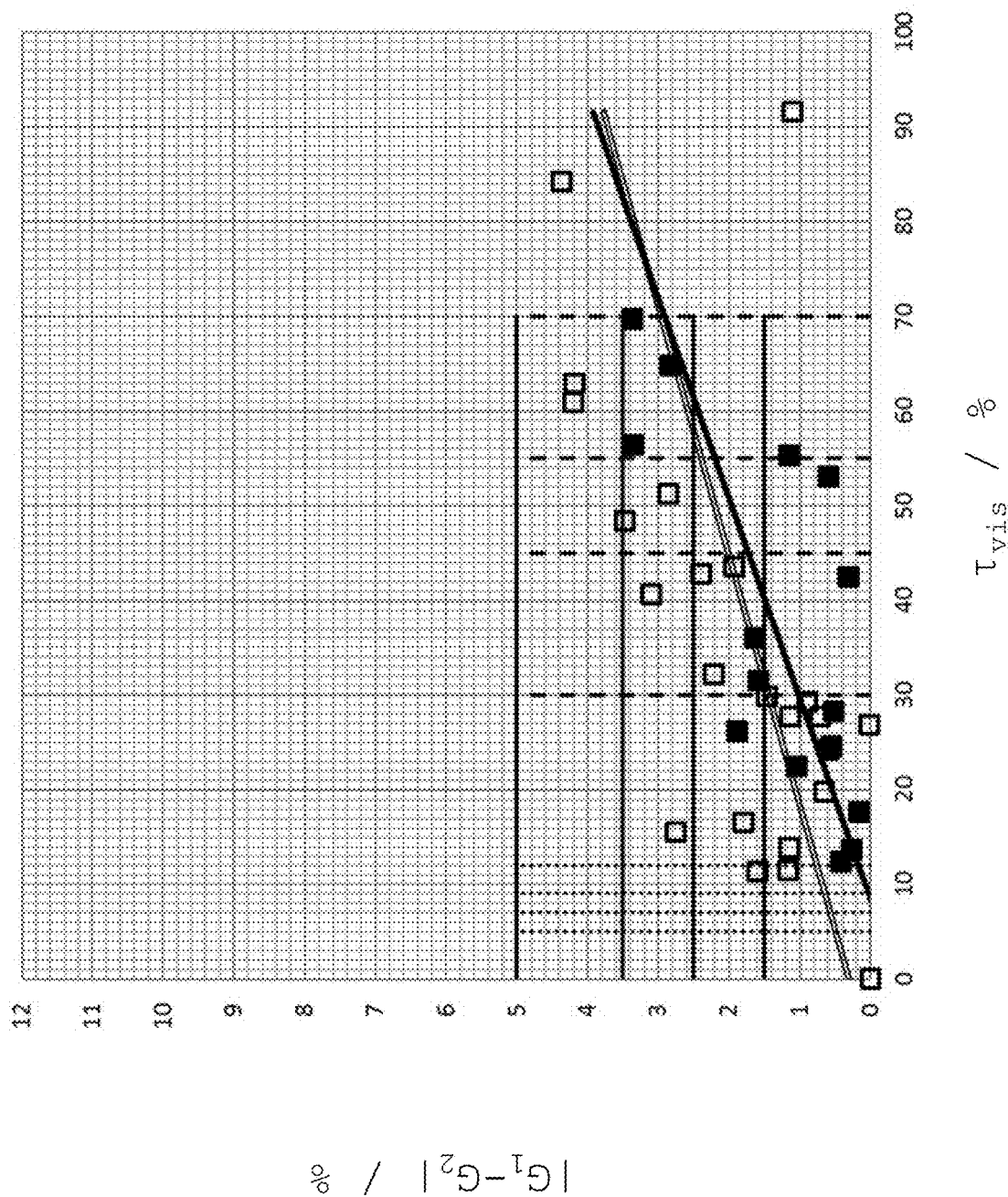
FIG. 6 shows grayscale value differences $|G_1-G_2|$ as determined for the different glass or glass ceramic substrates (in particular samples 1-18: black squares) with the first inner coating and for a second display surface, as a function of light transmittance ($\tau_{vis}$) of the glass or glass ceramic substrates.
Figure 7:
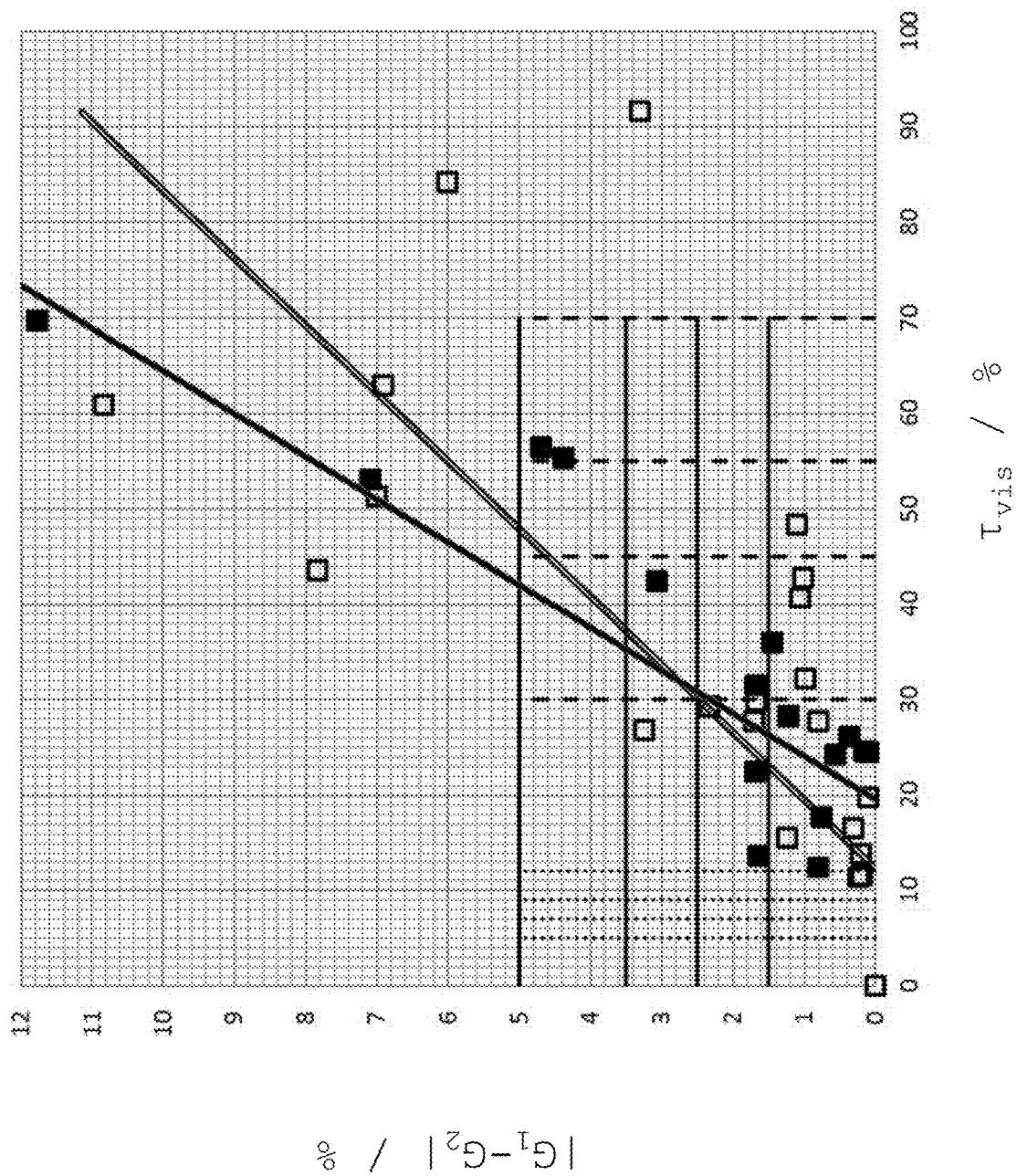
FIG. 7 shows grayscale value differences $|G_1-G_2|$ as determined for the different glass or glass ceramic substrates (in particular samples 1-18: black squares) with the second inner coating and for the second display surface, as a function of light transmittance ($\tau_{vis}$) of the glass or glass ceramic substrates.

FIGS. 6 and 7 show grayscale value differences |$G_1$−$G_2$| determined by grayscale meter 1 for the different glass or glass ceramic substrates 10 with the first (FIG. 6) or second (FIG. 7) inner coating 12, respectively, and for a second display device 20 with a second display surface 22, as a function of the light transmittance ($\tau_{vis}$) of the glass or glass ceramic substrates.

The second display surface 22 of second display device 20 is distinguished by the fact that, when viewed directly, it has a perceivable color shade {L*, a*, b*} with 31.5<L*<31.7 and −1.98<a*<−1.96 and 2.58<b*<2.60. Accordingly, chroma (colorfulness) is 3.24<C*<3.26.

The above color shade in particular appears when again measured under the aforementioned standard conditions and preferably by respectively placing thereon a colorimeter, e.g. of the aforementioned type.

Figure 8:
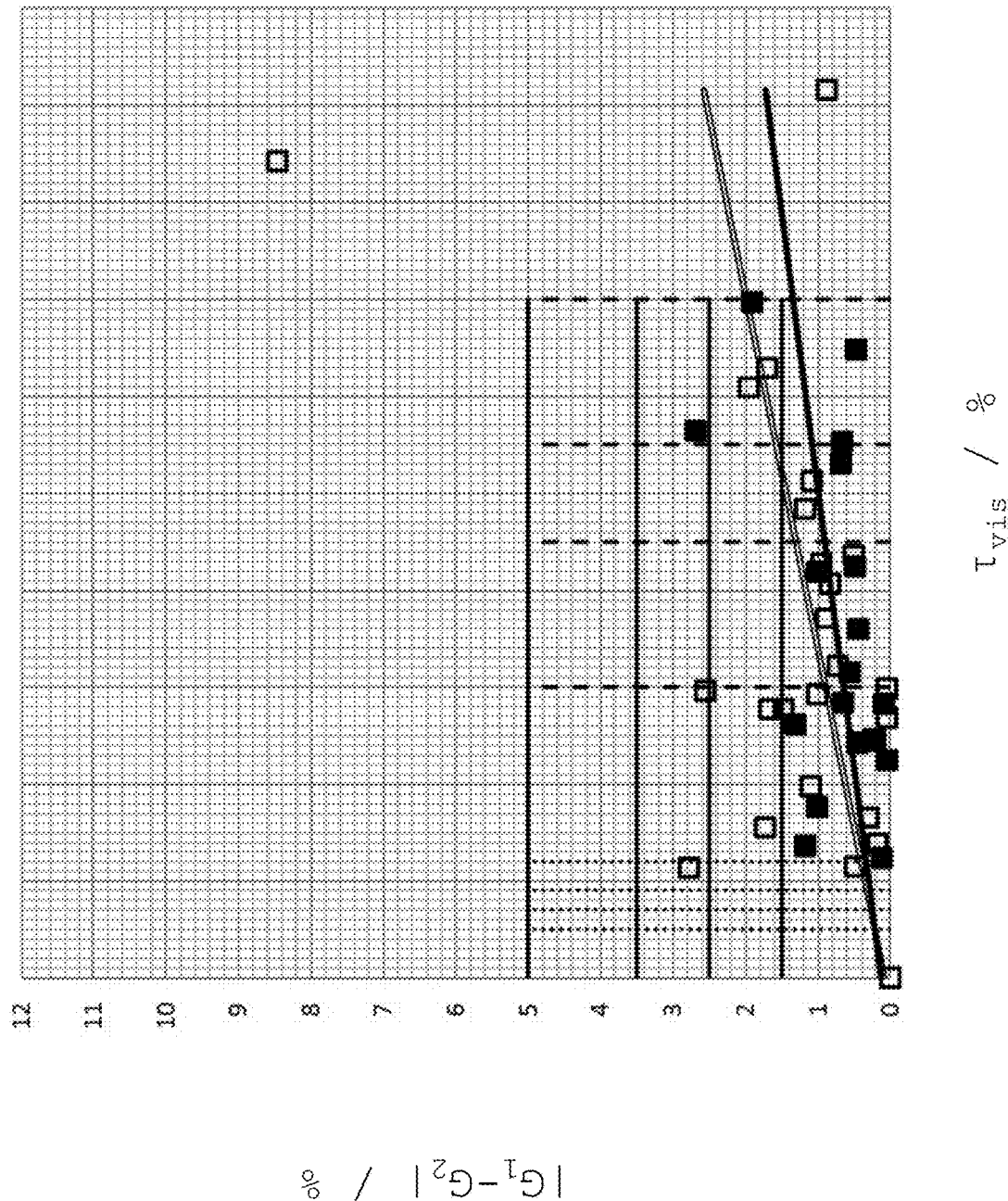
FIG. 8 shows grayscale value differences $|G_1-G_2|$ as determined for the different glass or glass ceramic substrates (in particular samples 1-18: black squares) with the first inner coating and for a third display surface, as a function of light transmittance ($\tau_{vis}$) of the glass or glass ceramic substrates.
Figure 9:
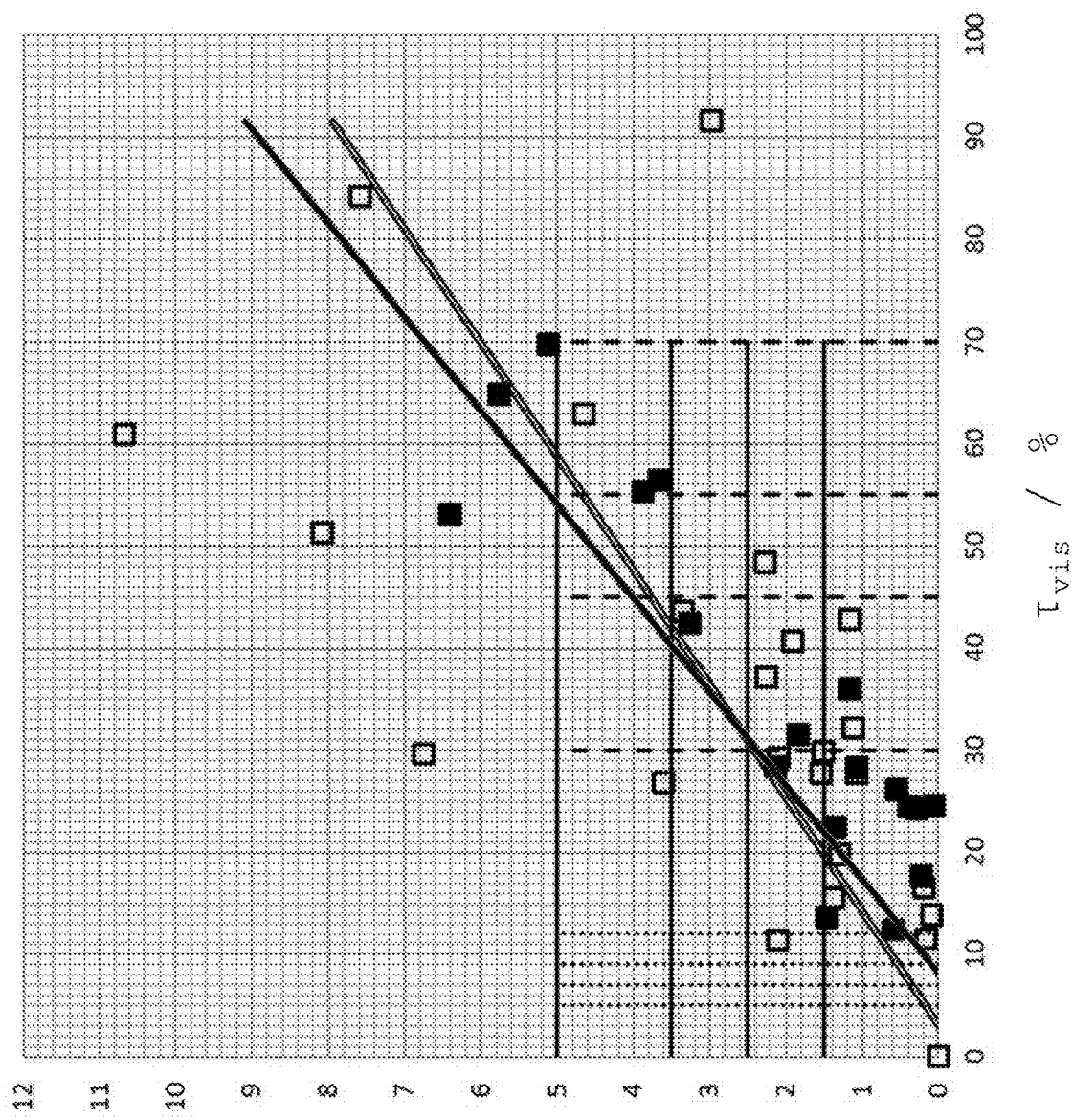
FIG. 9 shows grayscale value differences $|G_1-G_2|$ as determined for the different glass or glass ceramic substrates (in particular samples 1-18: black squares) with the second inner coating and for the third display surface, as a function of light transmittance ($\tau_{vis}$) of the glass or glass ceramic substrates.

FIGS. 8 and 9 show grayscale value differences |$G_1$−$G_2$| determined by grayscale meter 1 for the different glass or glass ceramic substrates 10 with the first (FIG. 8) or second (FIG. 9) inner coating 12, respectively, and for a third display device 20 with a third display surface 22, as a function of the light transmittance ($\tau_{vis}$) of the glass or glass ceramic substrates.

The third display surface 22 of third display device 20 is distinguished by the fact that, when viewed directly, it has a perceivable color shade {L*, a*, b*} with 27.4<L*<27.6 and −0.66<a*<−0.64 and 0.43<b*<0.45. Accordingly, chroma (colorfulness) is 0.77<C*<0.79.

The above color shade in particular appears when again measured under the aforementioned standard conditions and preferably by respectively placing thereon a colorimeter, e.g. of the aforementioned type.

In FIGS. 4 to 9, the grayscale value difference (contrast difference) of 5.0% is shown as a horizontal solid line. It has been found that values below 5.0% are barely perceptible to the human eye. In other words, a dead-front effect is achieved. For an even better dead-front effect, a grayscale value difference of less than 3.5% is preferred, more preferably less than 2.5%, and most preferably less than 1.5%. To determine these values, a statistical analysis was carried out, the results of which are shown in FIGS. 16A to 16D.

Figure 10:
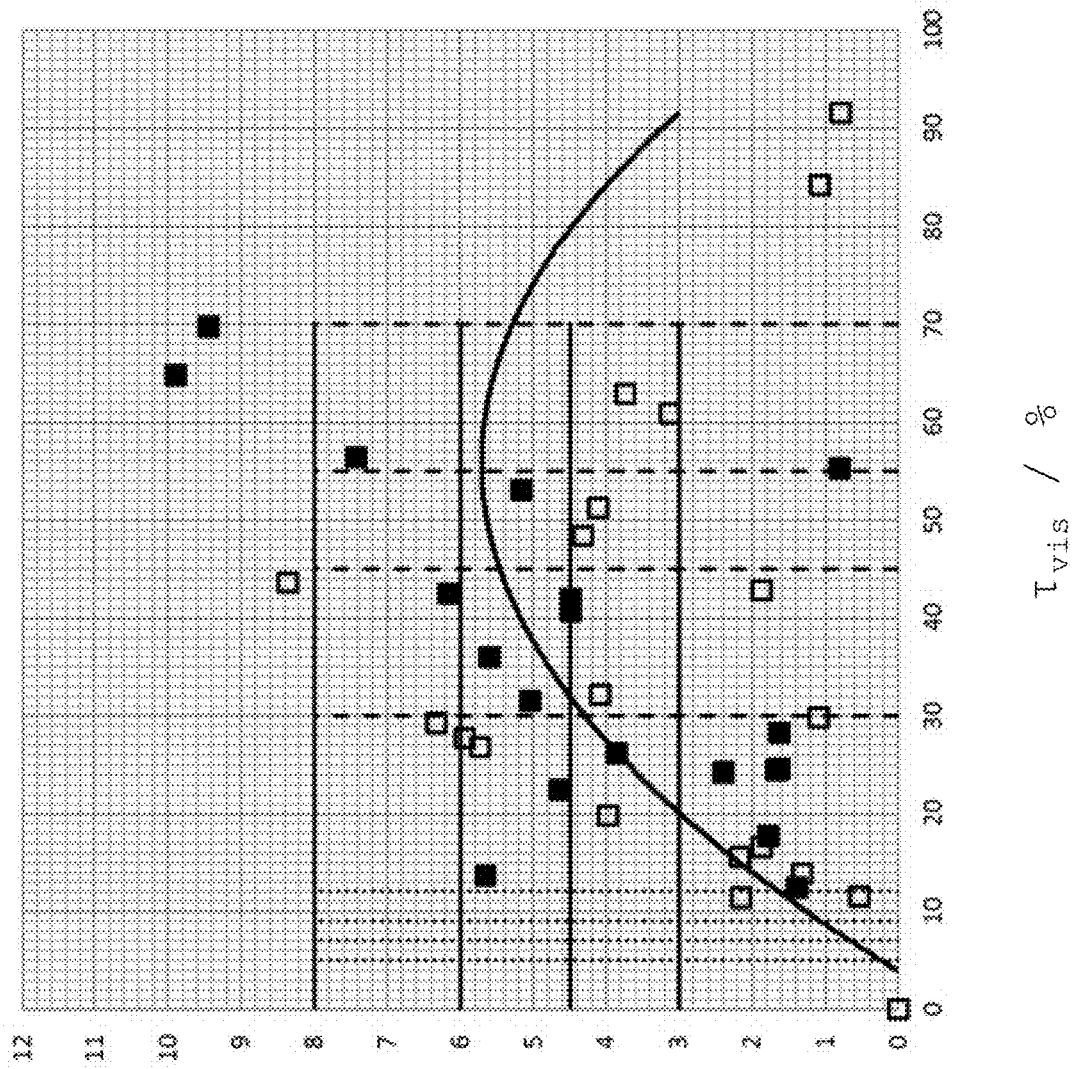
FIG. 10 shows chroma differences $\Delta C^*$ as determined for the different glass or glass ceramic substrates (in particular samples 1-18: black squares) with the first inner coating and for the first display surface, as a function of light transmittance ($\tau_{vis}$) of the glass or glass ceramic substrates.
Figure 11:
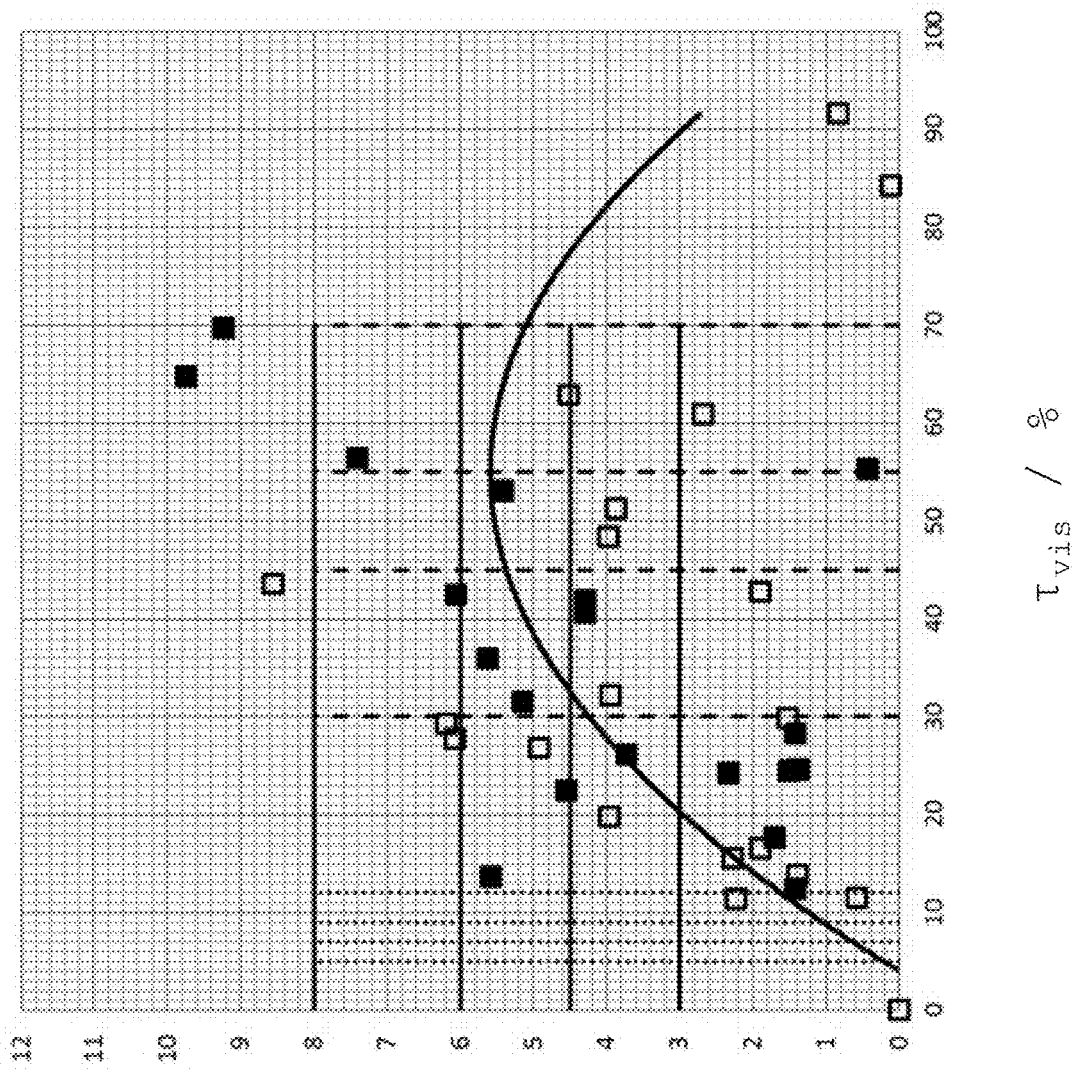
FIG. 11 shows chroma differences $\Delta C^*$ as determined for the different glass or glass ceramic substrates (in particular samples 1-18: black squares) with the second inner coating and for the first display surface, as a function of light transmittance ($\tau_{vis}$) of the glass or glass ceramic substrates.

FIGS. 10 and 11 show chroma differences ΔC* as determined by a colorimeter for the different glass or glass ceramic substrates 10 with the first (FIG. 10) and second (FIG. 11) inner coating 12, respectively, and for the first display device 20 with the first display surface 22, as a function of the light transmittance ($\tau_{vis}$) of the glass or glass ceramic substrates.

The chroma differences ΔC* refer to the difference in chromas between a chroma {$a^*_1$, $b^*_1$} of the display surface of the display device in its off state when viewed through the glass or glass ceramic substrate, and a chroma {$a^*_2$, $b^*_2$} of the inner coating of the glass or glass ceramic substrate when viewed through the glass or glass ceramic substrate.

The chromas are again measured under the following standard conditions: standard illuminant D65 and 2° standard observer, and preferably by respectively placing thereon a colorimeter, e.g. of the aforementioned type.

Figure 12:
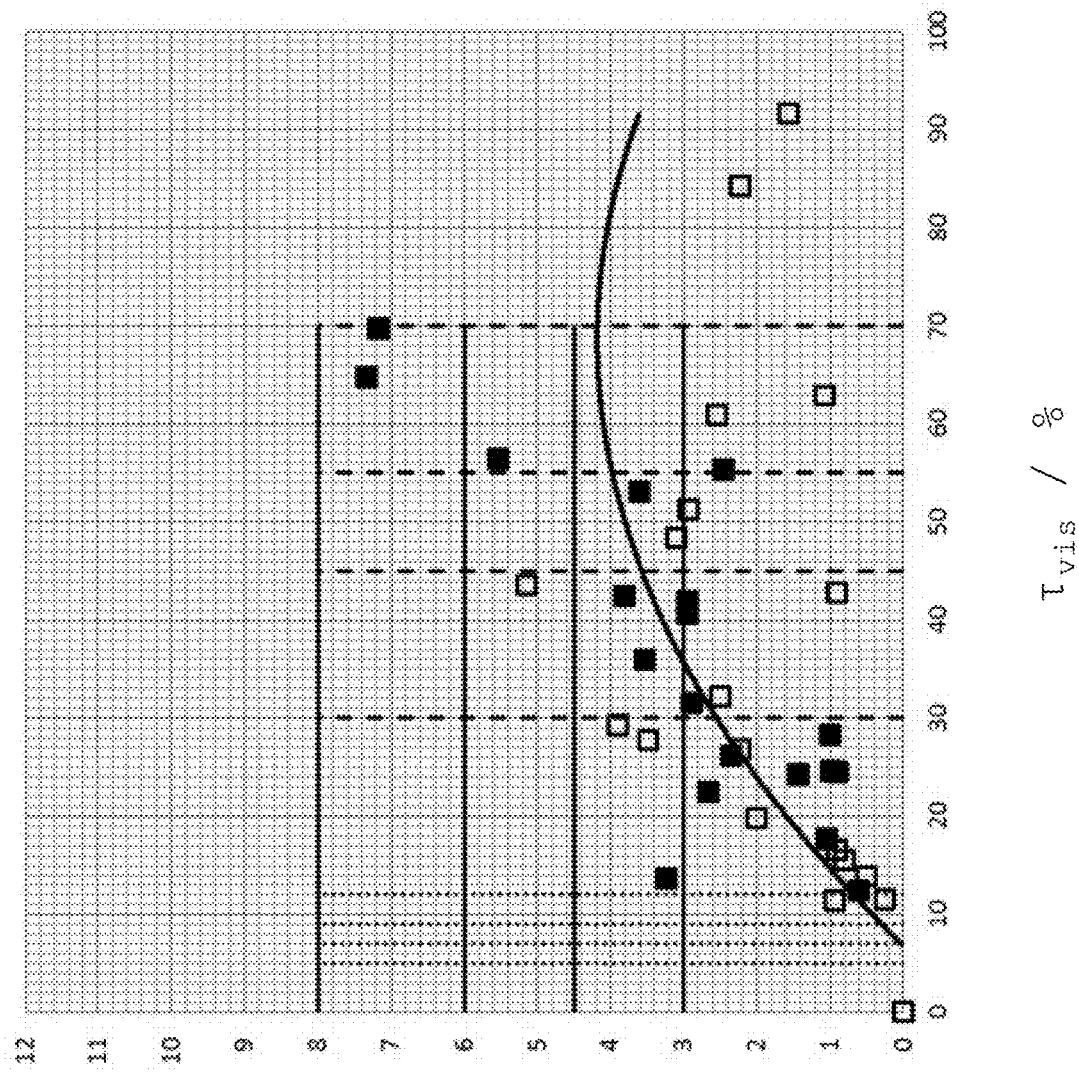
FIG. 12 shows chroma differences $\Delta C^*$ as determined for the different glass or glass ceramic substrates (in particular samples 1-18: black squares) with the first inner coating and for the second display surface, as a function of light transmittance ($\tau_{vis}$) of the glass or glass ceramic substrates.
Figure 13:
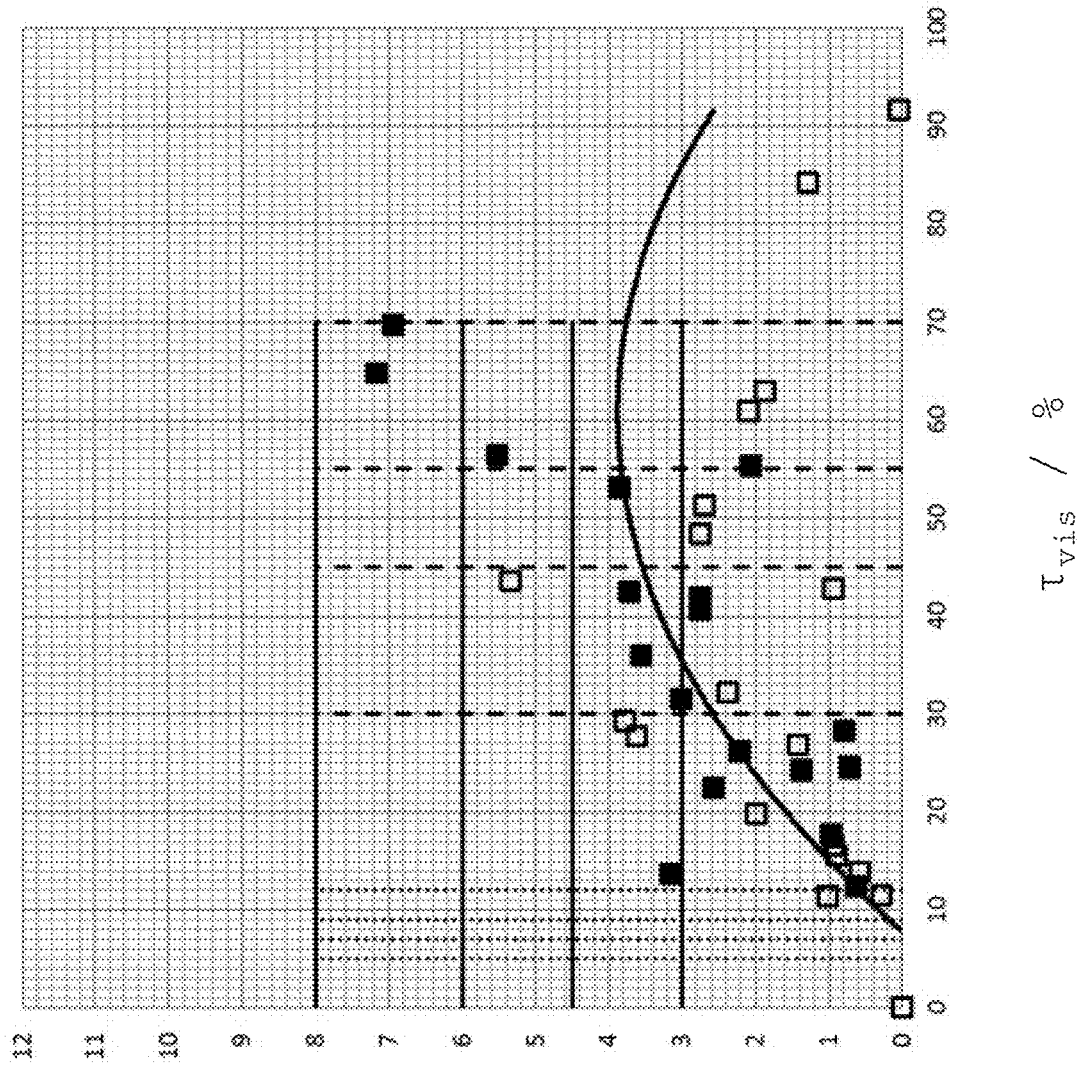
FIG. 13 shows chroma differences $\Delta C^*$ as determined for the different glass or glass ceramic substrates (in particular samples 1-18: black squares) with the second inner coating and for the second display surface, as a function of light transmittance ($\tau_{vis}$) of the glass or glass ceramic substrates.

Similarly, FIGS. 12 and 13 show chroma differences ΔC* as determined by the colorimeter for the different glass or glass ceramic substrates 10 with the first (FIG. 12) and second (FIG. 13) inner coating 12, respectively, and for the second display device 20 with the second display surface 22, as a function of the light transmittance ($\tau_{vis}$) of the glass or glass ceramic substrates.

Figure 14:
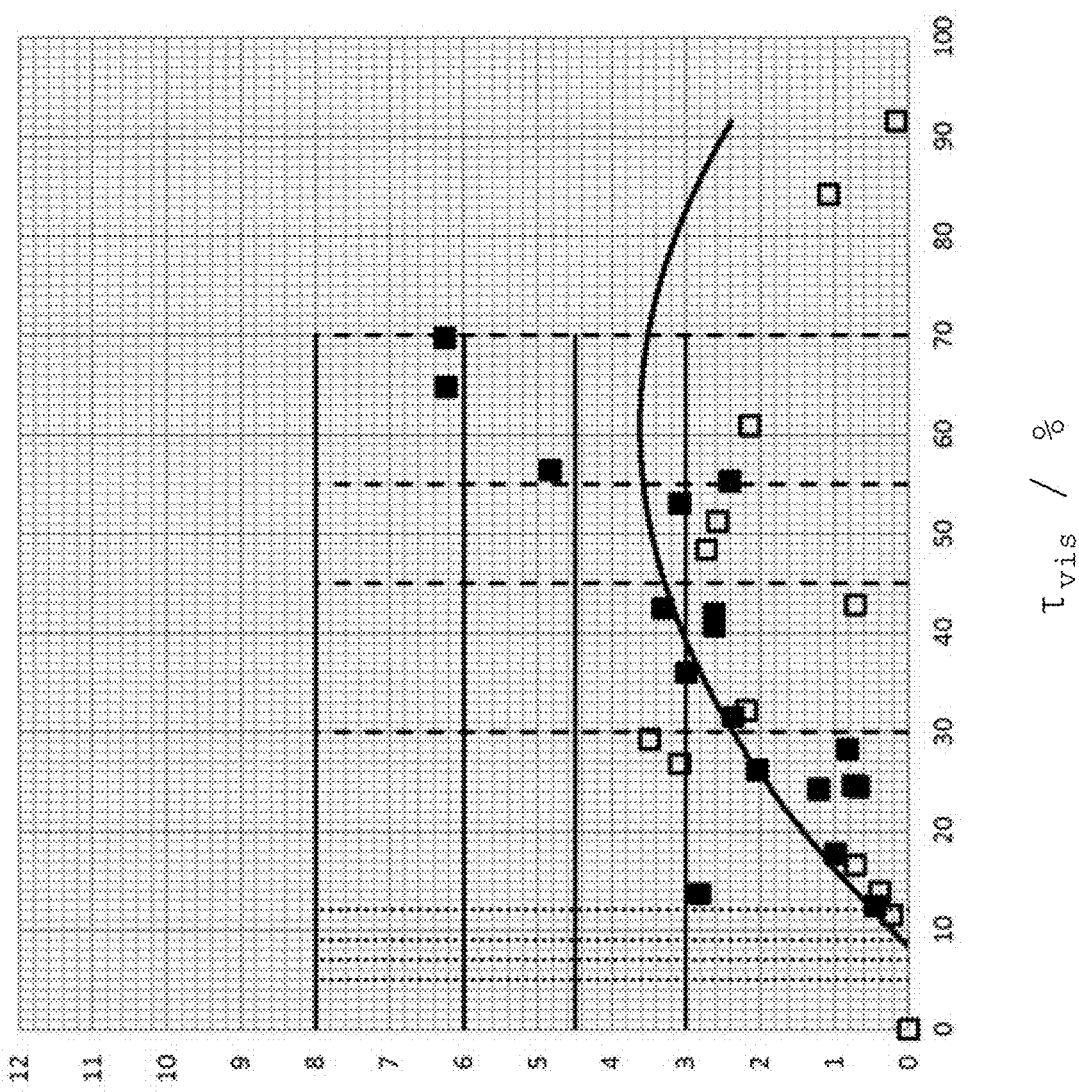
FIG. 14 shows chroma differences $\Delta C^*$ as determined for the different glass or glass ceramic substrates (in particular samples 1-18: black squares) with the first inner coating and for the third display surface, as a function of light transmittance ($\tau_{vis}$) of the glass or glass ceramic substrates.
Figure 15:
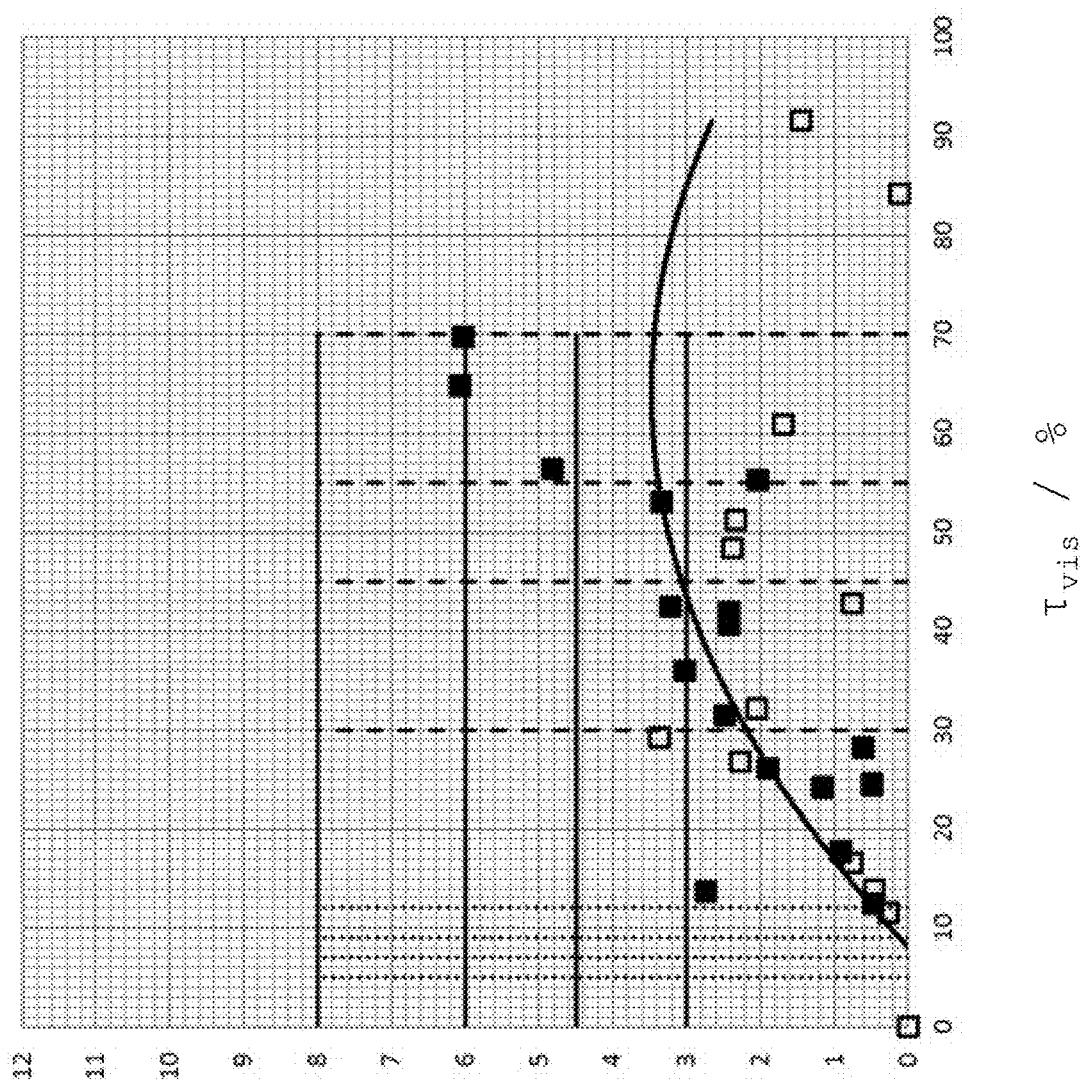
FIG. 15 shows chroma differences $\Delta C^*$ as determined for the different glass or glass ceramic substrates (in particular samples 1-18: black squares) with the second inner coating and for the third display surface, as a function of light transmittance ($\tau_{vis}$) of the glass or glass ceramic substrates.
Figure 16A:
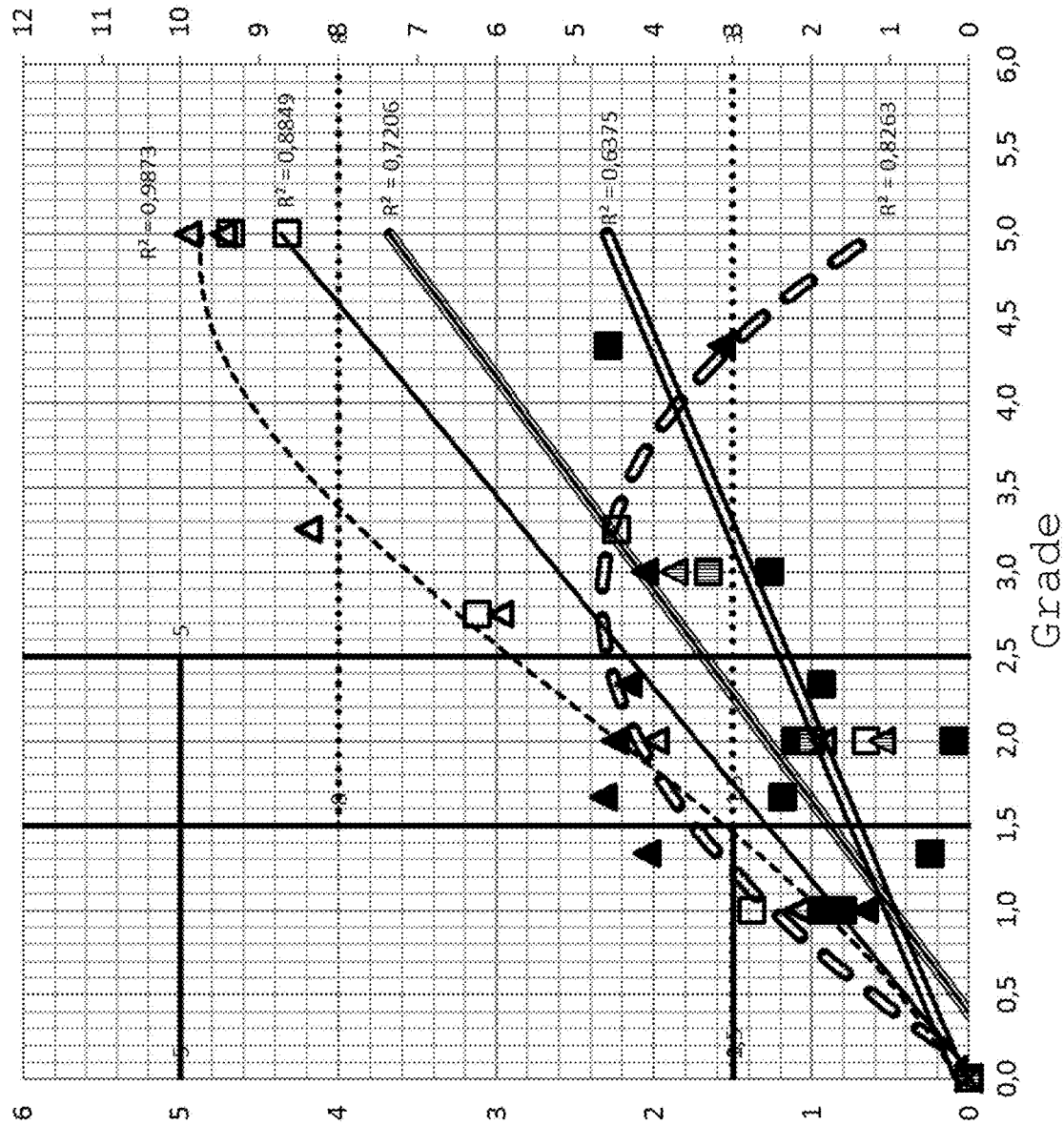
FIG. 16A shows grayscale value differences $|G_1-G_2|$ (squares) and chroma differences $\Delta C^*$ (triangles) as determined for different glass or glass ceramic substrates (in particular samples 1-18) with a first inner coating and for a first display surface, as a function of statistically determined grades for the dead-front effect.
Figure 16B:
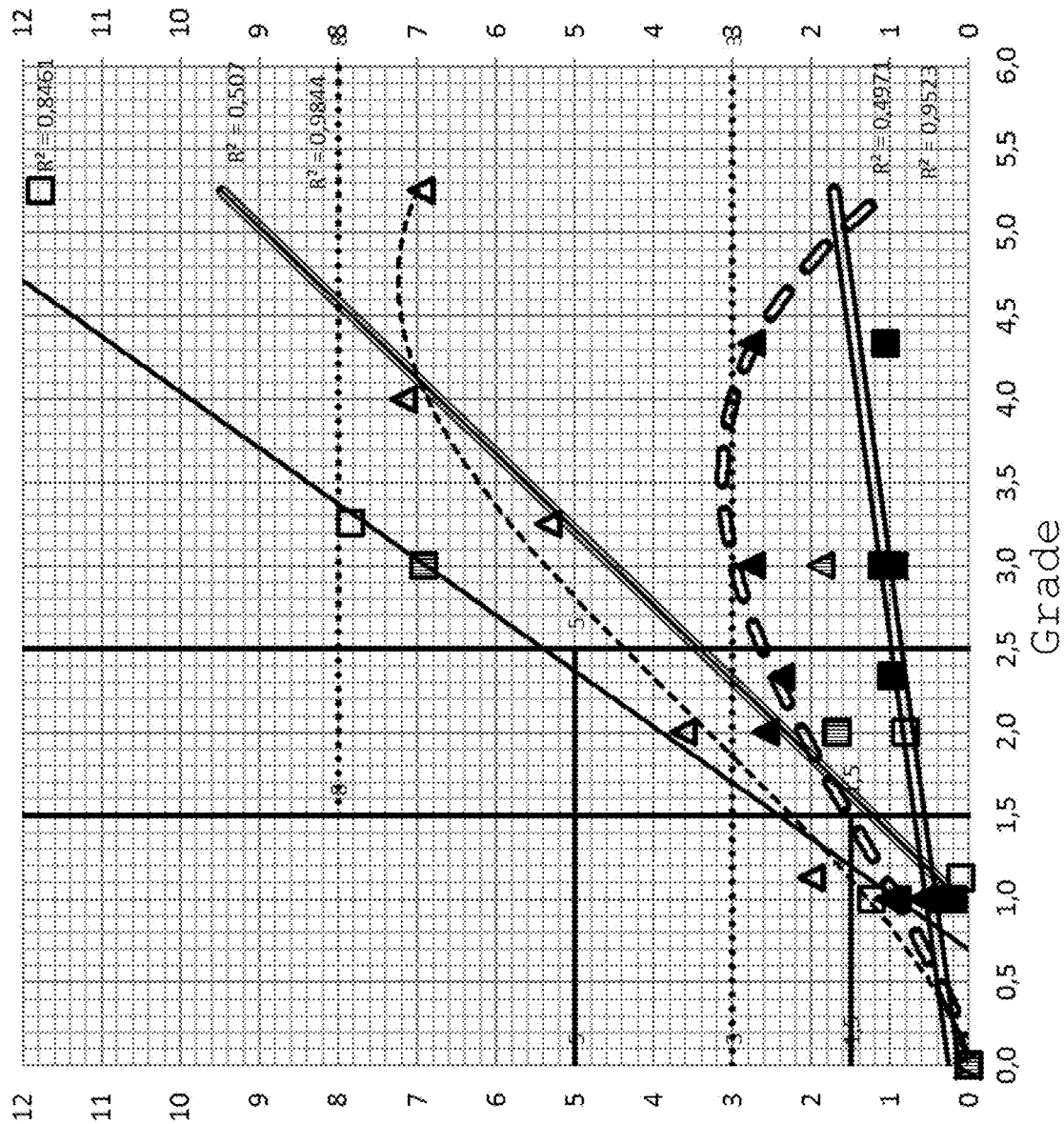
FIG. 16B shows grayscale value differences $|G_1-G_2|$ (squares) and chroma differences $\Delta C^*$ (triangles) as determined for different glass or glass ceramic substrates (in particular samples 1-18) with a second inner coating and for the first display surface, as a function of statistically determined grades for the dead-front effect.
Figure 16C:
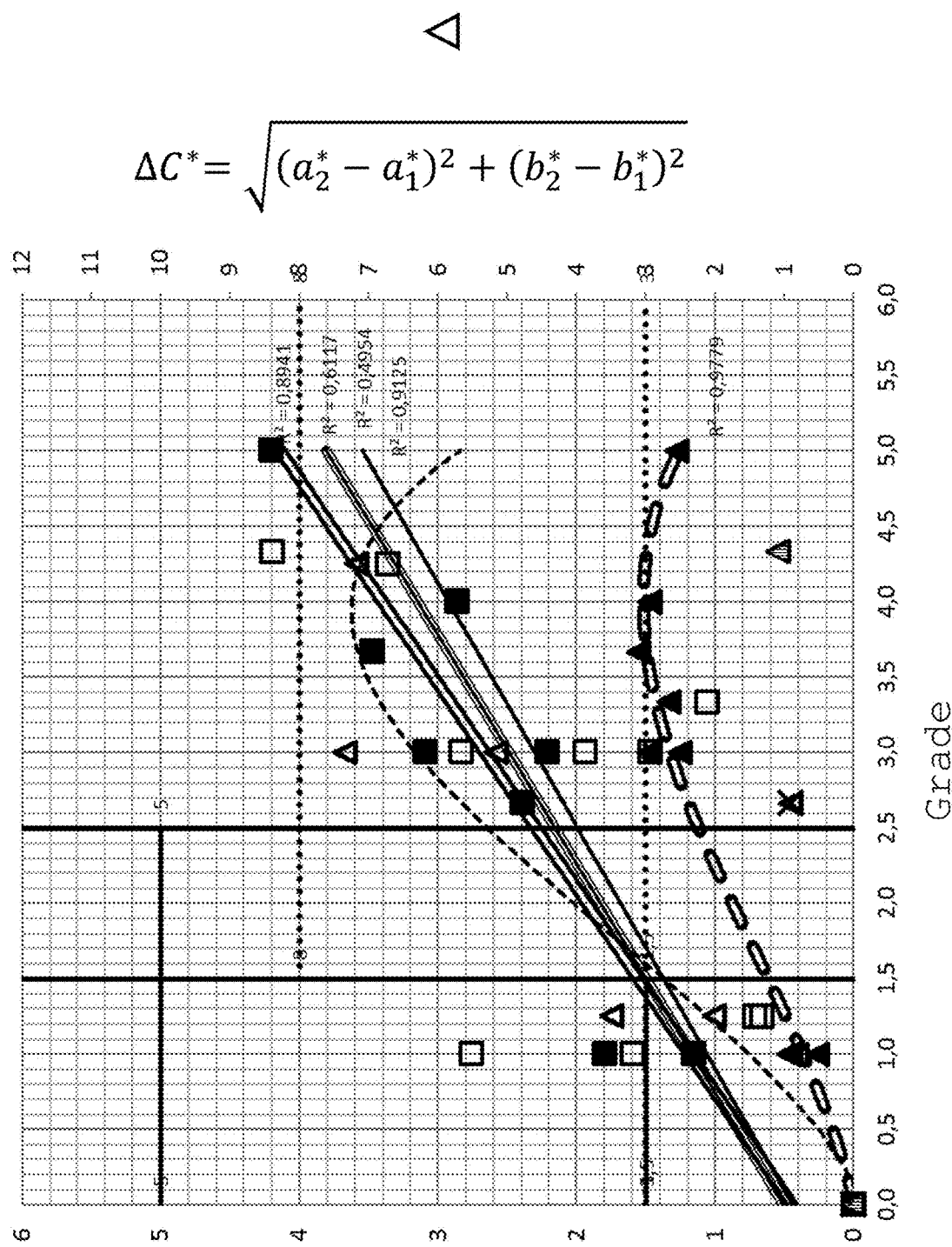
FIG. 16C shows grayscale value differences $|G_1-G_2|$ (squares) and chroma differences $\Delta C^*$ (triangles) as determined for different glass or glass ceramic substrates (in particular samples 1-18) with the first inner coating and for a second display surface, as a function of statistically determined grades for the dead-front effect.
Figure 16D:
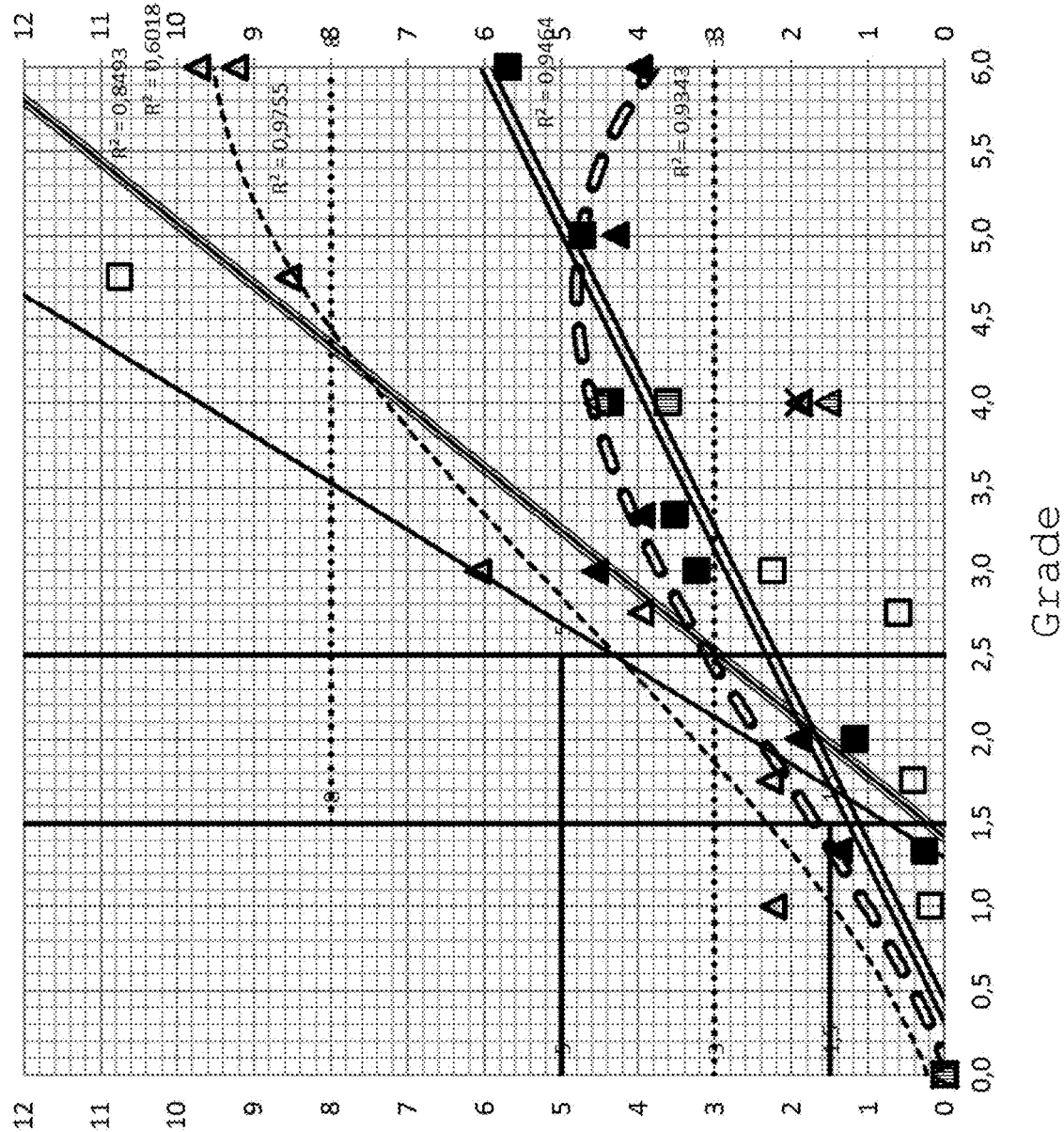
FIG. 16D shows grayscale value differences $|G_1-G_2|$ (squares) and chroma differences $\Delta C^*$ (triangles) as determined for different glass or glass ceramic substrates (in particular samples 1-18) with the second inner coating and for the second display surface, as a function of statistically determined grades for the dead-front effect.

Finally, FIGS. 14 and 15 show chroma differences ΔC* as determined by the colorimeter for the different glass or glass ceramic substrates 10 with the first (FIG. 14) and second (FIG. 15) inner coating 12, respectively, and for the third display device 20 with the third display surface 22, as a function of the light transmittance ($\tau_{vis}$) of the glass or glass ceramic substrates.

In FIGS. 10 to 15, the chroma difference of 8 is shown as a horizontal solid line in each case. It has been found that with values below 8 a dead-front effect can be achieved. For an even better dead-front effect, a chroma difference of less than 6 is preferred, more preferably of less than 4.5, and most preferably of less than 3. These values were also determined in the statistical analysis, the results of which are shown in FIGS. 16A to 16D.

Furthermore, in FIGS. 4 to 15, lower limits of light transmittance ($\tau_{vis}$) are indicated as respective dotted vertical lines. Light transmittance preferably is at least 5%, more preferably at least 7%, yet more preferably at least 9%, and most preferably at least 12%. Furthermore, upper limits of light transmittance are indicated as vertical dashed lines. Light transmittance is preferably at most 70%, more preferably not more than 55%, even more preferably not more than 45%, and most preferably not more than 30%.

It may in particular be advantageous to choose the upper limit(s) of light transmittance as a function of the values for |$G_1$−$G_2$| and ΔC*. For example, in a first example it may be intended that the |$G_1$−$G_2$| value is at most 5%, and/or that the ΔC* value is at most 8, and that the substrate has a light transmittance of not more than 70%. In a second example, it may be intended that the |G$_1$–G$_2$| value is at most 3.5%, and/or that the ΔC* value is at most 6, and that the substrate has a light transmittance of not more than 55%. In a third example, it may be intended that the |G$_1$–G$_2$| value is at most 2.5%, and/or that the ΔC* value is at most 4.5, and that the substrate has a light transmittance of not more than 45%. In a fourth example, it may be intended that the |G$_1$–G$_2$| value is at most 1.5%, and/or that the ΔC* value is at most 3, and that the substrate has a light transmittance of not more than 30%.

More generally, irrespectively of the embodiments, it is preferably contemplated that the display surface of the display device, when viewed directly, has a perceivable color shade {L*, a*, b*} with 25<L*<45 and/or −2<a*<0 and/or −1.7<b*<3.0. Chroma is preferably C*<3.5.

Furthermore, also irrespectively of the embodiments, it is preferably contemplated that the inner coating, when applied to one of the faces of a highly transmissive substrate, in particular SCHOTT B270® Superwite, or SCHOTT CERAN Cleartrans®, and when viewed from the opposite substrate surface through the substrate, has a perceivable color shade {L*, a*, b*} with 27<<30 and/or −0.6<a*<0 and/or −2<b*<0 Chroma (colorfulness) is preferably C*<2.

The above color shades are especially obtained when again measured under the aforementioned standard conditions and preferably by placing thereon a colorimeter, e.g. of the aforementioned type.

In FIGS. 16A to 16D, the results of a statistical analysis for subjective evaluation of the dead-front effect are correlated with objective measurements as described above.

Test persons from a group of 5 to 10 persons viewed the display surface of the display device in its off state through the glass or glass ceramic substrate, and also viewed the inner coating of the glass or glass ceramic substrate through the glass or glass ceramic substrate, and awarded grades for perceivable differences in contrast or color.

Grades 1 and 2 were awarded if no difference could be discerned, which means that a perfect dead-front effect was achieved. In case the test persons were able to discern a difference, but hardly, which means that still a reasonable dead-front effect was achieved, grades 3 and 4 were awarded. Grades 5 and 6 were awarded for cases in which a difference was easily visible.

Figure 17B:
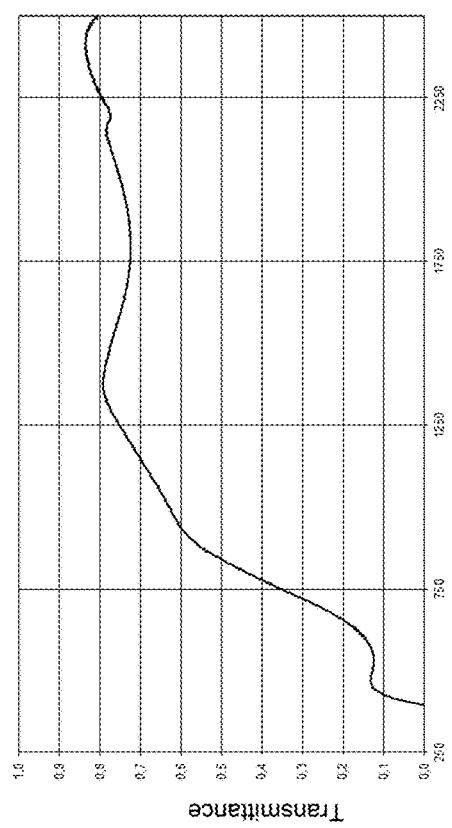
FIG. 17B shows spectral transmittance as measured for a glass or glass ceramic substrate of sample 3.
Figure 17D:
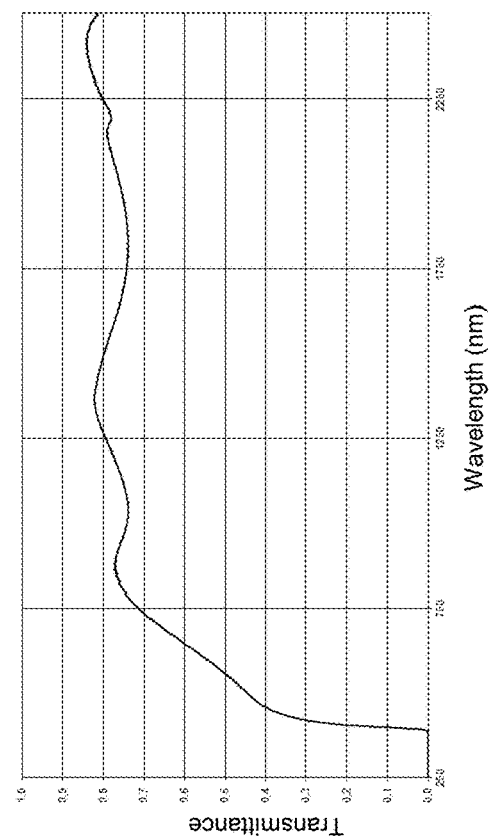
FIG. 17D shows spectral transmittance as measured for a glass or glass ceramic substrate of sample 5.
Figure 17A:
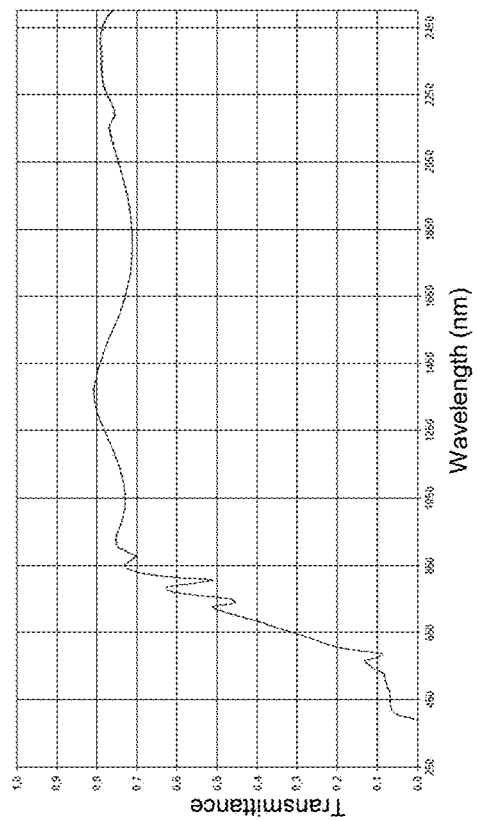
FIG. 17A shows spectral transmittance as measured for a glass or glass ceramic substrate of sample 1.
Figure 17C:
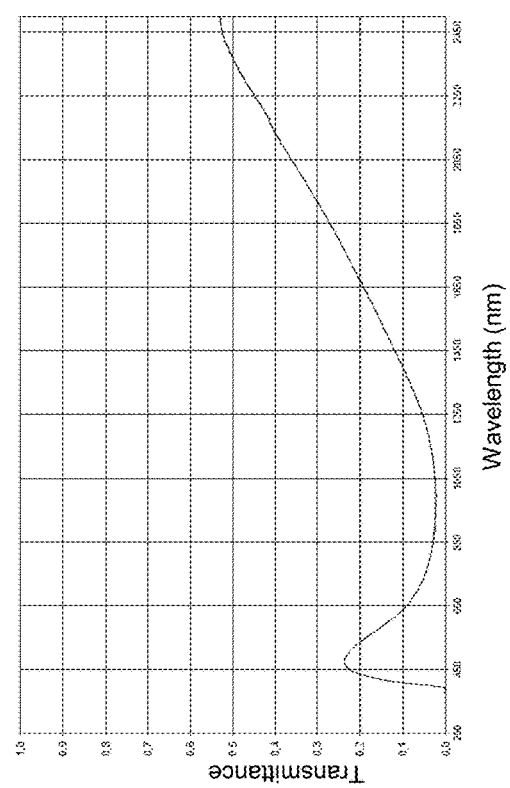
FIG. 17C shows spectral transmittance as measured for a glass or glass ceramic substrate of sample 4.
Figure 17F:
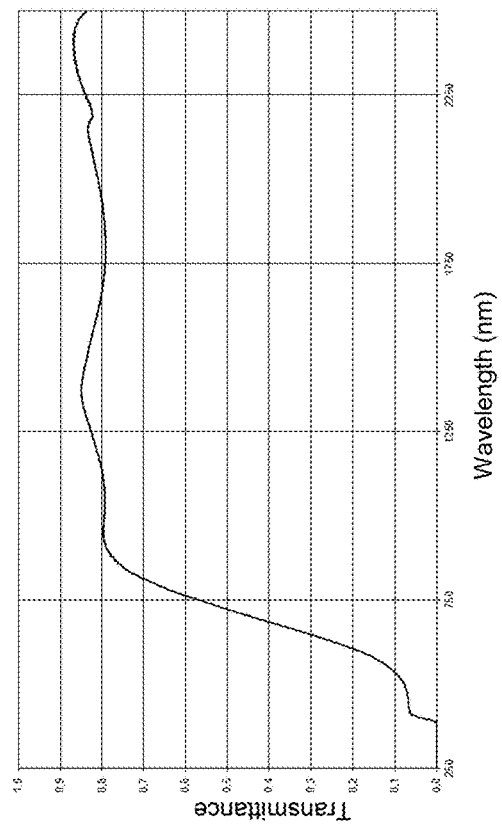
FIG. 17F shows spectral transmittance as measured for a glass or glass ceramic substrate of sample 7.
Figure 17E:
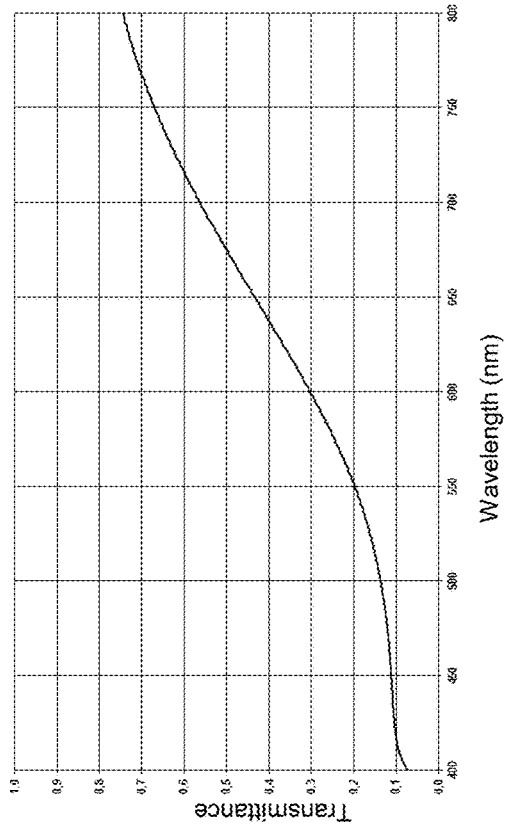
FIG. 17E shows spectral transmittance as measured for a glass or glass ceramic substrate of sample 6.
Figure 17H:
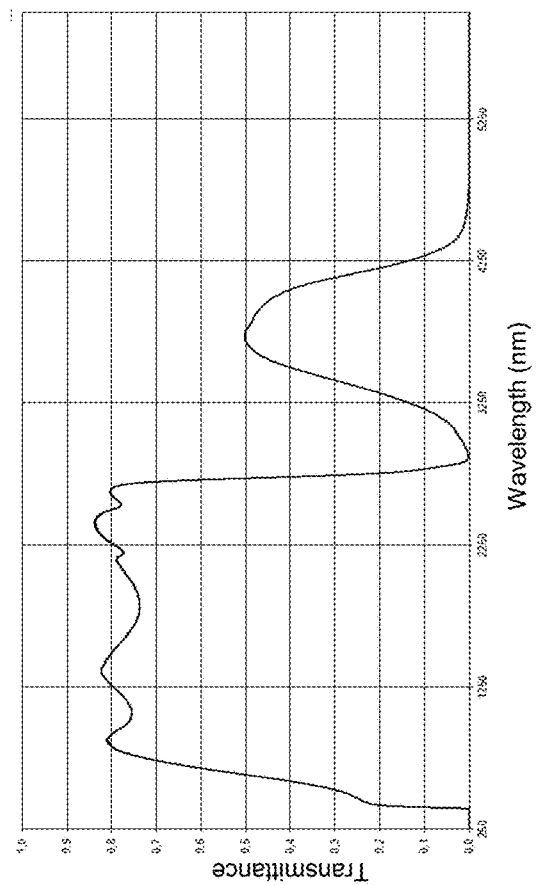
FIG. 17H shows spectral transmittance as measured for a glass or glass ceramic substrate of sample 13.
Figure 17G:
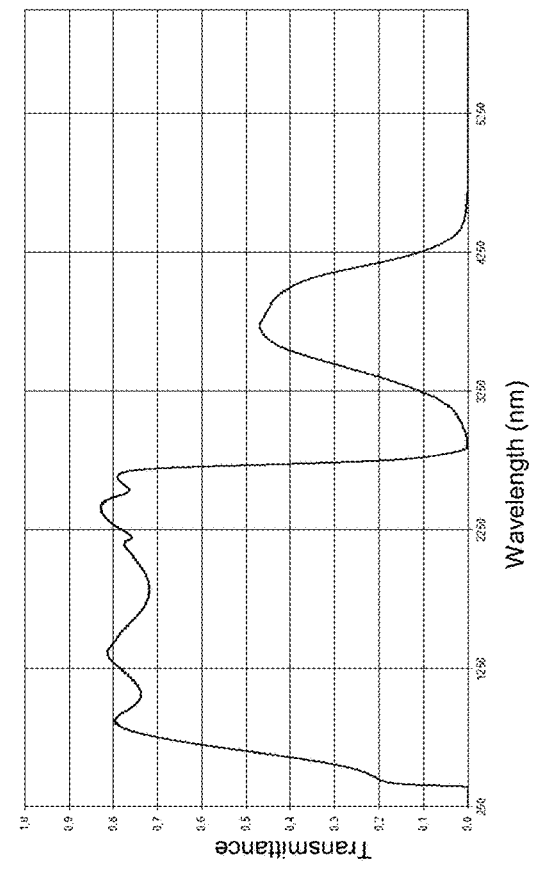
FIG. 17G shows spectral transmittance as measured for a glass or glass ceramic substrate of sample 12.
Figure 17J:
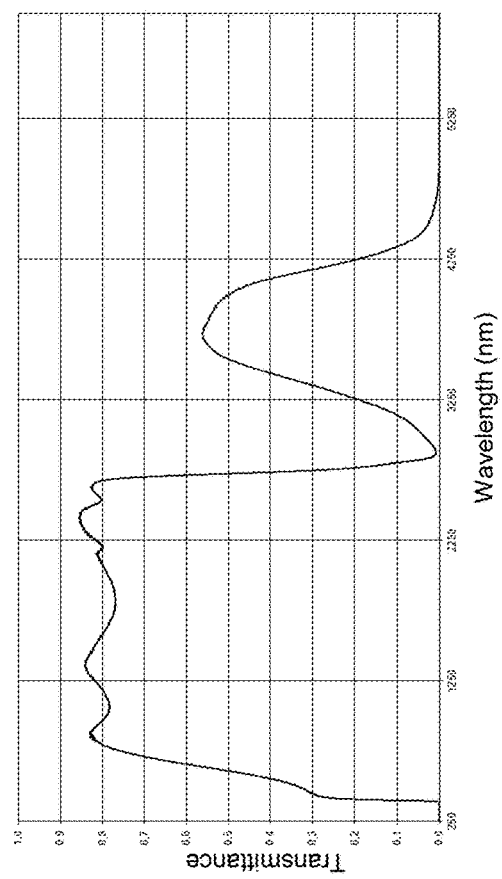
FIG. 17J shows spectral transmittance as measured for a glass or glass ceramic substrate of sample 15.
Figure 17L:
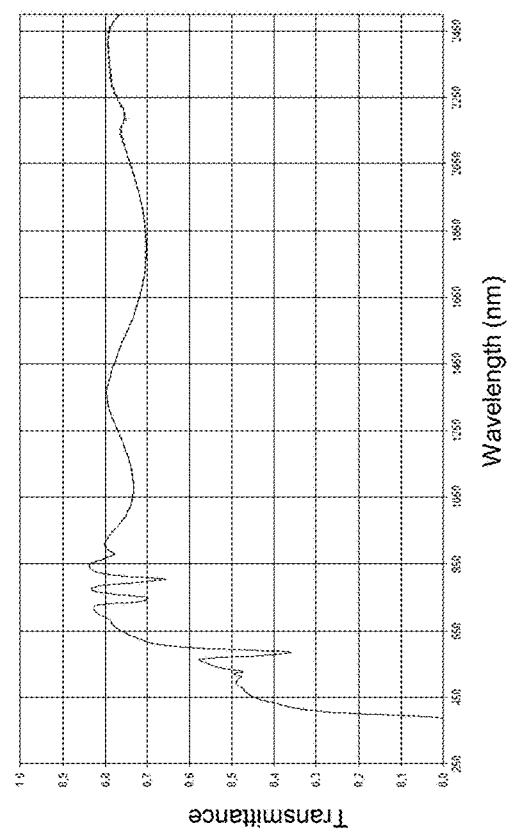
FIG. 17L shows spectral transmittance as measured for a glass or glass ceramic substrate of sample 17.
Figure 17I:
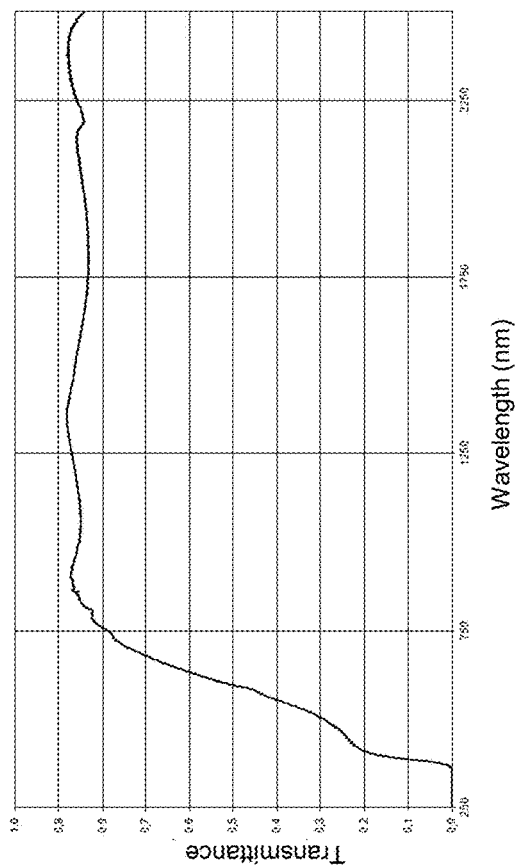
FIG. 17I shows spectral transmittance as measured for a glass or glass ceramic substrate of sample 14.
Figure 17K:
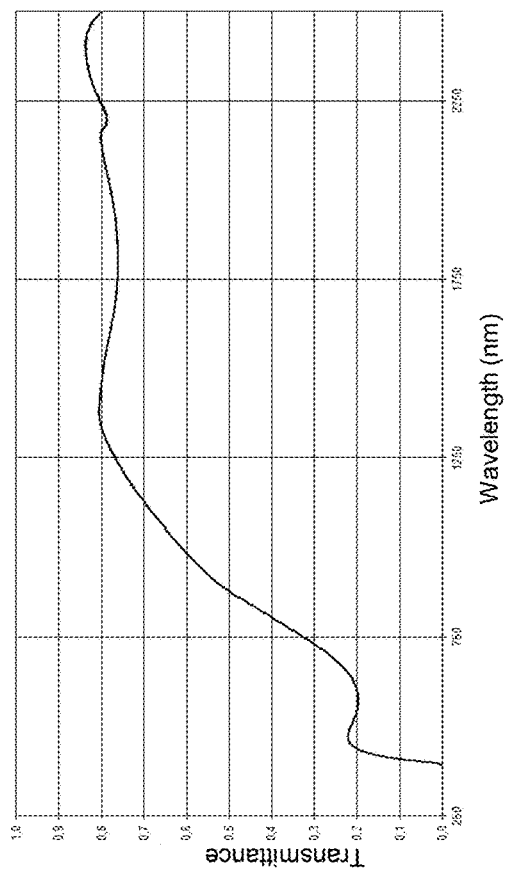
FIG. 17K shows spectral transmittance as measured for a glass or glass ceramic substrate of sample 16.
Figure 17N:
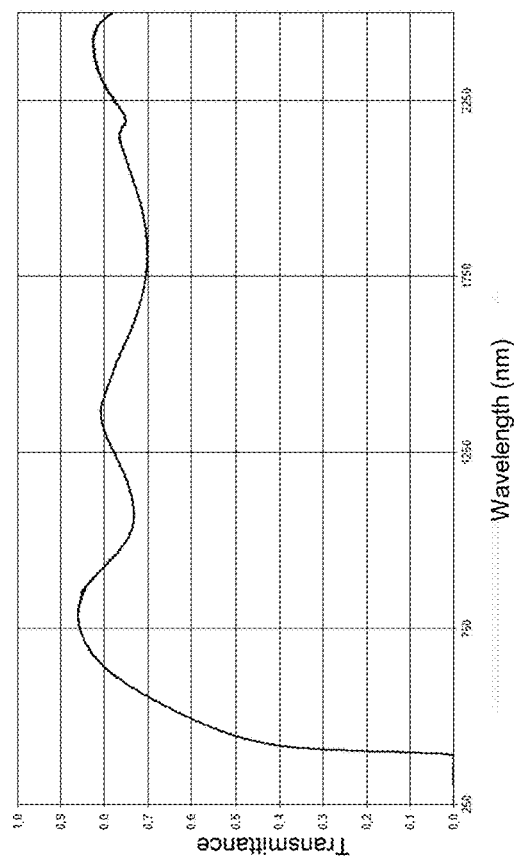
FIG. 17N shows spectral transmittance as measured for a glass or glass ceramic substrate of sample 21.
Figure 17M:
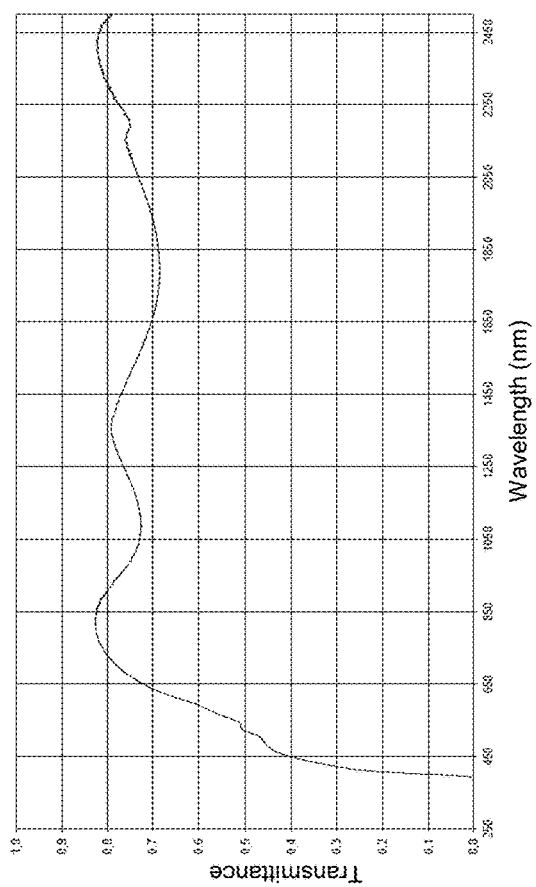
FIG. 17M shows spectral transmittance as measured for a glass or glass ceramic substrate of sample 18.

FIGS. 17A to 17N show spectral transmittances of the various glass or glass ceramic elements according to the employed samples 1 to 21.

Figure 18:
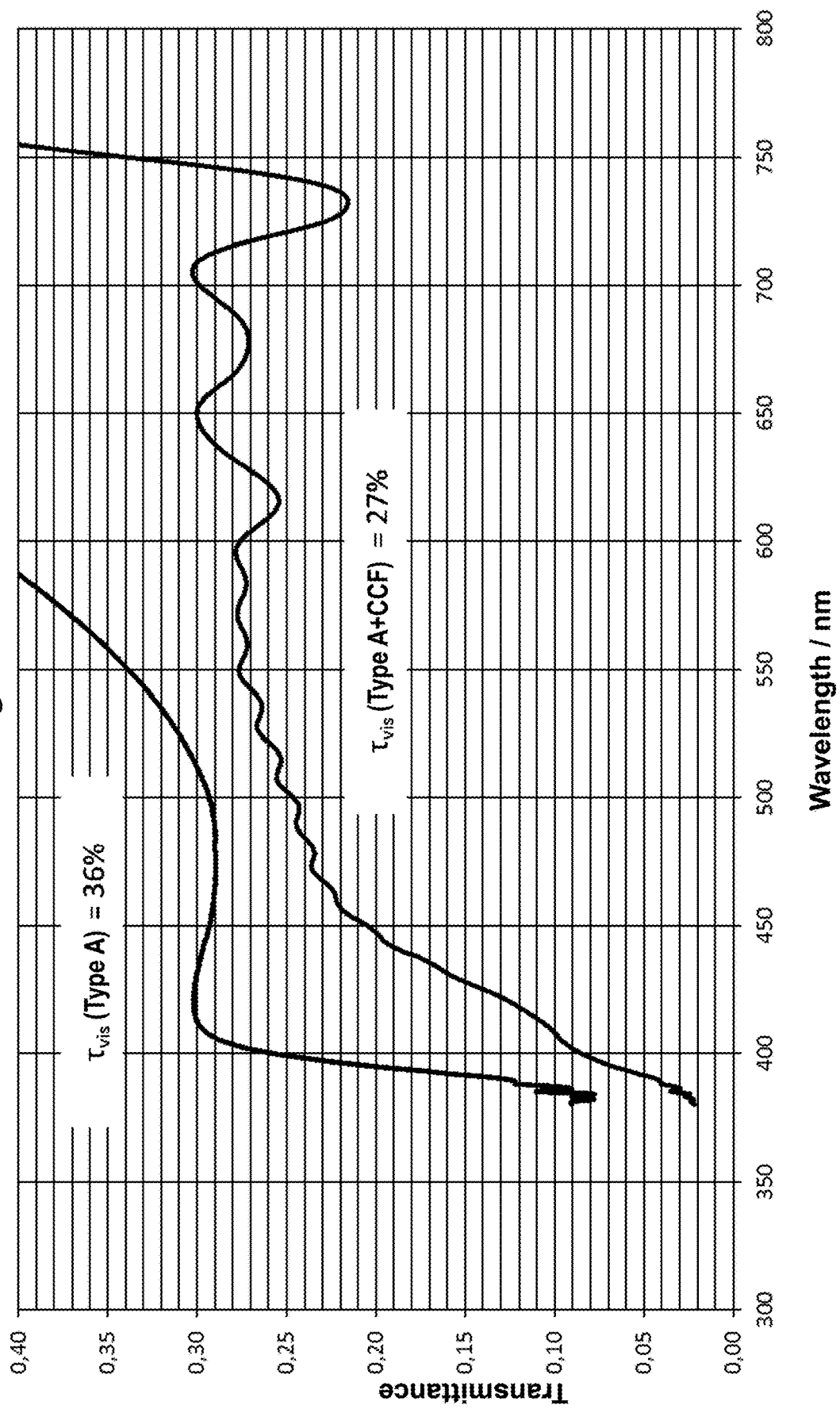
FIG. 18 shows measured spectral transmittances of two glass ceramic substrates, with and without color correction, respectively.
Figure 19:
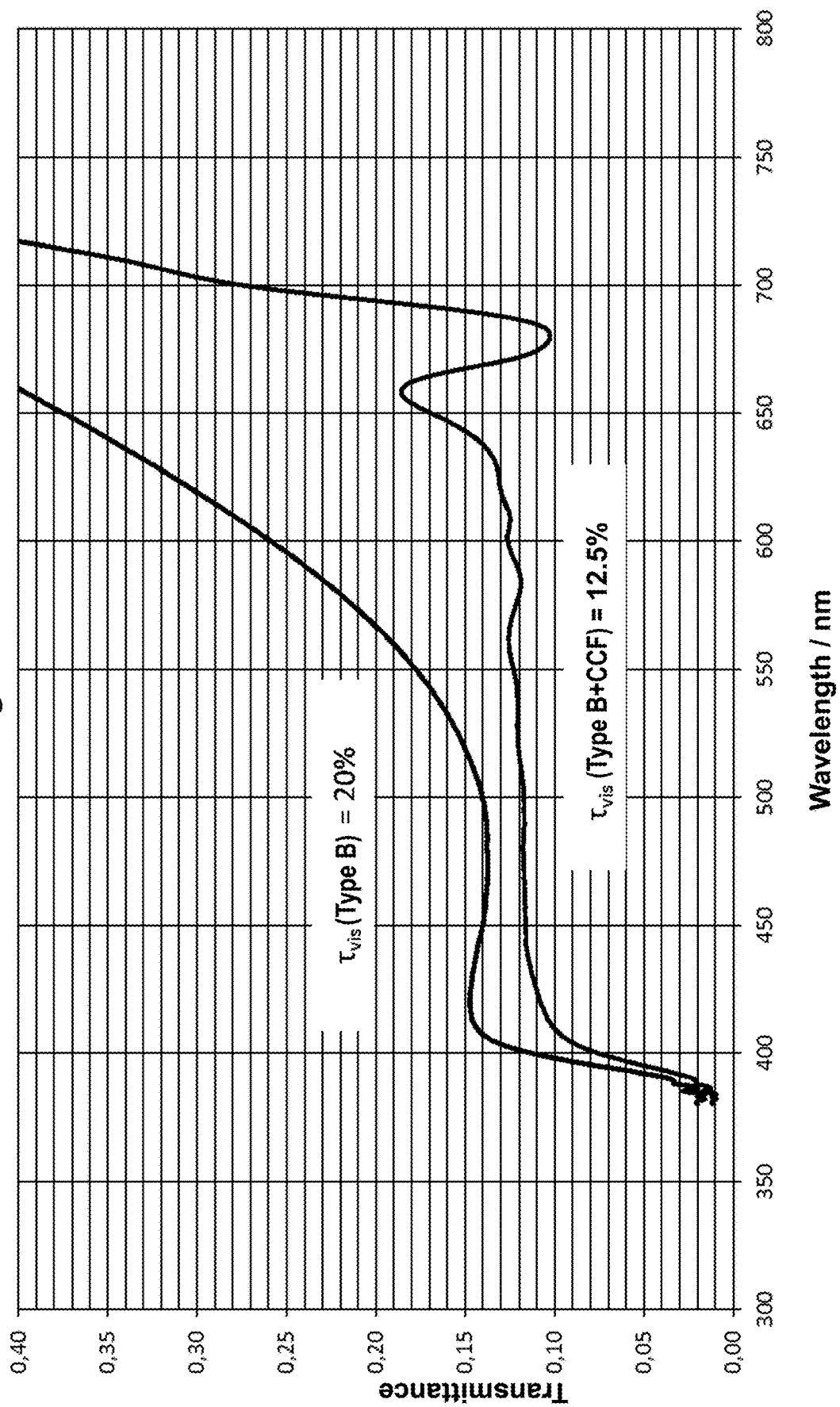
FIG. 19 shows measured spectral transmittances of two glass ceramic substrates, with and without color correction, respectively.

FIGS. 18 and 19 show spectral transmittances of different glass ceramic elements, wherein the two elements in FIG. 18 have the same composition "Type A" and one of the elements is additionally provided with a color compensation filter (CCF). The same applies to the glass ceramic elements of "Type B" in FIG. 19.

The glass ceramic element referred to as "Type A" exhibits a light transmittance of 36%. For visible wavelengths below 550 nm, light transmittance is between 25% and 35%. For visible wavelengths above 550 nm, light transmittance is greater than 35%. The glass ceramic element is for instance suitable for display surfaces with red display.

The glass ceramic element referred to as "Type A+CCF" includes a color compensation and exhibits a light transmittance of 27%. For wavelengths in the range of 400 nm and 700 nm, light transmittance is between 8% and 32%. For wavelengths in a range from 450 nm and 700 nm, light transmittance is between 20% and 32%. Therefore, advantageously, it is possible to use an RGB display.

The glass ceramic element referred to as "Type B" exhibits a light transmittance of 20%. For visible wavelengths below 550 nm, light transmittance is between 10% and 20%. For visible wavelengths above 550 nm, light transmittance is greater than 18%. Accordingly, the glass ceramic element is again in particular suitable for display surfaces with red display.

The glass ceramic element referred to as "Type B+CCF" in turn includes a color compensation and exhibits a light transmittance of 12.5%. For wavelengths in a range from 410 nm to 690 nm, light transmittance is between 10% and 20%. Therefore, again, an RGB display can advantageously be used.

Furthermore, "CERAN Hightrans® eco" with less vanadium oxide than usual may be used as well as a dyed glass ceramic.

FIG. 20 shows a cooktop 5 for a cooking appliance comprising a glass ceramic substrate 10, as seen from the exterior. On the inner surface of the glass ceramic, an inner coating 12 is applied which defines, by partially being omitted, a display window 60, through which a display surface in the form of a graphical display arranged therebelow is visible when switched on. Within the area where the inner coating 12 is partially omitted, the optical properties, in particular light transmittance of the glass ceramic substrate 10, are different, in the present example preferably increased, compared to an area of the glass or glass ceramic substrate 10 adjacent to the area with omitted coating. Within the display window 60, the glass ceramic substrate 10 has a light transmittance in a range from 5 to 70%.

Accordingly, in this exemplary embodiment there is no inner coating provided within the range of the display window 60, in contrast to an adjacent area, in order to achieve the optical properties of the glass ceramic substrate 10 different from those of the adjacent area of the glass ceramic substrate 10.

However, it is also possible to provide a lightening or darkening of the glass ceramic substrate 10 itself in this area of the display window 60 in order to achieve higher or lower light transmittance. Furthermore, it is also possible to provide a film in which the display window 60 is represented by an opening, a coating, or a coloration, and wherein the film is mounted to the lower surface, glued or laminated thereto. Finally, it is also possible to provide a self-supporting carrier material, such as a plastic or glass sheet, in which the display window 60 is represented by an opening, a coating, or a coloration, and which is mounted below the glass ceramic substrate 10.

This will now be described in more detail with reference to FIGS. 21 to 25.

Like FIG. 2A, FIG. 21 is a schematic side view of a grayscale meter 1 for determining percentage grayscale values, and accordingly reference is additionally made to the above description of FIG. 2A in this respect.

The display surface 22 of display device 20 is viewed through the glass or glass ceramic substrate 10 in the off state of the display, and the percentage grayscale value (G$_1$) thereof is measured through the substrate, as well as a percentage grayscale value (G$_2$) of a film 112 or of a carrier material 112 applied on the lower surface of the substrate or near the lower surface of the substrate and having an opening for defining the display window 60. The carrier material 112 may be a self-supporting substrate 112, such as a plastic or glass sheet in which the display window 60 is defined by an opening in the carrier material 112 itself.

The display window 60 may as well be defined by a coating on the carrier material 112 or by a coloration of the carrier material 112, so that the latter represents a substantially uninterrupted sheet-like body, as can be seen in FIG. 22 by way of example.

The film 112 or the carrier material may be mounted below the glass or glass ceramic substrate 10 directly thereon or in proximity thereto.

As described with reference to FIG. 2A, the grayscale meter 1 shown in FIGS. 21, 22, and 23 can be used to measure the grayscale values $G_2$ described above, either viewed through the substrate 10, as in the case of the views of FIGS. 21 and 22, or on the substrate 10, as in the case of the views of FIGS. 23 and 24 described below.

FIG. 23 is a schematic side view of a grayscale meter 1, substantially like FIG. 2A, for determining a percentage grayscale value ($G_1$) of a display surface 22 of a display device 20 in its off state viewed through the substrate or glass ceramic substrate 10, and a percentage grayscale value ($G_2$) of a coating applied to the upper surface, in particular an outer coating 113 of the substrate, or of a film or carrier material 113 arranged near the upper surface of the substrate 10, which has an opening for defining the display window 60. In this embodiment, the carrier material 113 may be made of glass, in particular a thin glass sheet which may also be dyed, thus providing an uninterrupted body with a continuous surface, as shown in FIG. 24, in which the display window 60 is defined by a lightening. It is also possible in this embodiment, that the outer coating 113, carrier material 113, or thin glass sheet 113 only surrounds a portion of the display window 60 so as to provide the desired dead-front effect for that portion, for example for a distinct area of the glass or glass ceramic substrate, which defines a control panel and is not arranged in the immediate vicinity of heating elements, so that neither cookware nor excessively high temperatures during operation will have adverse effects.

A further preferred embodiment of the invention is shown in FIG. 25 which is a schematic side view of a grayscale meter for determining a percentage grayscale value ($G_1$) of a display surface of a display device in its off state as viewed through a display window 60 of the substrate 10, which is defined by a lightening of the glass or glass ceramic substrate 10, and a percentage grayscale value ($G_2$) of the glass or glass ceramic substrate 10 outside the display window, in particular in the darker or darkened portions 114.

A mechanism for lightening the glass or glass ceramic substrate 10 is described in document DE 10 2013 103 776 A1, for example. According to that, a change in transmittance is achieved by local and temporarily limited exposure to electromagnetic radiation, such as laser radiation of a diode laser with a wavelength of 1 μm, the radiation causing local heating of the material. In order to achieve a local change in transmittance in the sense of a lightening, the temperature of the substrate is increased until a change in transmittance occurs. Thereafter, preferably very fast cooling is performed. The heating triggers appropriate physico-chemical reactions and/or increases electron and ion mobility in the starting material.

The glass or glass ceramic substrate 10 may be provided as a volume-dyed substrate in this case, preferably as a glass ceramic substrate volume-dyed using color-imparting metal ions. Typically, the temperature at which the increase in transmittance occurs is above the temperature at which the glass ceramic has a viscosity of $10^{14}$ dPa·s. Preferably, the heating is not conducted up to the softening point, in order to avoid changes in shape.

A mechanism for darkening the glass or glass ceramic substrate 10 is described in document WO2015/044168, for example. According to that, a darkening is achieved by directing electromagnetic radiation to a localized area of the glass or glass ceramic substrate 10 using a laser, which radiation is absorbed by the substrate, so that transmittance decreases in the irradiated area. The power density of the laser is chosen so that the power density is preferably below the ablation threshold of the irradiated substrate. The locally altered transmittance is in particular caused by a locally altered absorption coefficient. Accordingly, the absorption coefficient is preferably increased in the irradiated area and thus transmittance is decreased.

For the darkening, a light-scattering glass or glass ceramic substrate may be used which is irradiated using the laser and wherein the absorption coefficient is decreased in the irradiated area, so that the remission of visible light is decreased in the irradiated area.

The glass or glass ceramic substrate 10 of the present embodiment can be obtained, for example, by introducing, as explained above and as shown for display window 60, a lightening with a higher light transmittance into a glass or glass ceramic substrate 10 which otherwise exhibits lower light transmittance at least in the portions 114, thereby providing the grayscale value $G_2$. Furthermore, it is also possible to introduce a darkening as described above at least in the portions 114 of the glass or glass ceramic substrate 10, for example by color-imparting substances which reduce the light transmittance in these portions in a defined manner to provide the grayscale value $G_2$.

By choosing the appropriate inner or outer coating or the respective film or carrier material, in particular by the respective coloration thereof, it is possible to adjust in predefined manner the respective perceivable color shade $\{L^*_2, a^*_2, b^*_2\}$ or a chroma $\{a^*_2, b^*_2\}$ over the entire surface or at least in an area surrounding the display window 60.

Thus, an arrangement disposed above, below, and/or within the glass or glass ceramic substrate 10 is disclosed, which defines the at least one display window 60 for the light emitted from the display surface 22.

The arrangement disposed above, below and/or within the glass or glass ceramic substrate 10 and defining the at least one display window 60 for the light emitted from the display surface 22 comprises an outer coating 113 disposed on the substrate outer face, preferably with a partial discontinuity to form a non-coated area defining the display window 60, and/or a film 112, 113 with at least a partial opening, coating, or coloration, which is arranged adjacent to the substrate inner face or substrate outer face or on the substrate inner face or the substrate outer face and which defines the display window 60, and/or a carrier material 112, 113 with at least one opening, coating, or coloration, which is arranged adjacent to the substrate inner face or substrate outer face or on the substrate inner face or the substrate outer face and which defines the display window 60, and/or a modified light transmittance of the glass or glass ceramic substrate 10, in particular a partial lightening or darkening of the glass or glass ceramic substrate 10, which defines the display window 60.

Also, a further display device with a further display surface for displaying information by emission of light is provided and is in particular configured as a segment display, wherein the inner coating applied to the inner face of the substrate, the outer coating 113, the film 112, 113, or the carrier material 112, 113 define a further display window for the light emitted from the further display surface, preferably by partial discontinuities, or the glass or glass ceramic substrate 10 defines a further display window by an altered light transmittance, in particular a partial lightening and/or darkening, and wherein in the area of the further display surface or the further display window, the glass or glass ceramic substrate 10 has a light transmittance ($\tau_{vis}$) in a range from 0.5% to 5%.

The display surface 22 of the display device 20 has a luminance of at least 200 cd/m$^2$, preferably at least 300 cd/m$^2$, more preferably at least 400 cd/m$^2$, most preferably at least 500 cd/m$^2$, and of at most 2000 cd/m$^2$, preferably not more than 1500 cd/m$^2$, more preferably not more than 1200 cd/m$^2$, even more preferably not more than 1000 cd/m$^2$, and most preferably not more than 800 cd/m$^2$.

Between a percentage grayscale value $G_1$ of the display surface 22 of the display device 20 in its off state, preferably viewed through the glass or glass ceramic substrate 10, and a percentage grayscale value $G_2$ of the inner coating 12 of the glass or glass ceramic substrate 10, or a percentage grayscale value $G_2$ of a film 112 applied to the substrate inner face or applied near the substrate inner face, or of a carrier material 112 applied to the substrate inner face or applied near the substrate inner face, preferably viewed through the glass or glass ceramic substrate, or a percentage grayscale value $G_2$ of a film 113 applied to the substrate outer face or applied near the substrate outer face, or a percentage grayscale value $G_2$ of a carrier material 113 applied to the substrate outer face or applied near the substrate outer face, or a percentage grayscale value $G_2$ of a darkened portion of the glass or glass ceramic substrate 114, preferably not viewed through the glass or glass ceramic substrate 10, but directly, a difference $|G_1-G_2|$ is less than 5.0%, preferably less than 3.5%, more preferably less than 2.5%, most preferably less than 1.5%.

This difference of the percentage grayscale values $G_1$ and $G_2$ is preferably calculated using a linear function G as $G_1=G(M_1)$ and $G_2=G(M_2)$ based on measured values $M_1$ and $M_2$ measured using a grayscale meter.

In this case, the measured value $M_1$ corresponds to the display surface 60 of the display device 22 in its off state, preferably viewed through the glass or glass ceramic substrate 10, and is measured using the grayscale meter.

The measured value $M_2$ corresponds to the inner coating 12 of the glass or glass ceramic substrate 10 or to the film 112 applied to the substrate inner face or applied near the substrate inner face, or to the carrier material 112 applied to the substrate inner face or applied near the substrate inner face, preferably as viewed through the glass or glass ceramic substrate 10, or corresponds to the outer coating 113 or to the film 113 applied to the substrate outer face or applied near the substrate outer face, or to the carrier material 113 applied to the substrate outer face or applied near the substrate outer face, or to the glass or glass ceramic substrate 10 in its darkened portion 114, preferably not viewed through the glass or glass ceramic substrate 10, but directly, and is measured using the grayscale meter 1.

The linear function G is preferably defined by the fact of matching a percentage grayscale value of 20% to a measured value corresponding to a RAL card with color RAL 9017 and measured by the grayscale meter 1, and matching a percentage grayscale value of 90% to a measured value corresponding to a RAL card with color RAL 7012 and measured by the grayscale meter 1, wherein the grayscale meter 1 preferably comprises a camera and is configured to take a grayscale image of the display surface 20 of the display device in its off state, preferably viewed through the glass or glass ceramic substrate 10, of the inner coating 12 of the glass or glass ceramic substrate, preferably viewed through the glass or glass ceramic substrate 10, and to provide the associated measured values.

Furthermore, in particular in the embodiments illustrated in FIGS. 21 and 22, the grayscale meter 1 with its camera is configured to take a grayscale image of the film 112 applied to the inner face or near the inner face of the glass or glass ceramic substrate, or of the carrier material 112 applied to the inner face or near the inner face of the glass or glass ceramic substrate 10, preferably as viewed through the glass or glass ceramic substrate 10, and to provide the associated measured values.

In particular in the embodiments illustrated in FIGS. 23 and 24, the grayscale meter 1 with its camera is configured to take a grayscale image of the film 113 applied to the outer face or near the outer face of the glass or glass ceramic substrate 10, or of the carrier material 113 applied to the outer face or near the outer face of the glass or glass ceramic substrate 10, preferably not viewed through the glass or glass ceramic substrate 10, but directly, and to provide the associated measured values.

In case of the preferred cooktop 5 there is, between a perceivable color shade $\{L^*_1, a^*_1, b^*_1\}$ or a chroma $\{a^*_1, b^*_1\}$ of the display surface 22 of the display device 20 in its off state, preferably as viewed through the glass or glass ceramic substrate 10, and a perceivable color shade $\{L^*_2, a^*_2, b^*_2\}$ or a chroma $\{a^*_2, b^*_2\}$ of the inner coating 12 of the glass or glass ceramic substrate 10, or a perceivable color shade $\{L^*_2, a^*_2, b^*_2\}$ or a chroma $\{a^*_2, b^*_2\}$ of the film 112 applied to the substrate inner face or applied near the substrate inner face, or a perceivable color shade $\{L^*_2, a^*_2, b^*_2\}$ or a chroma $\{a^*_2, b^*_2\}$ of the carrier material 112 applied to the substrate inner face or applied near the substrate inner face, preferably viewed through the glass or glass ceramic substrate 10, or a perceivable color shade $\{L^*_2, a^*_2, b^*_2\}$ or a chroma $\{a^*_2, b^*_2\}$ of an outer coating 113, or a perceivable color shade $\{L^*_2, a^*_2, b^*_2\}$ or a chroma $\{a^*_2, b^*_2\}$ of a film 113 applied to the substrate outer face or applied near the substrate outer face, or a perceivable color shade $\{L^*_2, a^*_2, b^*_2\}$ or a chroma $\{a^*_2, b^*_2\}$ of a carrier material 113 applied to the substrate outer face or applied near the substrate outer face, or a perceivable color shade $\{L^*_2, a^*_2, b^*_2\}$ or a chroma $\{a^*_2, b^*_2\}$ of a darkened portion 114 of the glass or glass ceramic substrate 10, preferably not viewed through the glass or glass ceramic substrate, but directly, a chroma difference $\Delta C^*=\sqrt{(a^*_2-a^*_1)^2+(b^*_2-b^*_1)^2}$ of less than 8.0, preferably less than 6.0, more preferably less than 4.5, most preferably less than 3.0, in particular if the color shades $\{L^*_1, a^*_1, b^*_1\}$ and $\{L^*_2, a^*_2, b^*_2\}$ or chromas $\{a^*_1, b^*_1\}$ and $\{a^*_2, b^*_2\}$ are measured under standard conditions of standard illuminant D65 and 2° standard observer.

In its off state and when viewed directly, the display surface of the display device has a perceivable color shade $\{L^*, a^*, b^*\}$ with $0<L^*<45$ and/or $-2<a^*<0$ and/or $-1.7<b^*<3.0$ and/or $C^*<3.5$, in particular if the color shade is measured under the standard conditions of standard illuminant D65 and 2° standard observer.

The inner coating, when applied to the glass or glass ceramic substrate, on one of the surfaces of a highly transmissive substrate, in particular with a light transmittance of more than 80%, preferably more than 90%, most preferably more than 95%, and when viewed from the opposite surface of the substrate through the substrate, has a perceivable color shade $\{L^*, a^*, b^*\}$ with $27<L^*<30$ and/or $-0.6<a^*<0$ and/or $-2<b^*<0$ and/or $C^*<2$.

In case of the preferred cooktop 5, there is, between a reflectance $\rho_1$ of the display surface of the display device in its off state and a reflectance $\rho_2$ of the inner coating of the glass or glass ceramic substrate 10, preferably viewed through the glass or glass ceramic substrate 10, or a reflectance $\rho_2$ of the film applied to the substrate inner face or applied near the substrate inner face, or a reflectance $\rho_2$ of the carrier material applied to the substrate inner face or applied near the substrate inner face, preferably viewed through the glass or glass ceramic substrate 10, or a reflectance $\rho_2$ of an outer coating, or a reflectance $\rho_2$ of a film applied to the substrate outer face or a reflectance $\rho_2$ of a film applied near the substrate outer face, or a reflectance $\rho_2$ of a carrier material applied to the substrate outer face or applied near the substrate outer face, or a reflectance $\rho_2$ of a darkened portion of the glass or glass ceramic substrate, preferably not viewed through the glass or glass ceramic substrate, but directly, a difference $|\rho_1-\rho_2|$ of less than 3%, preferably less than 1.5%, with the reflectances being defined as $$\rho_1 = \frac{\int_{S_1}^{S_2} R_1(\lambda)d\lambda}{\int_{S_1}^{S_2} d\lambda}, \; \rho_2 = \frac{\int_{S_1}^{S_2} R_2(\lambda)d\lambda}{\int_{S_1}^{S_2} d\lambda},$$

with integration limits $S_1=400$ nm and $S_2=700$ nm, wherein $R_1(\lambda)$ denotes the spectral reflectance of the display surface of the display device in its off state, and $R_2(\lambda)$ denotes the spectral reflectance of the inner coating of the glass or glass ceramic substrate.

Furthermore, in a preferred embodiment, the cooktop 5 comprises an edge contrast minimization area which provides a gradual transition between the grayscale value and/or the color shade of the display surface 22 in its off state as viewed through the glass or glass ceramic substrate 10 within the range of the display window 60 and the grayscale value and/or the color shade of the inner coating 12 or of the film 112 as viewed through the glass or glass ceramic substrate, or the grayscale value and/or the color shade when directly viewing the carrier material 113 or the outer coating 113 or the film 113.

Furthermore, in a preferred embodiment, the cooktop 5 comprises an edge contrast minimization area which provides a gradual transition between the grayscale value and/or the color shade of the display surface 22 in its off state as viewed through the glass or glass ceramic substrate 10 within the range of the display window 60 and the grayscale value and/or the color shade of the inner coating 12 as viewed through the glass or glass ceramic substrate or of a film applied to or near the inner face of the glass or glass ceramic substrate 10, or of a carrier material applied to or near the inner face of the glass or glass ceramic substrate 10, or of a film applied to or near the outer face of the glass or glass ceramic substrate 10, or of a carrier material applied to or near the outer face of the glass or glass ceramic substrate 10.

In the display window 60 and/or the further display window, the partial discontinuity in the inner coating 12, the outer coating 113, the film 112, 113, or the carrier material 112, 113, or the lightening of the glass or glass ceramic substrate 10 may be made in a grid-like manner. The cooktop 5 also comprises a further display device 70 in the form of a segment display with a display surface 72 which in its on state is visible through the glass ceramic substrate 10 in a further display window 64. Within the range of the further display window 64, the glass ceramic substrate 10 exhibits a light transmittance in a range from 0.5% to 5%. This light transmittance may likewise be achieved by the inner coating or by a partially grid-like area of the inner coating.

Furthermore, the cooktop 5 comprises a zone 80 in the cold region, which exhibits a light transmittance of less than 5%, preferably less than 0.5%, and for wavelengths of 920 nm a transmittance of more than 20%, preferably more than 40%, most preferably more than 60%. Underneath zone 80, an infrared sensor may be arranged in the interior.

Furthermore, the cooktop 5 has at least one cooking area 100 with a light transmittance of less than 5%, preferably less than 0.5%. Underneath the cooking area, there is in particular arranged a heating element for heating cookware placed on the outer face of the substrate.

The cooktop 5 moreover includes a zone 90 in the hot region, which has a light transmittance of less than 5%, preferably less than 0.5%, and which exhibits a transmittance of more than 20%, preferably more than 40%, most preferably more than 60% for wavelengths of 1500 nm, preferably wavelengths of 1600 nm, more preferably wavelengths of 1750 nm. Underneath zone 90, a further infrared sensor may be arranged in the interior, in particular for measuring the temperature of cookware placed on the outer face of the substrate.

It is of course also possible for the disclosed different embodiments to be combined with each other in order to locally change the optical properties to define the display window 60 or the glass or glass ceramic substrate 10. These different embodiments may also be used or combined in a single glass or glass ceramic substrate 10.

Below, compositions for the samples 1 to 21 mentioned in the description are listed, in wt %:

| Sample 1 (Light transmittance = 12.4%) | | |
|---|---|---|
| Components | wt % | wt % (Example) |
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.9 | 2.3 |
| ZnO | 1.1-1.9 | 1.5 |
| Al2O3 | 15.7-26.1 | 20.9 |
| SiO2 | 48.6-80.9 | 64.8 |
| TiO2 | 2.3-3.9 | 3.1 |
| ZrO2 | 1-1.7 | 1.4 |
| SnO2 | 0.2-0.3 | 0.24 |
| Fe2O3 | 0.1-0.1 | 0.083 |
| V2O5 | 0-0.1 | 0.010 |
| Nd2O3 | 0.4-0.6 | 0.5 |

| Sample 2 (Light transmittance = 13.6%) | | |
|---|---|---|
| Components | wt % | wt % (Example) |
| Li2O | 2.8-4.7 | 3.8 |
| Na2O | 0.4-0.7 | 0.6 |
| K2O | 0.2-0.3 | 0.2 |
| MgO | 0.2-0.4 | 0.3 |
| CaO | 0.3-0.5 | 0.4 |
| SrO | 0-0.1 | 0.0 |
| BaO | 1.4-2.3 | 1.9 |
| ZnO | 1.2-1.9 | 1.6 |
| Al2O3 | 15.8-26.3 | 21.0 |
| SiO2 | 49.1-81.8 | 65.4 |

Sample 2 (Light transmittance = 13.6%)

| Components | wt % | wt % (Example) |
| --- | --- | --- |
| TiO2 | 2.1-3.6 | 2.9 |
| ZrO2 | 1.2-1.9 | 1.5 |
| P2O5 | 0-0.1 | 0.061 |
| SnO2 | 0.2-0.3 | 0.26 |
| Fe2O3 | 0.1-0.1 | 0.073 |
| V2O5 | 0-0.1 | 0.016 |
| MnO2 | 0-0.1 | 0.016 |
| Nd2O3 | 0-0.1 | 0.017 |

Sample 3 (Light transmittance = 13.6%)

| Components | wt % | wt % (Example) |
| --- | --- | --- |
| Li2O | 3-5 | 3.80 |
| Na2O | 0-<3 | 0.60 |
| K2O | 0-<3 | 0.25 |
| MgO | 0-3 | 0.29 |
| CaO | 0-4 | 0.40 |
| SrO | 0-4 | 0.02 |
| BaO | 0-4 | 2.23 |
| ZnO | 0-4 | 1.53 |
| Al2O3 | 18-25 | 20.9 |
| SiO2 | 60-70 | 65.0 |
| TiO2 | 1.5-5.5 | 3.10 |
| ZrO2 | 0-2.5 | 1.38 |
| P2O5 | 0-5 | 0.09 |
| SnO2 | 0.1-<0.7 | 0.25 |
| Fe2O3 | 0.01-0.025 | 0.088 |
| MoO3 | 0.003-0.5 | 0.078 |
| MnO2 | 0-0.05 | 0.025 |

Sample 4 (Light transmittance = 17.6%)

| Components | wt % | wt % (Example) |
| --- | --- | --- |
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.9 | 2.3 |
| ZnO | 1.1-1.9 | 1.5 |
| Al2O3 | 15.7-26.2 | 21.0 |
| SiO2 | 48.8-81.4 | 65.1 |
| TiO2 | 2.3-3.9 | 3.1 |
| ZrO2 | 1-1.7 | 1.4 |
| SnO2 | 0.2-0.3 | 0.24 |
| Fe2O3 | 0-0.1 | 0.083 |

Sample 5 (Light transmittance = 20.4%)

| Components | wt % | wt % (Example) |
| --- | --- | --- |
| Li2O | 3-5 | 3.80 |
| Na2O | 0-<3 | 0.60 |
| K2O | 0-<3 | 0.25 |
| MgO | 0-3 | 0.29 |
| CaO | 0-4 | 0.40 |
| SrO | 0-4 | 0.02 |
| BaO | 0-4 | 2.23 |
| ZnO | 0-4 | 1.53 |
| Al2O3 | 18-25 | 20.9 |
| SiO2 | 60-70 | 65.0 |
| TiO2 | 1.5-5.5 | 3.10 |
| ZrO2 | 0-2.5 | 1.38 |
| P2O5 | 0-5 | 0.09 |
| SnO2 | 0.1-<0.7 | 0.25 |
| Fe2O3 | 0.01-0.025 | 0.061 |
| MoO3 | 0.003-0.5 | 0.014 |
| MnO2 | 0-0.05 | 0.025 |

Sample 6 (Light transmittance = 22.4%)

| Components | wt % | wt % (Example) |
| --- | --- | --- |
| Li2O | 2.9-4.8 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.1-1.9 | 1.5 |
| Al2O3 | 15.7-26.2 | 21.0 |
| SiO2 | 48.7-81.1 | 64.9 |
| TiO2 | 2.3-3.9 | 3.1 |
| ZrO2 | 1-1.7 | 1.4 |
| SnO2 | 0.2-0.3 | 0.26 |
| Fe2O3 | 0.1-0.2 | 0.120 |
| V2O5 | 0-0.1 | 0.021 |

Sample 7 (Light transmittance = 24.2%)

| Components | wt % | wt % (Example) |
| --- | --- | --- |
| Li2O | 2.8-4.7 | 3.8 |
| Na2O | 0.4-0.7 | 0.6 |
| K2O | 0.1-0.2 | 0.2 |
| MgO | 0.2-0.4 | 0.3 |
| CaO | 0.3-0.5 | 0.4 |
| SrO | 0-0.1 | 0.1 |
| BaO | 1.1-1.9 | 1.5 |
| ZnO | 1.2-2 | 1.6 |
| Al2O3 | 15.8-26.3 | 21.0 |
| SiO2 | 49.4-82.4 | 65.9 |
| TiO2 | 2-3.3 | 2.7 |
| ZrO2 | 1.2-2.1 | 1.6 |
| P2O5 | 0-0.1 | 0.048 |
| SnO2 | 0.2-0.3 | 0.27 |
| Fe2O3 | 0-0.1 | 0.053 |
| V2O5 | 0-0.1 | 0.010 |
| MnO2 | 0-0.1 | 0.011 |
| Nd2O3 | 0-0.1 | 0.032 |

Sample 8 (Light transmittance = 24.5%)

| Components | wt % | wt % (Example) |
| --- | --- | --- |
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.8 | 2.3 |
| ZnO | 1.1-1.9 | 1.5 |
| Al2O3 | 15.6-26 | 20.8 |
| SiO2 | 48.3-80.5 | 64.4 |
| TiO2 | 2.3-3.9 | 3.1 |
| ZrO2 | 1-1.7 | 1.3 |
| SnO2 | 0.2-0.3 | 0.24 |
| Fe2O3 | 0-0.1 | 0.083 |

Sample 9 (Light transmittance = 24.6%)

| Components | wt % | wt % (Example) |
|---|---|---|
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.8 | 2.3 |
| ZnO | 1.1-1.9 | 1.5 |
| Al2O3 | 15.6-26 | 20.8 |
| SiO2 | 48.3-80.5 | 64.4 |
| TiO2 | 2.3-3.9 | 3.1 |
| ZrO2 | 1-1.7 | 1.3 |
| SnO2 | 0.2-0.3 | 0.24 |
| Fe2O3 | 0-0.1 | 0.083 |

Sample 10 (Light transmittance = 28.3%)

| Components | wt % | wt % (Example) |
|---|---|---|
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.9 | 2.3 |
| ZnO | 1.1-1.9 | 1.5 |
| Al2O3 | 15.7-26.2 | 21.0 |
| SiO2 | 48.8-81.4 | 65.1 |
| TiO2 | 2.3-3.9 | 3.1 |
| ZrO2 | 1-1.7 | 1.4 |
| SnO2 | 0.2-0.3 | 0.24 |
| Fe2O3 | 0-0.1 | 0.083 |

Sample 11 (Light transmittance = 28.4%)

| Components | wt % | wt % (Example) |
|---|---|---|
| Li2O | 2.8-4.7 | 3.8 |
| Na2O | 0.4-0.7 | 0.6 |
| K2O | 0.1-0.2 | 0.2 |
| MgO | 0.2-0.4 | 0.3 |
| CaO | 0.3-0.5 | 0.4 |
| SrO | 0-0.1 | 0.1 |
| BaO | 1.2-2 | 1.6 |
| ZnO | 1.2-2 | 1.6 |
| Al2O3 | 15.8-26.3 | 21.0 |
| SiO2 | 49.4-82.3 | 65.8 |
| TiO2 | 2-3.4 | 2.7 |
| ZrO2 | 1.2-2 | 1.6 |
| P2O5 | 0-0.1 | 0.05 |
| SnO2 | 0.2-0.3 | 0.26 |
| Fe2O3 | 0-0.1 | 0.058 |
| V2O5 | 0-0.1 | 0.012 |
| MnO2 | 0-0.1 | 0.012 |
| Nd2O3 | 0-0.1 | 0.029 |

Sample 12 (Light transmittance = 31.5%)

| Components | wt % | wt % (Example) |
|---|---|---|
| Li2O | 2.9-4.9 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.2-2 | 1.6 |
| Al2O3 | 15.7-26.2 | 20.9 |
| SiO2 | 48.6-81 | 64.8 |
| TiO2 | 2.3-3.9 | 3.1 |
| ZrO2 | 1-1.7 | 1.4 |
| SnO2 | 0.2-0.3 | 0.25 |
| Fe2O3 | 0-0.1 | 0.095 |
| V2O5 | 0-0.1 | 0.004 |
| MnO2 | 0-0.1 | 0.025 |

Sample 13 (Light transmittance = 35.9%)

| Components | wt % | wt % (Example) |
|---|---|---|
| Li2O | 2.9-4.9 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.2-2 | 1.6 |
| Al2O3 | 15.7-26.2 | 20.9 |
| SiO2 | 48.6-81 | 64.8 |
| TiO2 | 2.3-3.9 | 3.1 |
| ZrO2 | 1-1.7 | 1.4 |
| SnO2 | 0.2-0.3 | 0.25 |
| Fe2O3 | 0.1-0.1 | 0.095 |
| V2O5 | 0-0.1 | 0.004 |
| MnO2 | 0-0 | 0.025 |

Sample 14 (Light transmittance = 41.9%)

| Components | wt % | wt % (Example) |
|---|---|---|
| Li2O | 2.8-4.7 | 3.8 |
| Na2O | 0.4-0.7 | 0.6 |
| K2O | 0.1-0.2 | 0.2 |
| MgO | 0.2-0.4 | 0.3 |
| CaO | 0.3-0.5 | 0.4 |
| SrO | 0-0.1 | 0.1 |
| BaO | 1.1-1.8 | 1.4 |
| ZnO | 1.2-2 | 1.6 |
| Al2O3 | 15.8-26.3 | 21.0 |
| SiO2 | 49.5-82.5 | 66.0 |
| TiO2 | 1.9-3.2 | 2.6 |
| ZrO2 | 1.3-2.1 | 1.7 |
| P2O5 | 0-0.1 | 0.05 |
| SnO2 | 0.2-0.3 | 0.27 |
| Fe2O3 | 0-0.1 | 0.048 |
| V2O5 | 0-0.1 | 0.009 |
| MnO2 | 0-0.1 | 0.009 |
| Nd2O3 | 0-0.1 | 0.037 |

Sample 15 (Light transmittance = 42.4%)

| Components | wt % | wt % (Example) |
|---|---|---|
| Li2O | 2.9-4.9 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.2-2 | 1.6 |
| Al2O3 | 15.7-26.2 | 20.9 |
| SiO2 | 48.6-81 | 64.8 |
| TiO2 | 2.3-3.9 | 3.1 |
| ZrO2 | 1-1.7 | 1.4 |

Sample 15 (Light transmittance = 42.4%)

| Components | wt % | wt % (Example) |
|---|---|---|
| SnO2 | 0.2-0.3 | 0.25 |
| Fe2O3 | 0-0.1 | 0.095 |
| V2O5 | 0-0.1 | 0.004 |
| MnO2 | 0-0.1 | 0.025 |

Sample 16 (Light transmittance = 50.1%)

| Components | wt % | wt % (Example) |
|---|---|---|
| Li2O | 3-5 | 3.80 |
| Na2O | 0-<3 | 0.60 |
| K2O | 0-<3 | 0.25 |
| MgO | 0-3 | 0.29 |
| CaO | 0-4 | 0.40 |
| SrO | 0-4 | 0.02 |
| BaO | 0-4 | 2.23 |
| ZnO | 0-4 | 1.53 |
| Al2O3 | 18-25 | 20.9 |
| SiO2 | 60-70 | 65.0 |
| TiO2 | 1.5-5.5 | 3.10 |
| ZrO2 | 0-2.5 | 1.38 |
| P2O5 | 0-5 | 0.09 |
| SnO2 | 0.1-<0.7 | 0.25 |
| Fe2O3 | 0.01-0.025 | 0.0860 |
| MoO3 | 0.003-0.5 | 0.0130 |
| MnO2 | 0-0.05 | 0.025 |

Sample 17 (Light transmittance = 53.0%)

| Components | wt % | wt % (Example) |
|---|---|---|
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.9 | 2.3 |
| ZnO | 1.1-1.9 | 1.5 |
| Al2O3 | 15.7-26.1 | 20.9 |
| SiO2 | 48.6-81 | 64.8 |
| TiO2 | 2.3-3.9 | 3.1 |
| ZrO2 | 1-1.7 | 1.4 |
| SnO2 | 0.2-0.3 | 0.24 |
| Fe2O3 | 0-0.1 | 0.083 |
| CoO | 0-0.1 | 0.005 |
| Nd2O3 | 0.3-0.6 | 0.44 |

Sample 18 (Light transmittance = 55.3%)

| Components | wt % | wt % (Example) |
|---|---|---|
| Li2O | 2.1-3.5 | 2.8 |
| Na2O | 0.4-0.7 | 0.6 |
| K2O | 0.2-0.3 | 0.3 |
| MgO | 1.2-2 | 1.6 |
| CaO | 0.3-0.5 | 0.4 |
| BaO | 1.7-2.9 | 2.3 |
| ZnO | 1.1-1.9 | 1.5 |
| Al2O3 | 15.7-26.1 | 20.9 |
| SiO2 | 48.7-81.1 | 64.9 |
| TiO2 | 2.3-3.9 | 3.1 |
| ZrO2 | 1-1.7 | 1.4 |
| SnO2 | 0.2-0.3 | 0.24 |
| Fe2O3 | 0-0.1 | 0.083 |
| CoO | 0-0.1 | 0.005 |

Sample 19 (Light transmittance = 56.4%)

| Components | wt % | wt % (Example) |
|---|---|---|
| Li2O | 2.8-4.6 | 3.7 |
| Na2O | 0.4-0.7 | 0.6 |
| K2O | 0.2-0.3 | 0.3 |
| MgO | 0.3-0.5 | 0.4 |
| CaO | 0.3-0.5 | 0.4 |
| BaO | 1.7-2.9 | 2.3 |
| ZnO | 1.1-1.9 | 1.5 |
| Al2O3 | 15.7-26.1 | 20.9 |
| SiO2 | 48.6-80.9 | 64.8 |
| TiO2 | 2.3-3.9 | 3.1 |
| ZrO2 | 1-1.7 | 1.4 |
| SnO2 | 0.2-0.3 | 0.24 |
| Fe2O3 | 0-0.1 | 0.083 |
| Nd2O3 | 0.4-0.6 | 0.5 |

Sample 20 (Light transmittance = 64.7)

| Components | wt % | wt % (Example) |
|---|---|---|
| Li2O | 2.9-4.8 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.1-1.9 | 1.5 |
| Al2O3 | 15.7-26.2 | 20.9 |
| SiO2 | 48.6-81 | 64.8 |
| TiO2 | 2.3-3.9 | 3.1 |
| ZrO2 | 1-1.7 | 1.4 |
| SnO2 | 0.2-0.3 | 0.25 |
| Fe2O3 | 0-0.2 | 0.100 |
| MnO2 | 0.2-0.3 | 0.200 |

Sample 21 (Light transmittance = 69.7%)

| Components | wt % | wt % (Example) |
|---|---|---|
| Li2O | 2.9-4.8 | 3.9 |
| Na2O | 0.5-0.8 | 0.6 |
| K2O | 0.2-0.3 | 0.3 |
| MgO | 0.2-0.4 | 0.3 |
| CaO | 0.3-0.5 | 0.4 |
| BaO | 1.7-2.8 | 2.3 |
| ZnO | 1.1-1.9 | 1.5 |
| Al2O3 | 15.7-26.2 | 21.0 |
| SiO2 | 48.7-81.1 | 64.9 |
| TiO2 | 2.3-3.9 | 3.1 |
| ZrO2 | 1-1.7 | 1.4 |
| SnO2 | 0.2-0.3 | 0.25 |
| Fe2O3 | 0-0.2 | 0.100 |
| MnO2 | 0-0.1 | 0.025 |

Within the scope of the invention, a composition may in particular be provided which comprises one or more of the following components with the corresponding proportion (wt %):

| Components | wt % |
|---|---|
| Li2O | 2.7-4 |
| Na2O | 0.5-0.7 |
| K2O | 0.1-0.4 |
| MgO | 0.2-1.7 |
| CaO | 0.3-0.6 |
| SrO | 0-0.1 |
| BaO | 1.3-2.4 |

-continued

| Components | wt % |
| --- | --- |
| ZnO | 0.9-1.8 |
| Al2O3 | 19.5-22.5 |
| SiO2 | 63-67 |
| TiO2 | 2.5-3.25 |
| ZrO2 | 0.9-1.8 |
| P2O5 | 0-0.12 |
| SnO2 | 0.2-0.35 |
| Fe2O3 | 0.03-0.16 |
| V2O5 | 0-0.025 |
| MnO2 | 0-0.3 |
| CoO | 0-0.08 |
| Nd2O3 | 0-0.6 |

LIST OF REFERENCE NUMERALS

1 Grayscale meter
2 Darkroom
3 Support surface
5 Cooktop
10 Glass or glass ceramic substrate
12 Inner coating
20 Display device
22 Display surface
30 RAL card
32 RAL card
42 Camera
44 Objective lens
46 Filter
50 Measurement window
52 Measurement window
54 Measurement window
56 Measurement window
60 Display window
80 Zone
90 Zone
100 Cooking area
112 Carrier substrate, film
113 Outer coating, film
114 Portion

The invention claimed is:

1. A cooktop for a cooking appliance having an exterior and an interior, comprising:
a glass or glass ceramic substrate having an outer face facing the exterior and an inner face facing the interior;
a display device with a display surface for displaying information by emission of light, wherein the display device is arranged at the inner face such that light emitted from the display surface passes through the glass or glass ceramic substrate and is perceptible by a user at the outer face; and
a display window for the light emitted from the display surface, wherein the glass or glass ceramic substrate at the display window has a light transmittance ($\tau_{vis}$) in a range from 5% to 70%, wherein the display device is a colored pixel display.

2. The cooktop of claim 1, wherein the range of the light transmittance is from 12% to 30%.

3. A cooktop for a cooking appliance having an exterior and an interior, comprising:
a glass or glass ceramic substrate having an outer face facing the exterior and an inner face facing the interior;
a display device with a display surface for displaying information by emission of light, wherein the display device is arranged at the inner face such that light emitted from the display surface passes through the glass or glass ceramic substrate and is perceptible by a user at the outer face;
a display window for the light emitted from the display surface, wherein the glass or glass ceramic substrate at the display window has a light transmittance ($\tau_{vis}$) in a range from 5% to 70%; and
an inner coating on the inner face, wherein the inner coating defines the display window.

4. The cooktop of claim 1, wherein the display surface exhibits a luminance of at least 200 cd/m$^2$ and of at most 2000 cd/m$^2$.

5. The cooktop of claim 1, wherein the display surface exhibits a luminance of at least 500 cd/m$^2$ and not more than 800 cd/m$^2$.

6. The cooktop of claim 1, wherein the display window is defined by an arrangement disposed above, below, and/or within the glass or glass ceramic substrate.

7. The cooktop of claim 6, wherein the arrangement comprises at least one of an outer coating on the outer face, a film adjacent to or on the inner face, a film adjacent to or on the outer face, a carrier material adjacent to or on the inner face, a carrier material adjacent to or on the outer face, and an altered light transmittance of the glass or glass ceramic substrate.

8. A cooktop for a cooking appliance having an exterior and an interior, comprising:
a glass or glass ceramic substrate having an outer face facing the exterior and an inner face facing the interior;
a display device with a display surface for displaying information by emission of light, wherein the display device is arranged at the inner face such that light emitted from the display surface passes through the glass or glass ceramic substrate and is perceptible by a user at the outer face;
a display window for the light emitted from the display surface, wherein the glass or glass ceramic substrate at the display window has a light transmittance ($\tau_{vis}$) in a range from 5% to 70%, wherein the display window is defined by an arrangement disposed above, below, and/or within the glass or glass ceramic substrate;
at least one of an outer coating on the outer face, a film adjacent to or on the inner face, a film adjacent to or on the outer face, a carrier material adjacent to or on the inner face, a carrier material adjacent to or on the outer face, and an altered light transmittance of the glass or glass ceramic substrate; and
a difference $|G_1-G_2|$ of a percentage grayscale value $G_1$ of the display surface in an off state viewed through the glass or glass ceramic substrate and a percentage grayscale value $G_2$ of the arrangement is less than 5.0%.

9. The cooktop of claim 8, wherein the percentage grayscale values $G_1$ and $G_2$ are calculated using a linear function G as $G_1=G(M_1)$ and $G_2=G(M_2)$ based on measured values $M_1$ and $M_2$ measured using a grayscale meter,
wherein the measured value $M_1$ corresponds to the display surface in the off state viewed through the glass or glass ceramic substrate and is measured using the grayscale meter,
wherein the measured value $M_2$ corresponds to the arrangement viewed directly and measured using the grayscale meter,
wherein the linear function G is defined by matching a percentage grayscale value of 20% to a measured value corresponding to a RAL card with color RAL 9017 and measured by the grayscale meter, and a percentage grayscale value of 90% to a measured value corresponding to a RAL card with color RAL 7012 and measured by the grayscale meter, and wherein the grayscale meter comprises a camera configured to take a grayscale image of the display surface and of the arrangement.

10. A cooktop for a cooking appliance having an exterior and an interior, comprising:

a glass or glass ceramic substrate having an outer face facing the exterior and an inner face facing the interior;

a display device with a display surface for displaying information by emission of light, wherein the display device is arranged at the inner face such that light emitted from the display surface passes through the glass or glass ceramic substrate and is perceptible by a user at the outer face; and a display window for the light emitted from the display surface, wherein the glass or glass ceramic substrate at the display window has a light transmittance ($\tau_{vis}$) in a range from 5% to 70%, wherein the display window is defined by an arrangement disposed above, below, and/or within the glass or glass ceramic substrate;

at least one of an outer coating on the outer face, a film adjacent to or on the inner face, a film adjacent to or on the outer face, a carrier material adjacent to or on the inner face, a carrier material adjacent to or on the outer face, and an altered light transmittance of the glass or glass ceramic substrate; and a chroma difference $\Delta C^*$ of a perceivable color shade $\{L^*_1, a^*_1, b^*_1\}$ or a chroma $\{a^*_1, b^*_2\}$ of the display surface of in the off state viewed through the glass or glass ceramic substrate and a perceivable color shade $\{L^*_2, a^*_2, b^*_2\}$ or a chroma $\{a^*_1, b^*_2\}$ of the arrangement viewed directly, wherein the chroma difference $\Delta C^* = \sqrt{(a^*_2 - a^*_1)^2 + (b^*_2 - b^*_1)^2}$ is less than 8.0.

11. The cooktop of claim 1, wherein the display surface of the display device in an off state and when viewed directly has a perceivable color shade $\{L^*, a^*, b^*\}$ with $25 < L^* < 45$ and/or $-2 < a^* < 0$ and/or $-1.7 < b^* < 3.0$ and/or $C^* < 3.5$.

12. The cooktop of claim 7, further comprising a difference $|\rho_1 - \rho_2|$ of a reflectance $\rho_1$ of the display surface in the off state and a reflectance $\rho_2$ of the arrangement of less than 3% with the reflectance being defined as $$\rho_1 = \frac{\int_{S_1}^{S_2} R_1(\lambda) d\lambda}{\int_{S_1}^{S_2} d\lambda}, \quad \rho_2 = \frac{\int_{S_1}^{S_2} R_2(\lambda) d\lambda}{\int_{S_1}^{S_2} d\lambda},$$

with integration limits $S_1 = 400$ nm and $S_2 = 700$ nm, wherein $R_1(\lambda)$ denotes the spectral reflectance of the display surface om the off state, and $R_2(\lambda)$ denotes a spectral reflectance of the inner coating of the glass or glass ceramic substrate.

13. The cooktop of claim 10, further comprising an edge contrast minimization area that provides a gradual transition between the grayscale value and/or the color shade the off state as viewed through the glass or glass ceramic substrate and the grayscale value and/or the color shade of the arrangement.

14. The cooktop of claim 7, wherein the display window comprises a partial discontinuity of the arrangement in a grid-like so as to cause an average reduction in light transmittance ($\tau_{vis}$).

15. A cooktop for a cooking appliance having an exterior and an interior, comprising:

a glass or glass ceramic substrate having an outer face facing the exterior and an inner face facing the interior;

a display device with a display surface for displaying information by emission of light, wherein the display device is arranged at the inner face such that light emitted from the display surface passes through the glass or glass ceramic substrate and is perceptible by a user at the outer face; and a display window for the light emitted from the display surface, wherein the glass or glass ceramic substrate at the display window has a light transmittance ($\tau_{vis}$) in a range from 5% to 70%, wherein the display surface, when viewed from the exterior through the glass or glass ceramic element, has a luminance of greater than 60 cd/m².

16. The cooktop of claim 1, further comprising a heating element at the inner face to heat cookware on the outer face and/or an infrared sensor at the inner face to measure a temperature of cookware on the outer face, wherein, within a heating range of the heating element and/or a measurement range of the infrared sensor, the glass or glass ceramic substrate exhibits light transmittance ($\tau_{vis}$) of less than 5%.

17. The cooktop of claim 1, wherein the glass or glass ceramic substrate comprises an LAS glass or glass ceramic.

18. The cooktop of claim 1, wherein the glass or glass ceramic substrate is volume-dyed.

19. The cooktop of claim 1, wherein the glass or glass ceramic substrate is transparent.

20. The cooktop of claim 1, wherein the glass or glass ceramic substrate exhibits, within the range of the display window, a spectral transmittance characteristic in the form of a neutral or gray filter, wherein transmittance varies by not more than ±20% over a spectral range from 380 nm to 780 nm.

21. The cooktop of claim 3, wherein the inner coating exhibits a light transmittance ($\tau_{vis}$) in a range of <0.5%.

22. The cooktop of claim 3, wherein the inner coating exhibits a light transmittance ($\tau_{vis}$) in a range from 0 to 0.00005%.

23. The cooktop of claim 3, wherein the outer face of the glass or glass ceramic substrate comprises an outer coating having a feature selected from the group consisting of a decoration layer, a scratch-resistant layer, a polished surface, and any combinations thereof.

24. The cooktop of claim 22, wherein the inner coating and/or the outer coating comprises a layer selected from the group consisting of a sputter-deposited layer, a luster glaze, a sol-gel layer, a physical vapor deposition layer, and a sputter-deposition layer.

25. A cooktop for a cooking appliance having an exterior and an interior, comprising:

a glass or glass ceramic substrate having an outer face facing the exterior and an inner face facing the interior;

a display device with a display surface for displaying information by emission of light, wherein the display device is arranged at the inner face such that light emitted from the display surface passes through the glass or glass ceramic substrate and is perceptible by a user at the outer face;

a display window for the light emitted from the display surface, wherein the glass or glass ceramic substrate at the display window has a light transmittance ($\tau_{vis}$) in a range from 5% to 70%; and a color compensation layer.

26. The cooktop of claim 1, further comprising an electrically conductive layer configured to detect a touch by a user on the outer face.

27. The cooktop of claim 26, wherein the electrically conductive layer is on the substrate inner face.

28. The cooktop of claim 26, wherein the electrically conductive layer is on the display surface.

29. The cooktop of claim 1, wherein the display device is spaced apart from or mounted directly to the inner face.

30. The cooktop of claim 10, further comprising a difference $|\rho_1-\rho_2|$ of a reflectance $\rho_i$ of the display surface in the off state and a reflectance $\rho_2$ of the arrangement of less than 3%

$$\rho_1 = \frac{\int_{S_1}^{S_2} R_1(\lambda)d\lambda}{\int_{S_1}^{S_2} d\lambda}, \quad \rho_2 = \frac{\int_{S_1}^{S_2} R_2(\lambda)d\lambda}{\int_{S_1}^{S_2} d\lambda},$$

with the reflectance being defined as with integration limits $S_1=400$ nm and $S_2=700$ nm, wherein $R_1(\lambda)$ denotes the spectral reflectance of the display surface om the off state, and $R_2(\lambda)$ denotes a spectral reflectance of the inner coating of the glass or glass ceramic substrate.

* * * * *